(12) United States Patent
Nakaishi

(10) Patent No.: US 10,104,396 B2
(45) Date of Patent: Oct. 16, 2018

(54) ENCODER CIRCUIT AND ENCODING METHOD

(71) Applicant: Socionext Inc., Yokohama-shi, Kanagawa (JP)

(72) Inventor: Hidenori Nakaishi, Nara (JP)

(73) Assignee: SOCIONEXT INC., Yokohama (JP)

( * ) Notice: Subject to any disclaimer, the term of this patent is extended or adjusted under 35 U.S.C. 154(b) by 239 days.

(21) Appl. No.: 14/841,178

(22) Filed: Aug. 31, 2015

(65) Prior Publication Data

US 2016/0080760 A1    Mar. 17, 2016

(30) Foreign Application Priority Data

Sep. 17, 2014   (JP) .................. 2014-189146

(51) Int. Cl.
| | | |
|---|---|---|
| *H04N 19/149* | (2014.01) | |
| *H04N 19/159* | (2014.01) | |
| *H04N 19/172* | (2014.01) | |
| *H04N 19/176* | (2014.01) | |
| *H04N 19/52*  | (2014.01) | |

(Continued)

(52) U.S. Cl.
CPC ........... *H04N 19/57* (2014.11); *H04N 19/533* (2014.11)

(58) Field of Classification Search
USPC ....................................................... 375/240
See application file for complete search history.

(56) References Cited

U.S. PATENT DOCUMENTS 6,549,576 B1   4/2003 Moriyoshi
6,618,441 B1   9/2003 Hasegawa (Continued)

FOREIGN PATENT DOCUMENTS

JP   2000-236552 A   8/2000
JP   2000-308062 A   11/2000

(Continued)

OTHER PUBLICATIONS

Nisar, Humaira et al.; Efficient Block Motion Estimation Using Sector Based Approach, 2007 IEEE International Conference on Image Processing (ICIP 2007), IEEE, Sep. 16, 2007, pp. 489-492, URL, http://ieeexplore.ieee.org/stamp/stamp.jsp?arnumber=4379199.

(Continued)

*Primary Examiner* — Christopher S Kelley
*Assistant Examiner* — Asmamaw G Tarko
(74) *Attorney, Agent, or Firm* — Arent Fox LLP

(57) ABSTRACT

An encoder circuit includes a statistical processing circuit and a motion search circuit. The statistical processing circuit performs statistical processing on motion vectors detected with respect to each of macroblocks that are units of processing. Each of frame images included in video is divided into the macroblocks. The motion search circuit sets a first search range in a reference frame image temporally different from a first frame image among the frame images, sets a search start position and a search direction within the first search range based on the result of the statistical processing, searches the first search range from the search start position in accordance with the search direction, and generates the motion vector of a current macroblock included in the first frame image based on the result of searching the first search range.

16 Claims, 36 Drawing Sheets

(51) Int. Cl.
*H04N 19/57* (2014.01)
*H04N 19/533* (2014.01)

(56) References Cited

U.S. PATENT DOCUMENTS

| | | | | |
|---|---|---|---|---|
| 2002/0168008 | A1* | 11/2002 | Ishikawa | H04N 19/577 |
| | | | | 375/240.15 |
| 2007/0140591 | A1* | 6/2007 | Kurata | H04N 5/23248 |
| | | | | 382/278 |
| 2007/0188619 | A1* | 8/2007 | Kurata | H04N 5/145 |
| | | | | 348/208.99 |
| 2008/0175439 | A1* | 7/2008 | Kurata | H04N 5/23248 |
| | | | | 382/107 |
| 2012/0134417 | A1* | 5/2012 | Layachi | H04N 19/105 |
| | | | | 375/240.16 |
| 2012/0320983 | A1* | 12/2012 | Zheng | H04N 19/56 |
| | | | | 375/240.16 |
| 2016/0057429 | A1* | 2/2016 | Yin | H04N 19/139 |
| | | | | 375/240.16 |

FOREIGN PATENT DOCUMENTS

| | | |
|---|---|---|
| JP | 2001-145109 A | 5/2001 |
| JP | 2002-335529 A | 11/2002 |
| JP | 2004-179906 A | 6/2004 |

OTHER PUBLICATIONS

Okubo, Ei; H. 265/HEVC Textbook, Impress Japan Co., Ltd., Oct. 21, 2013, First Edition.
Japanese Office Action of related Japanese Patent Application No. 2014-189146 dated May 29, 2018.

* cited by examiner

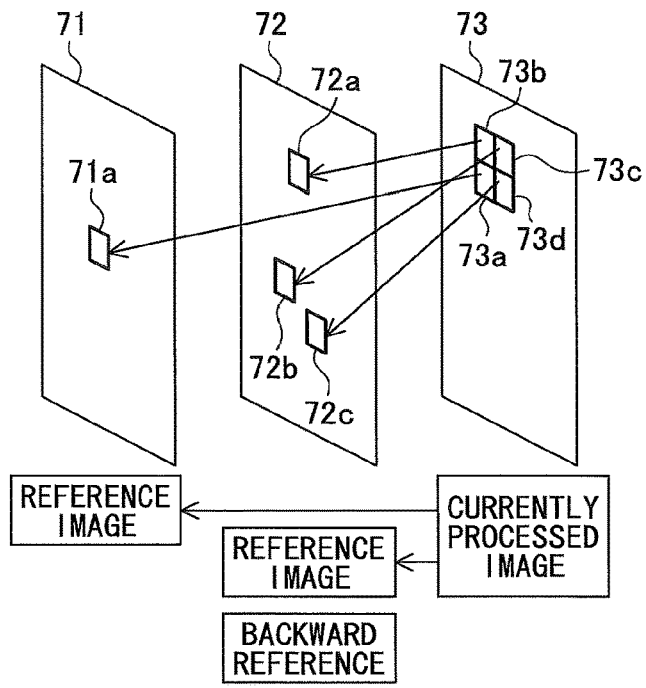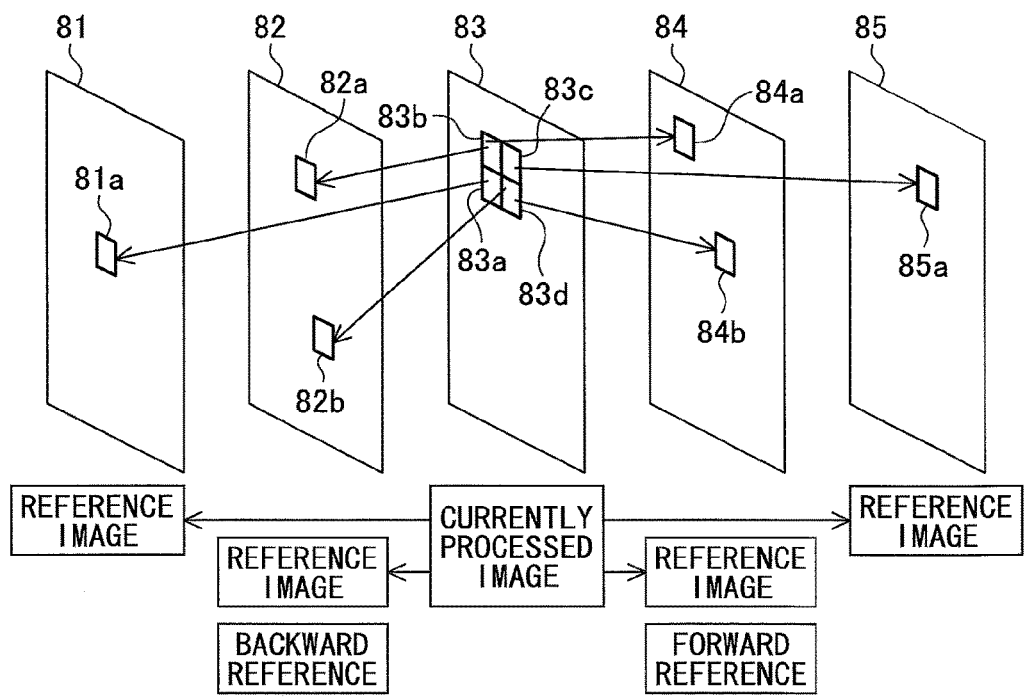

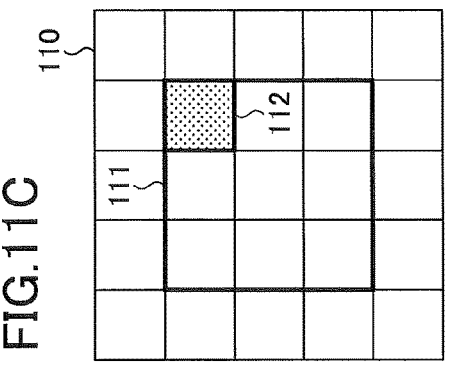

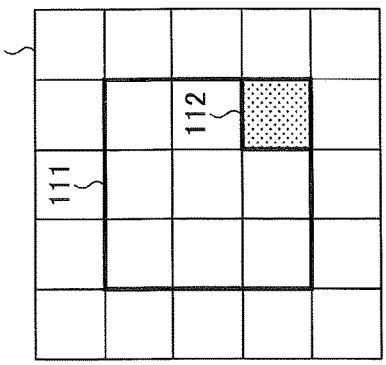
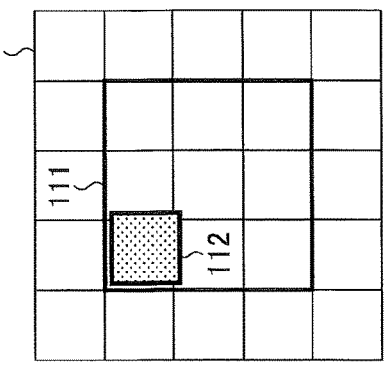
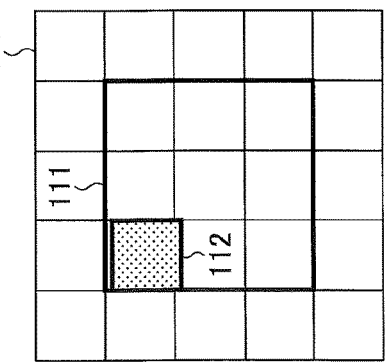

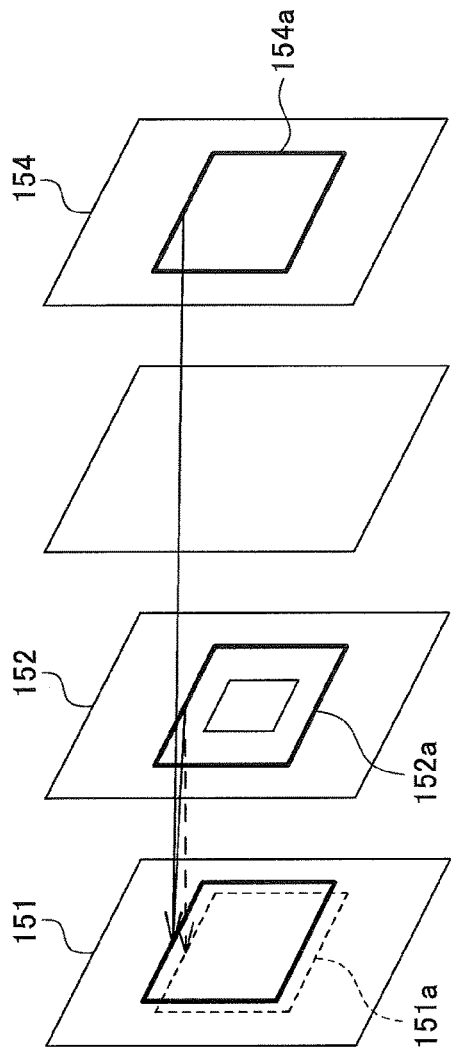
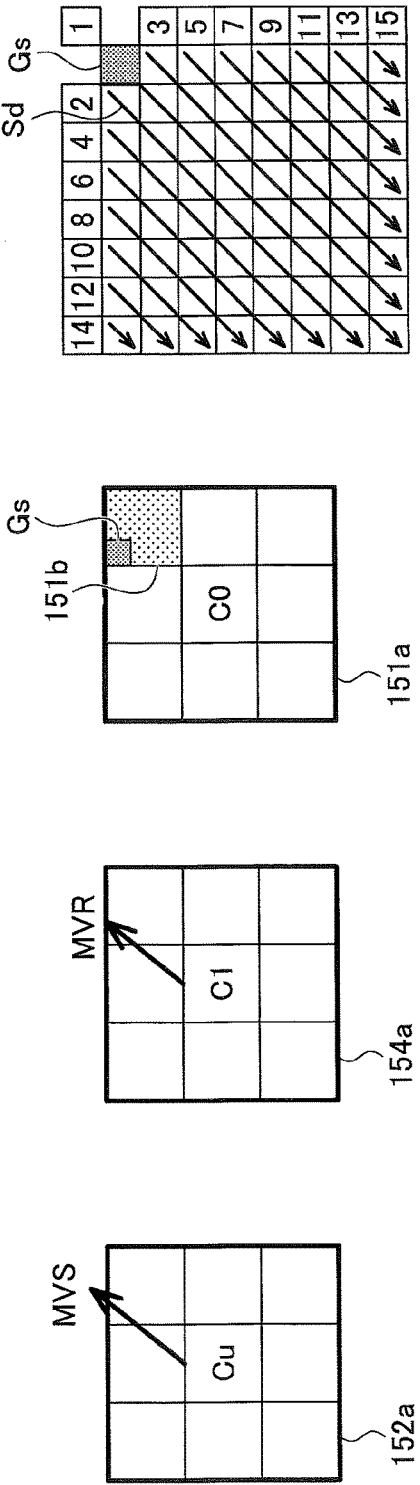
FIG.16A FIG.16B FIG.16C FIG.16D FIG.16E

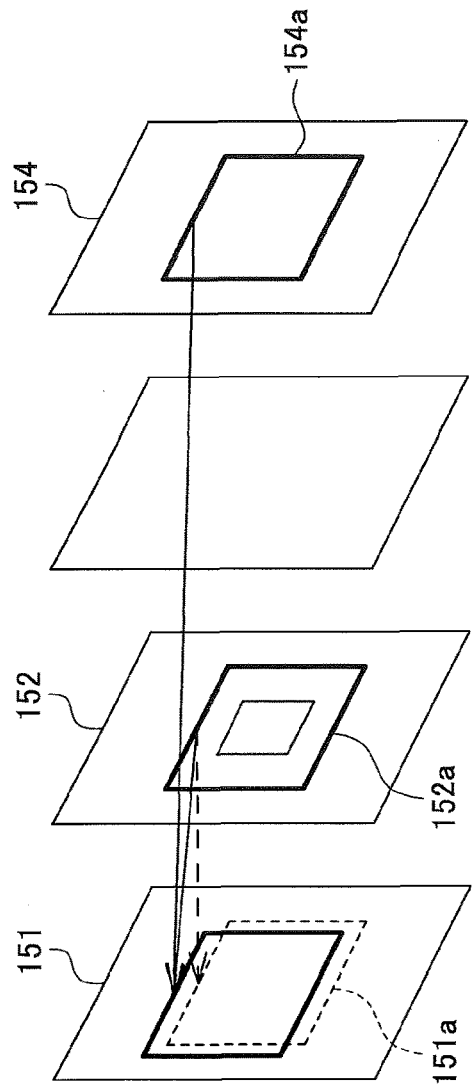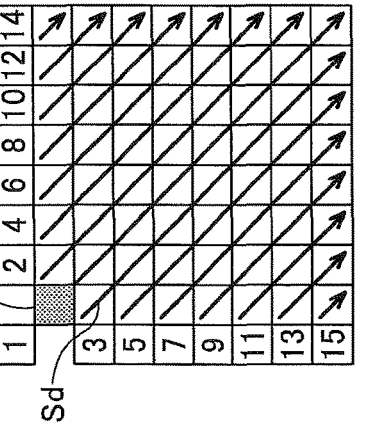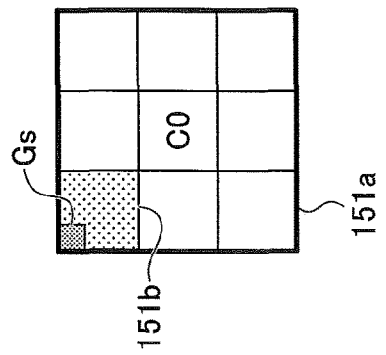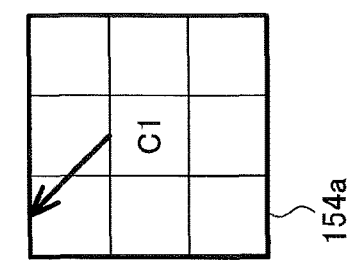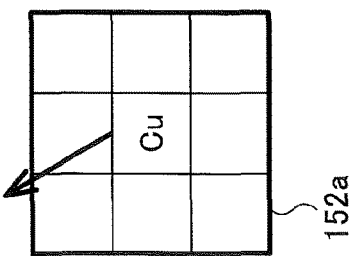

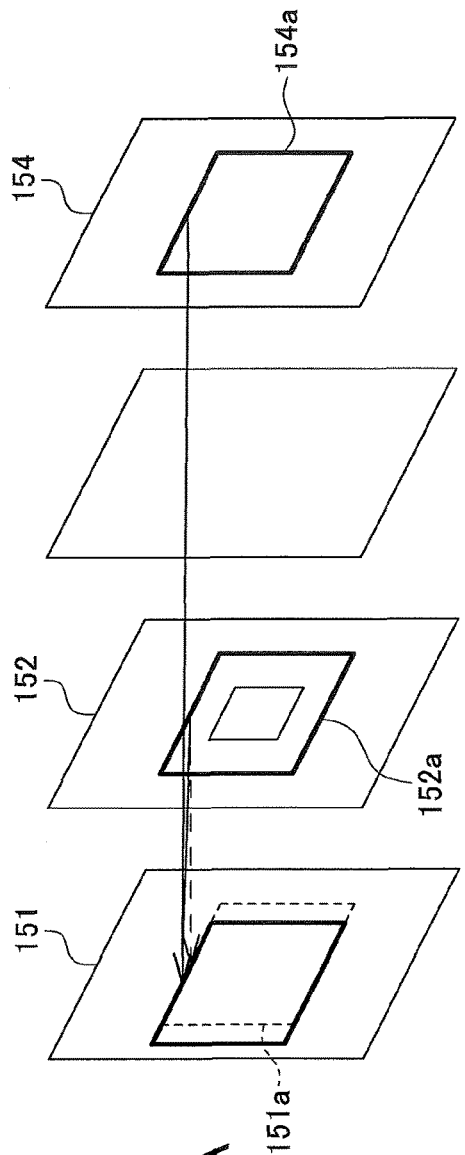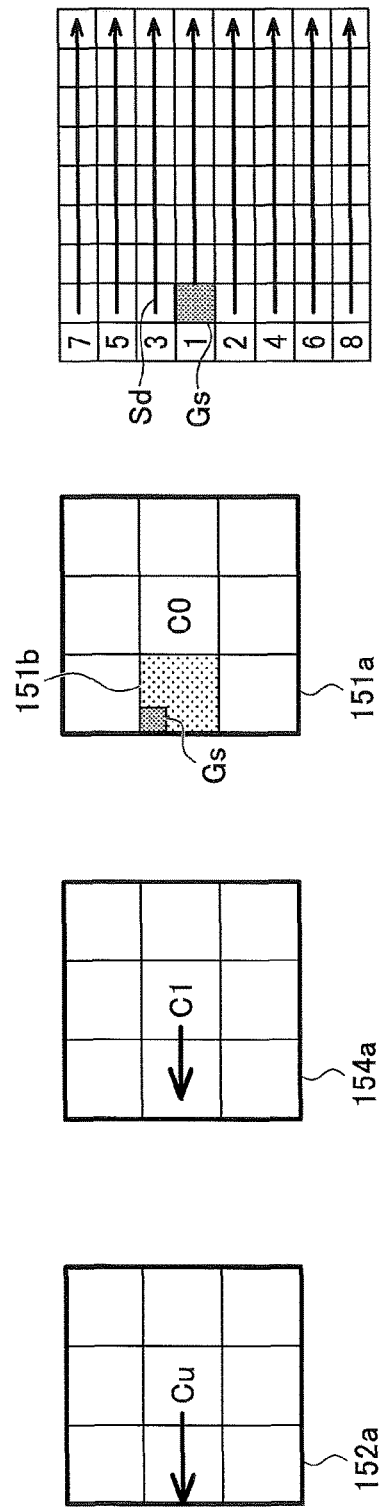

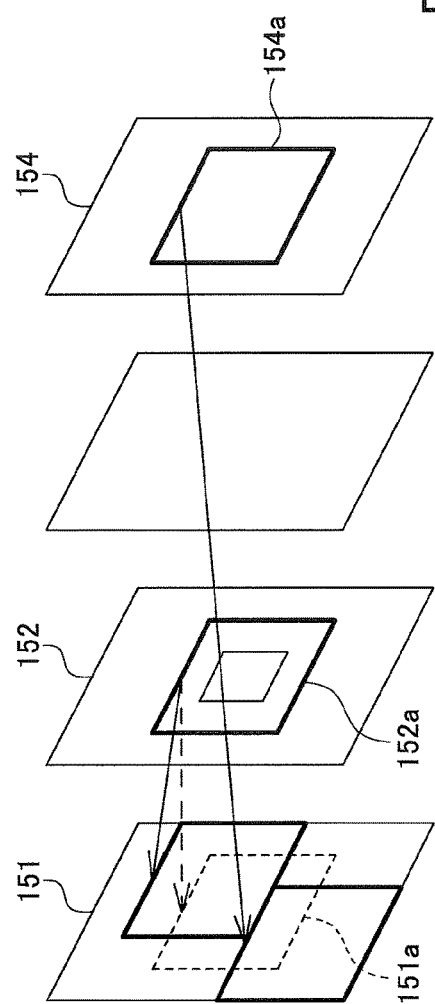
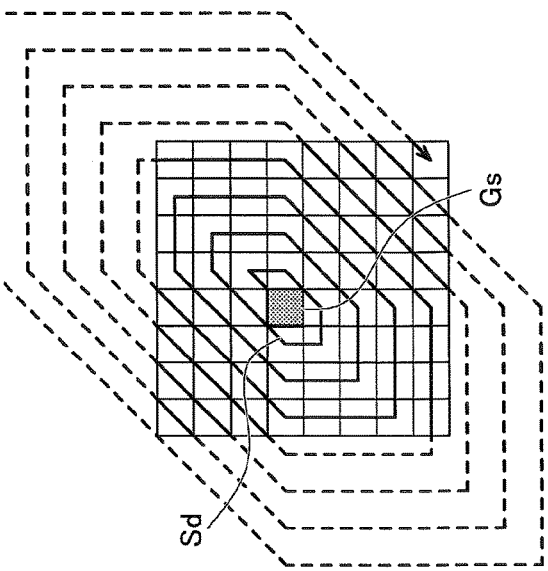
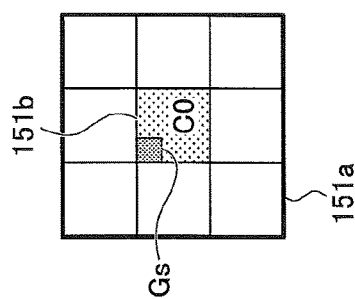
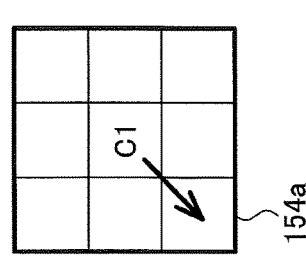
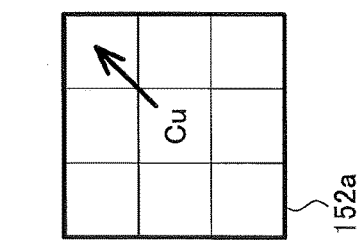

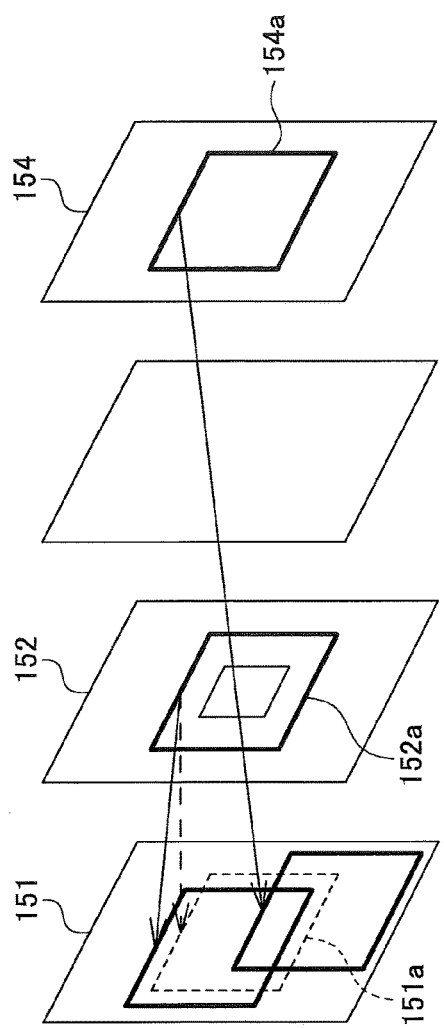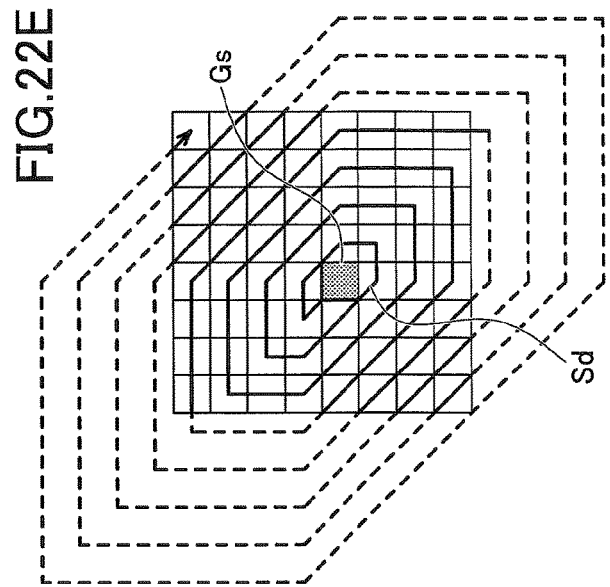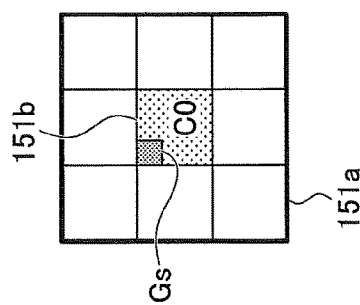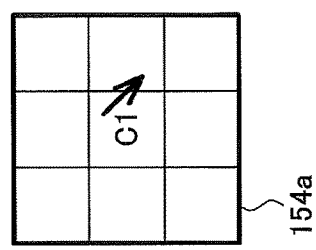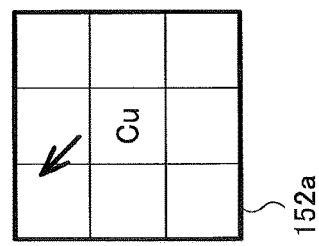

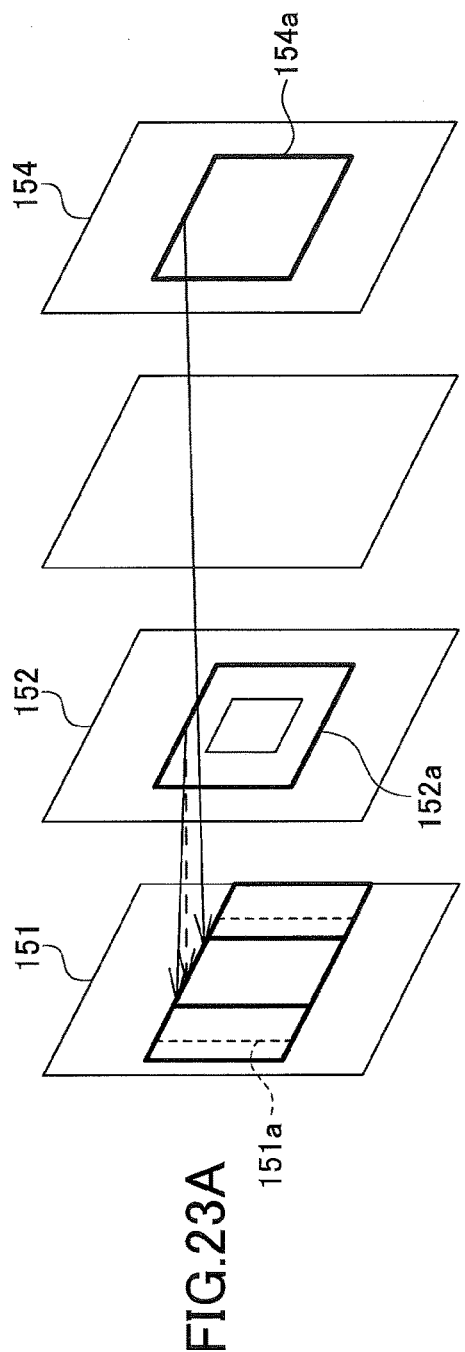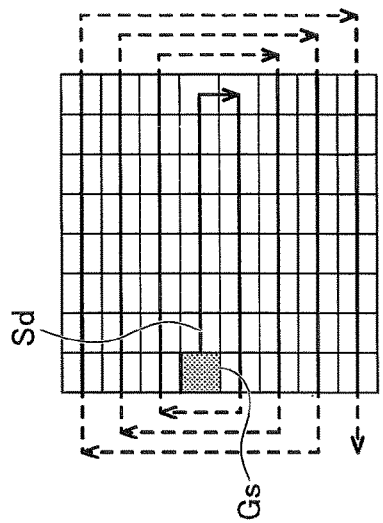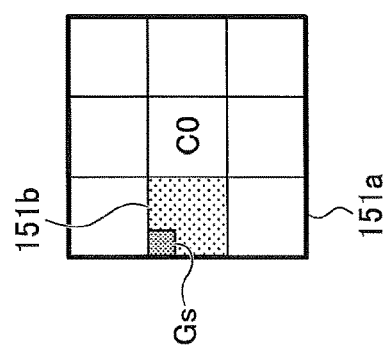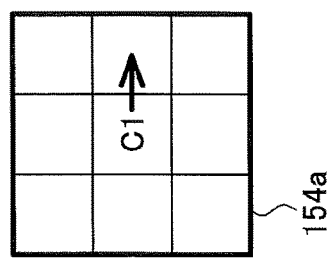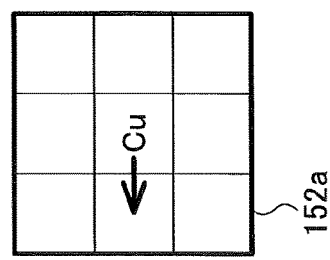

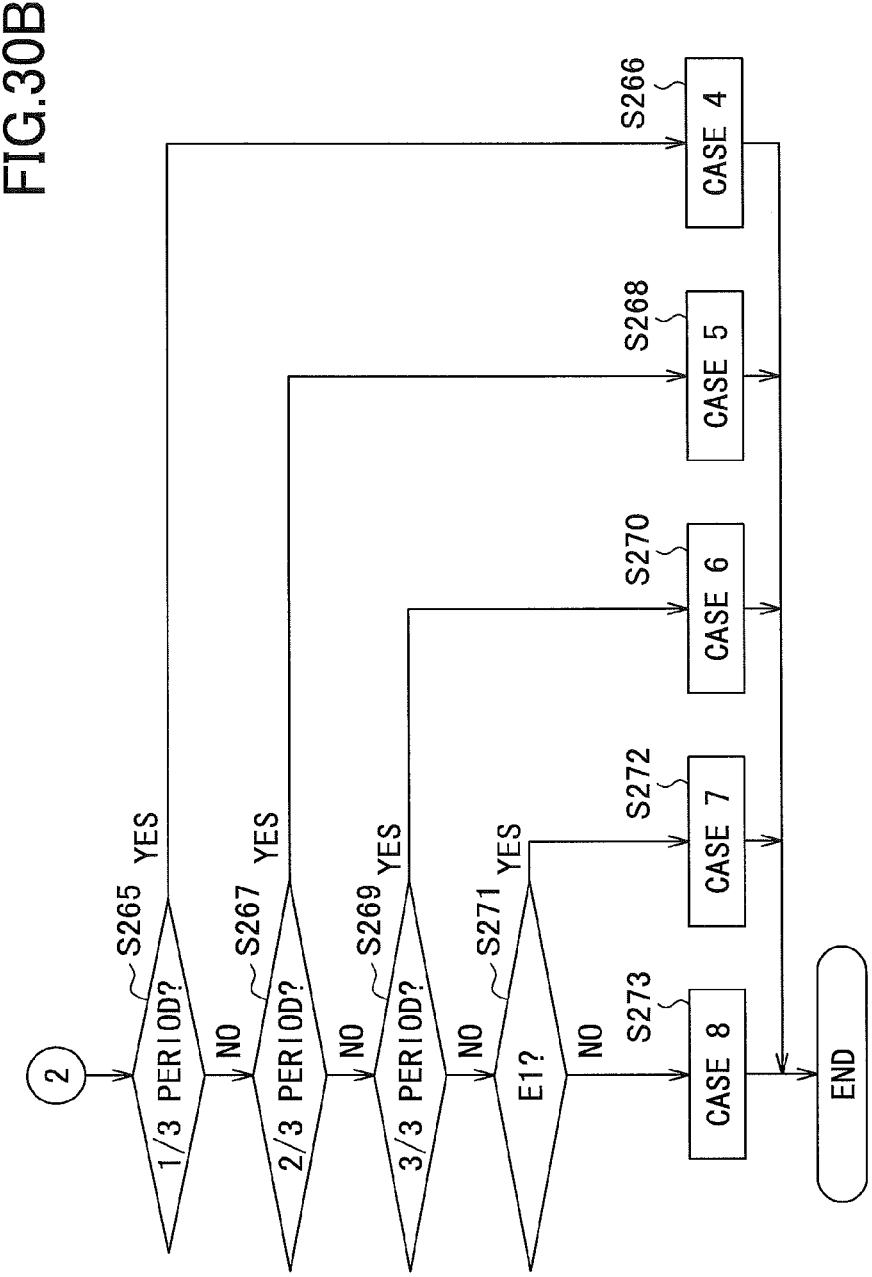

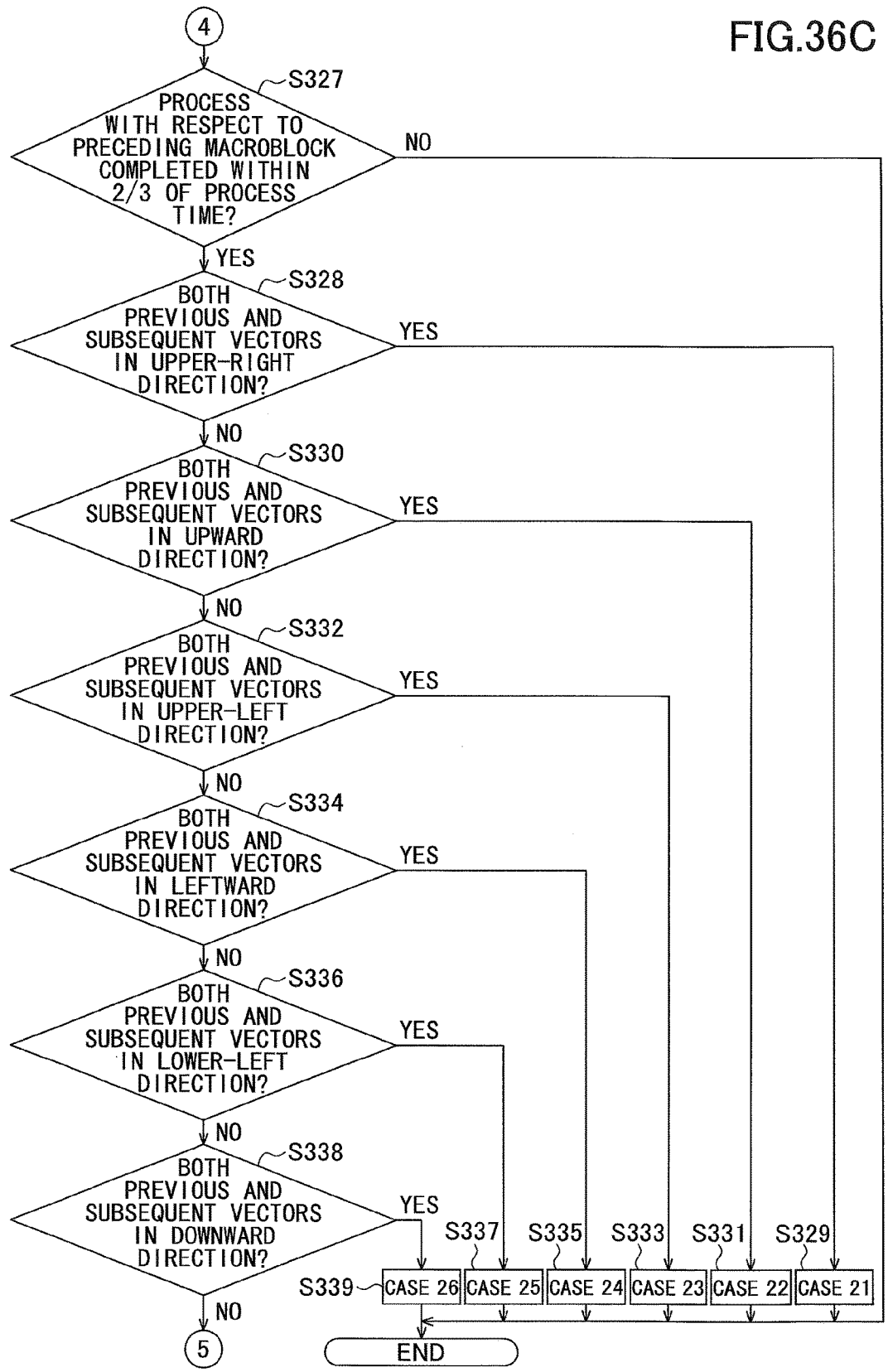

ENCODER CIRCUIT AND ENCODING METHOD

CROSS-REFERENCE TO RELATED APPLICATION

This application is based upon and claims the benefit of priority of the prior Japanese Patent Application No. 2014-189146, filed on Sep. 17, 2014, the entire contents of which are incorporated herein by reference.

FIELD

A certain aspect of the embodiment discussed herein is related to video encoder circuits and encoding methods.

BACKGROUND

Standards such as MPEG (Moving Picture Experts Group) and H.264 have been known as standards for video compression coding. Image processing apparatuses that perform such compression coding perform intra prediction and inter prediction. According to the intra prediction, a motion search is performed so as to detect motion vectors of macroblocks (MBs) into which a screen to be encoded (referred to as "currently processed image") is divided. The motion search is a process to search out a block similar to a macroblock that is a target of processing from a reference image that is temporally previous or subsequent to the currently processed image. In the motion search, a search range may be set using motion vectors in an image temporally different from the currently processed image. (See, for example, Japanese Laid-Open Patent Publication Nos. 2000-308062 and 2002-335529.)

SUMMARY

According to an aspect of the present invention, an encoder circuit includes a statistical processing circuit and a motion search circuit. The statistical processing circuit performs statistical processing on motion vectors detected with respect to each of macroblocks that are units of processing. Each of frame images included in video is divided into the macroblocks. The motion search circuit sets a first search range in a reference frame image temporally different from a first frame image among the frame images, sets a search start position and a search direction within the first search range based on the result of the statistical processing, searches the first search range from the search start position in accordance with the search direction, and generates the motion vector of a current macroblock included in the first frame image based on the result of searching the first search range.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

FIG. 4 is a diagram illustrating inter-picture backward reference;
FIG. 5 is a diagram illustrating inter-picture forward reference and backward reference;
FIG. 6 is a diagram illustrating order macroblocks are processed and calculation of a motion vector predictor and so on;
FIGS. 11A through 11F are diagrams illustrating a full search in a motion search;
FIGS. 16A through 16E are diagrams illustrating CASE 1 of a search start position and a search direction;
FIGS. 18A through 18E are diagrams illustrating CASE 3 of the search start position and the search direction;
FIGS. 19A through 19E are diagrams illustrating CASE 4 of the search start position and the search direction;
FIGS. 20A through 20E are diagrams illustrating CASE 9 of the search start position and the search direction;
FIGS. 22A through 22E are diagrams illustrating CASE 11 of the search start position and the search direction;
FIGS. 23A through 23E are diagrams illustrating CASE 12 of the search start position and the search direction;
FIGS. 30A and 30B are flowcharts illustrating a process of selecting a case of a termination process;
FIGS. 36A through 36D are flowcharts illustrating a process of selecting a case of the extension of the search range.

DESCRIPTION OF EMBODIMENTS

Encoder circuits that encode video are required to improve coding efficiency (the efficiency of encoding by inter prediction).

According to an aspect of the invention, it is possible to improve coding efficiency.

One or more preferred embodiments of the present invention will be explained with reference to accompanying drawings.

First, a description is given of an outline of an encoder circuit.

Figure 1:
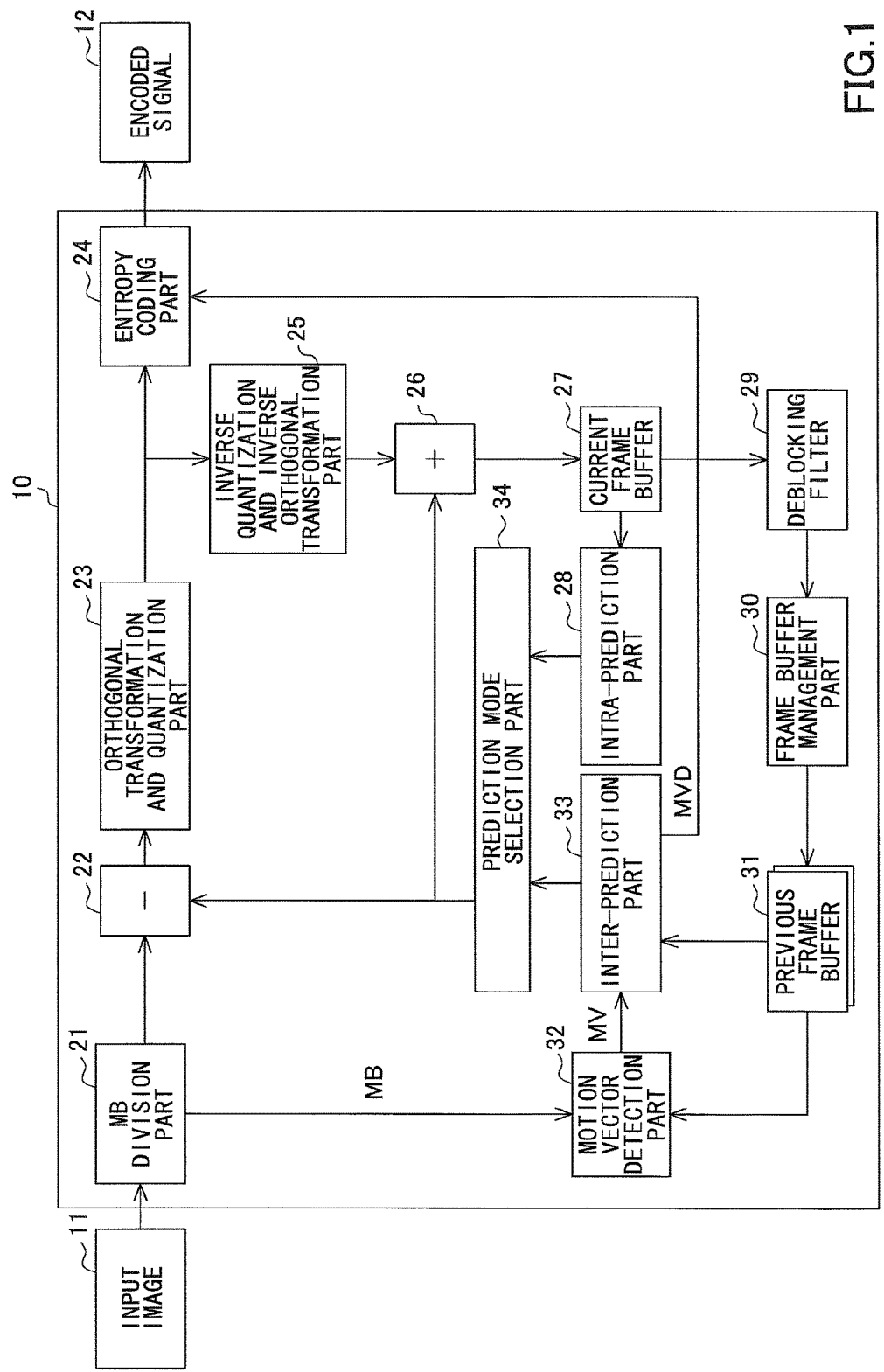
FIG. 1 is a schematic diagram illustrating an encoder circuit.

FIG. 1 is a schematic diagram illustrating an encoder circuit according to an embodiment. An encoder circuit 10 illustrated in FIG. 1 generates an encoded signal 12 into which an input signal 11 is encoded, in accordance with, for example, the MPEG-2 standard. Each part of the encoder circuit is, for example, a circuit constituting a part of the encoder circuit.

The macroblock division part (MB division part) 21 outputs an image in which the input image 11 is divided into process units (macroblocks [MBs]) to a subtractor 22 and a motion vector detection part 32.

The subtractor 22 calculates a difference between each macroblock and a predicted image output from a prediction mode selection part 34, and outputs the difference (difference value). An orthogonal transformation and quantization part 23 performs an orthogonal transformation and thereafter quantization on the difference value so as to output quantized data. The orthogonal transformation is, for example, a discrete cosine transform (DCT). An entropy coding part 24 performs variable-length coding on the data quantized by the orthogonal transformation and quantization part 23 so as to output the encoded signal 12.

An inverse quantization and inverse orthogonal transformation part 25 performs inverse quantization and thereafter an inverse orthogonal transformation on the data quantized by the orthogonal transformation and quantization part 23 so as to output processed data. The inverse orthogonal transformation is, for example, an inverse DCT (IDCT). An adder 26 adds the predicted image output from the prediction mode selection part 34 to the output data of the inverse quantization and inverse orthogonal transformation part 25 so as to generate a reference image. The reference image is retained in a current frame buffer 27.

An intra-prediction part 28, to which the reference image retained in the current frame buffer 27 is input, performs intra prediction on the reference image based on pixel levels from neighboring blocks. A deblocking filter 29, to which the reference image retained in the current frame buffer 27 is input, performs smoothing of the boundary between two neighboring macroblocks on and outputs the input reference image. As a result, the deblocking filter 29 reduces block distortion that is generated at the time of image coding. A frame buffer management part 30 outputs the output data of the deblocking filter 29 to a previous frame buffer 31, and the previous frame buffer 31 stores the output data.

The motion vector detection part 32 detects the motion vector (MV) of a current (target) macroblock Cu using the macroblocks input from the MB division part 21 and the reference image stored in the previous frame buffer 31. The motion vector is normally highly correlated with a surrounding area. An inter-prediction part 33 calculates a motion vector predictor MVP based on the motion vectors of surrounding areas. Furthermore, the inter-frame prediction part 33 calculates the motion vector difference MVD between the motion vector of the current macroblock Cu and the motion vector predictor MVP. The entropy coding part 24 outputs the encoded signal 12 that includes the motion vector difference MVD (prediction difference). A decoder (not graphically illustrated) calculates the motion vector based on the motion vector difference MVD so as to generate a decoded output image.

The prediction mode selection part 34 compares the prediction errors of the inter-prediction part 33 and the intra-prediction part 28, selects a coding mode capable of encoding the instant macroblock with most efficiency, and generates coding mode information. The coding mode information is passed to the entropy coding part 24 as encoding target information. The encoding target information includes the size of divisional macroblocks into which a macroblock is divided, and the size of sub-macroblocks into which a divisional macroblock is further divided.

Figure 2:
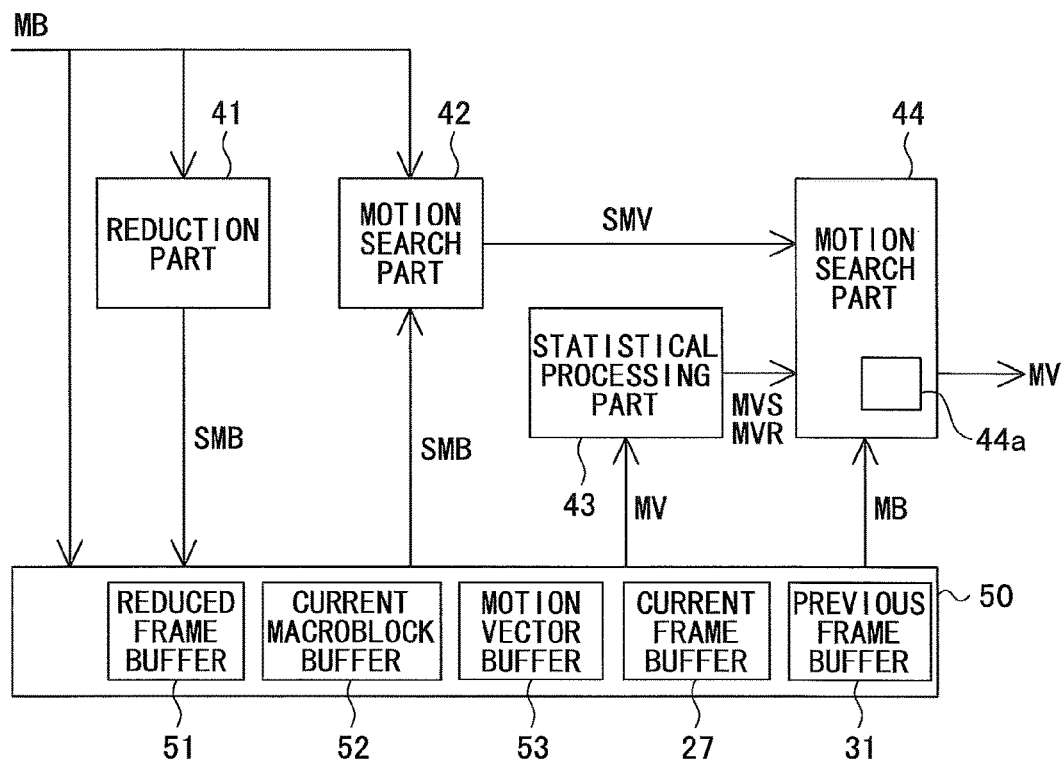
FIG. 2 is a block diagram illustrating a motion vector detection part of the encoder.

FIG. 2 is a block diagram illustrating the motion vector detection part 32. Referring to FIG. 2, the motion vector detection part 32 includes a reduction part 41, a motion search part 42, a statistical processing part 43, and a motion search part 44.

The reduction part 41 generates a reduced-size macroblock (SMB) to which a macroblock is reduced at a predetermined reduction ratio. The reduction ratio is, for example, 50% (½) in each of a horizontal direction and a vertical direction. The reduction part 41 generates a reduced-size macroblock by eliminating every other pixel of a macroblock in directions of pixel arrangement (a vertical direction and a horizontal direction), for example. The reduction part 41 stores generated reduced-size macroblocks in a reduced frame buffer 51 of a memory 50.

The reduction part 41 reduces macroblocks, which are units of processing into which a frame image is divided, in size one after another, and stores the reduced-size macroblocks in the reduced frame buffer 51. Accordingly, the reduced image of each frame image is stored in the reduced frame buffer 51. That is, with respect to the currently processed image, the reduced-size macroblock of the current macroblock Cu and the reduced-size macroblock of a macroblock that has been processed before the current macroblock Cu are stored. Furthermore, the reduced images of reference frames that have been captured at different times than and processed before the currently processed image are stored in the reduced frame buffer 51. The reference frames include backward reference frames (previous frames) captured before (earlier than) the currently processed image and forward reference frames (subsequent or future frames) captured after (later than) the currently processed image.

In the memory 50, the reduced frame buffer 51, a current macroblock buffer 52, and a motion vector buffer 53 are defined as storage areas. Furthermore, storage areas such as the current frame buffer 27 and the previous frame buffer 31 illustrated in FIG. 1 are defined in the memory 50. The memory 50 may be a memory module of an SDRAM (synchronous dynamic random access memory) or the like. Such a memory module is connected to, for example, a semiconductor device (LSI) including the functional parts of the encoder circuit 10.

The motion search part 42 reads a reduced-size macroblock corresponding to the current macroblock Cu from the reduced frame buffer 51 of the memory 50. Furthermore, the motion search part 42 reads a reduced reference image to which a reference image is reduced in size from the reduced frame buffer 51. Then, the motion search part 42 searches the reduced reference image using the reduced-size macroblock so as to detect the motion vector SMV of the reduced-size macroblock. Then, the motion search part 42 outputs the motion vector SMV to the motion search part 44.

For example, the motion search part 42 determines pixels included in the same range as the reduced-size macroblock in a set search range as a candidate block. The motion search part 42 compares the values of the pixels included in the reduced-size macroblock and the values of the pixels included in each candidate block so as to calculate an evaluation value. The evaluation value is, for example, a sum of absolute differences (SAD). The SAD is a total of the absolute values of the differences between the values of corresponding pixels. Alternatively, a sum of absolute transformed differences (SATD), a sum of squared differences (SSD) or the like may be used as the evaluation value.

Then, the motion search part 42 detects a candidate block corresponding to a current reduced-size macroblock based on the evaluation values. For example, the motion search part 42 detects a candidate block whose evaluation value is the smallest. Then, the motion search part 42 calculates a displacement from a macroblock (virtual macroblock) spatially at the same position as the current macroblock to the detected candidate block in the reference image. The motion search part 42 calculates the displacement based on the position of the detected candidate block and the position of the virtual macroblock. This displacement is the motion vector SMV of the current macroblock in the reduced image. The motion vector SMV is data (information) that indicate the position (shift and shift direction) of the candidate block relative to the current macroblock Cu.

The statistical processing part 43 generates search setting information in the motion search part 44 based on the motion vectors detected by previous motion searches. The search setting information is, for example, a statistical motion vector obtained by performing statistical processing on previous motion vectors.

For example, the statistical processing part 43 reads the motion vectors of neighboring blocks of a macroblock that is a target of processing in the currently processed image from the motion vector buffer 53. Then, the statistical processing part 43 performs statistical processing on the read motion vectors so as to generate the search setting information. The statistical processing is, for example, averaging. For example, the statistical processing part 43 calculates the average of the motion vectors that have been generated in the currently processed image, and determines this average as a first statistical motion vector MVS.

Furthermore, when there is a reference image subsequent to the currently processed image, the statistical processing part 43 reads the motion vectors of the reference image from the motion vector buffer 53. For example, the statistical processing part 43 reads the motion vector of a macroblock at the same position in the reference image as the macroblock that is a target of processing (hereinafter, "reference macroblock") and the motion vectors of the surrounding macroblocks of the reference macroblock in the reference image from the motion vector buffer 53. Then, the statistical processing part 43 performs statistical processing on the motion vectors of the reference image so as to generate the search setting information. The statistical processing is, for example, averaging. For example, the statistical processing part 43 calculates the average of the motion vectors of the subsequent reference image, and determines the average as a second statistical motion vector MVR.

The motion search part 44 sets search conditions for a search range in a reference image. Then, the motion search part 44 searches the search range in accordance with the set search conditions so as to generate the motion vector of the current macroblock Cu.

The search conditions include a search start position and a search direction (search order and a search path).

The motion search part 44 sets the search start position and the search direction in the search range based on the first statistical motion vector MVS and the second statistical motion vector MVR generated by the statistical processing part 43. The search start position is a position at which a candidate block is first set in the search range. The search direction is information indicating the order the positions of candidate blocks are set.

For example, the motion search part 44 sets, in a reference image of the original size, a search range that includes a macroblock (virtual macroblock) spatially at the same position as the current macroblock at the center and the eight surrounding macroblocks of the virtual macroblock. Then, the motion search part 44 sets the search start position and the search direction based on the direction of the first statistical motion vector MVS and the direction of the second statistical motion vector MVR. For example, the motion search part 44 determines to which of eight directions, namely, an upward direction, a downward direction, a rightward direction, a leftward direction, an upper-right direction, a lower-right direction, an upper-left direction, and a lower-left direction, the direction of the first statistical motion vector MVS corresponds based on the ratio of the vertical component and the horizontal component of the first statistical motion vector MVS. Likewise, the motion search part 44 determines to which of the eight directions the direction of the second statistical motion vector MVR corresponds based on the ratio of the vertical component and the horizontal component of the second statistical motion vector MVR. Then, the motion search part 44 sets the search start position and the search direction based on the determined direction of the first statistical motion vector MVS and the determined direction of the second statistical motion vector MVR.

The motion search part 44 sequentially sets candidate blocks according to the size (number of pixels) of the current macroblock Cu of the currently processed image in the search range set in the reference image. Then, the motion search part 44 calculates the evaluation value of each candidate block. The evaluation value is, for example, an SAD. Alternatively, an SSD, SATD or the like may be used as the evaluation value.

The motion search part 44 stores a reference threshold $\alpha$ and a determination threshold Gj set based on the reference threshold $\alpha$ in, for example, a register 44a. The motion search part 44 compares the evaluation value calculated with respect to each candidate macroblock and the determination threshold Gj. If the evaluation value is smaller than the determination threshold Gj, the motion search part 44 terminates the motion vector search with respect to the current macroblock Cu. Then, the motion search 44 stores the number of cycles at the time of the termination of the process in, for example, the register 44a.

The number of cycles is time required for searching out a motion vector with respect to a single macroblock. For example, it is assumed that a cycle required for calculating the evaluation value of a single candidate block with respect to the current macroblock Cu is "1." By way of example, it is assumed that the size of the search range is 48×48 pixels. In this case, letting the size of each of the current macroblock Cu and the candidate macroblocks be, for example, 16×16 pixels, it is possible to set 33 (48−16+1) macroblocks in each of a vertical direction and a horizontal direction. Accordingly, the number of cycles of the motion search in a single search range is 1089 (33×33).

In the currently processed image, it is often the case that the motion vector of the current macroblock Cu and the motion vectors of the surrounding macroblocks of the current macroblock Cu present high correlation. Likewise, when there is a subsequent reference image, it is often the case that a motion vector in a region (reference region) that includes a macroblock (reference macroblock C1) spatially at the same position as the current macroblock Cu in the subsequent reference image presents high correlation with the motion vector of the current macroblock Cu. That is, it is often that case that a block equal or similar to the current macroblock Cu exists in a direction indicated by the motion vectors of the surrounding macroblocks or the macroblocks of the subsequent reference image. Accordingly, by determining the search start position and the search direction based on the motion vectors calculated in previous processes, the time required before detection of a similar candidate block after the start of a search is reduced.

Then, the motion search part 44 terminates the motion search with respect to the search range in response to detecting a similar candidate block based on the determination threshold Gj. Then, the motion search part 44 generates the motion vector of the current macroblock Cu based on the position of the similar candidate block. As a result, the time required for generating a motion vector with respect to the current macroblock Cu is reduced, so that the efficiency of a search process is improved.

Furthermore, the search conditions include the size (number of pixels) of a search range and a direction in which the search range is to be extended.

As described above, the motion search part 44 terminates a motion search with respect to the current macroblock Cu based on the determination threshold Gj. In this case, the remaining process period may be used as the process period of the next macroblock to be processed. That is, it is possible to lengthen the period of processing in the next macroblock to be processed. Then, the evaluation value of a single candidate block is calculated in one cycle. Accordingly, the process period is commensurate with the number of candidate blocks for which the evaluation value is calculated. That is, it is possible to enlarge an area to be searched in accordance with the remaining process period.

For example, it is assumed that the above-described search range of 48×48 pixels is a base search range, and that an area to be searched outside this base search range is an extended search range. The motion search part 44 sets the size (number of pixels) of the extended search range based on the number of cycles at the time of the termination of the process, that is, the number of cycles stored in the register 44a.

With respect to the set search range (base search range and extension search range), the motion search part 44 determines a period according to the range as a search period. Then, the motion search part 44 divides the search period into multiple sub periods, and adjusts the determination threshold Gj with respect to each sub period. For example, the motion search part 44 gradually increases the determination threshold Gj from a value corresponding to the number of sub periods to the reference threshold α with respect to the sub periods.

The motion search part 44 divides the search period into multiple sub periods using cycles into which a period required for searching the base search range (reference search period) is equally divided by a predetermined number as units. The motion search part 44 determines whether to terminate a search process based on the set determination threshold Gj in the multiple sub periods except the last sub period. In the last sub period of the set sub periods, the motion search part 44 performs the search up to the last candidate block. Thus, by determining the evaluation value of a candidate block based on a smaller determination threshold Gj at the start of a search with respect to the current macroblock Cu, it is possible to perform detection with high accuracy.

Furthermore, the motion search part 44 determines the position of the extension search range based on the above-described statistical information (the first statistical motion vector MVS and the second statistical motion vector MVR). By setting the extension search range based on the motion vectors of previously processed macroblocks, it is possible to set a search range appropriate to the motion vector of the current macroblock Cu in a reference image. Accordingly, it is possible to efficiently detect the motion vector MV of the current macroblock Cu. Furthermore, it is possible to detect the motion vector MV with accuracy.

Furthermore, the search range includes the position (offset) of a search range.

The motion search part 44 sets the position (offset) of a search range based on the motion vector SMV input from the motion search part 42 with respect to each macroblock that serves as the unit of processing of a motion search. Because the motion vector SMV is a motion vector searched out based on a reduced image, the motion vector SMV is used with values (size) increased in accordance with the reduction ratio. For example, the reduction part 41 generates a reduced image whose pixels are reduced by half in a horizontal direction and a vertical direction, and the motion search part 42 performs a motion search using the reduced image. Accordingly, the motion search part 44 uses the motion vector SMV by doubling the horizontal and vertical values expressed by the motion vector SMV.

The motion search part 44 uses part of a decoded image stored in the previous frame buffer 31 as a reference image.

The motion search part 44 determines, as a search center, a position offset in accordance with the motion vector SMV from a reference point (for example, the center) of a reference macroblock at a position equal to the current macroblock Cu in the reference image. For example, it is assumed that the horizontal and vertical values of the motion vector SMV are Vx and Vy, respectively. In this case, relative to the coordinates of the reference point (Px, Py), the coordinates of the search center (Sx, Sy) are given by Sx=Px+2Vx, and Sy=Py+2Vy. Then, the search range is determined based on this search center.

By thus determining the position of a search range based on the motion vector SMV detected with a reduced image, it is possible to set a search range appropriate to the motion vector of the current macroblock Cu in a reference image. Accordingly, it is possible to efficiently detect the motion vector MV of the current macroblock. Furthermore, it is possible to accurately detect the motion vector MV.

A description is given of types of pictures and reference relationships.

Figure 3:
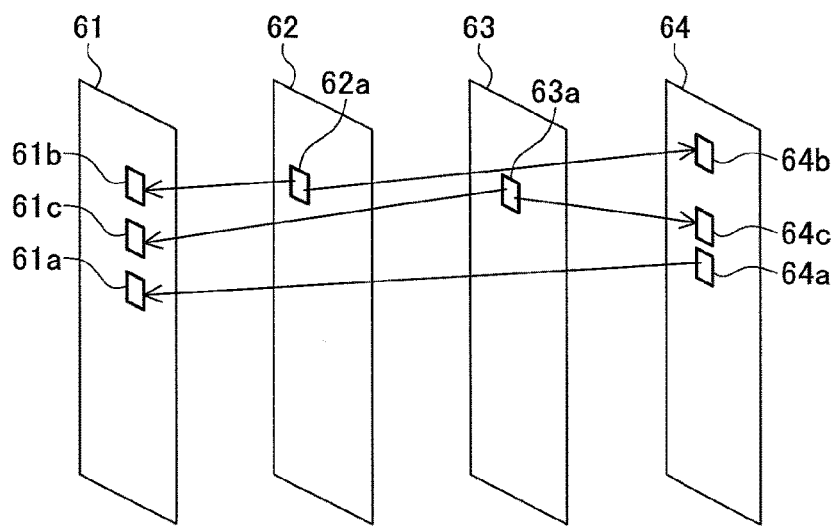
FIG. 3 is a diagram illustrating pictures to be encoded.

FIG. 3 is a diagram illustrating pictures to be encoded. Referring to FIG. 3, four images (pictures) 61, 62, 63 and 64 are captured in this order.

The picture 61 is, for example, an I-picture (I-frame [intra-coded frame]) and is encoded by intra prediction.

The picture 64 is a P-picture (P-frame [predicted frame]). A macroblock 64a included in the picture 64 is equal or similar to a macroblock 61a included in the picture 61. In the encoding of the picture 64, a motion vector search using the picture 61 as a reference image (backward reference image) is performed so as to encode reference information in the macroblock 64a.

The picture 62 is a B-picture (B-frame [bi-directional predicted frame]). A macroblock 62a included in the picture 62 is equal or similar to a macroblock 61b included in the previous picture 61. Furthermore, the macroblock 62a is equal or similar to a macroblock 64 included in the subsequent or future picture 64. In the encoding of the picture 62, a motion vector search using the picture 61 and the picture 64 as reference images (forward reference, backward reference, and bi-directional reference) is performed so as to encode reference information in the macroblock 62a.

The picture 63 is a B-picture. A macroblock 63a included in the picture 63 is equal or similar to a macroblock 61c included in the preceding picture 61. Furthermore, the macroblock 63a is equal or similar to a macroblock 64c included in the subsequent picture 64. In the encoding of the picture 63, a motion vector search using the picture 61 and the picture 64 as reference images (forward reference, backward reference, and bi-directional reference) is performed so as to encode reference information in the macroblock 63a.

Next, a description is given of a reference image and a macroblock in a P-picture.

FIG. 4 is a diagram illustrating inter-picture backward reference. Referring to FIG. 4, three images (pictures) 71, 72 and 73 are captured in this order. The currently processed image 73 includes four macroblocks 73a, 73b, 73c and 73d. The currently processed image 73 is a P-picture. The macroblock 73a is equal or similar to a macroblock 71a of the previous reference image 71 (earlier than the currently processed image 73 in temporal order). The reference image 71 is an I-picture or a P-picture, and has been encoded before the currently processed image 73. Accordingly, in the currently processed image 73, a difference from information indicating the macroblock 71a included in the reference image 71 is encoded.

The macroblock 73b of the currently processed image 73 is equal or similar to a macroblock 72a of the previous reference image 72. The reference image 72 is an I-picture or a P-picture, and has been encoded before the currently processed image 73. Accordingly, in the currently processed image 73, a difference from information indicating the macroblock 72a included in the reference image 72 is encoded.

Likewise, the macroblocks 73c and 73d of the currently processed image 73 are equal or similar to macroblocks 72b and 72c, respectively, of the previous reference image 72. In the currently processed image 73, a difference from information indicating the macroblocks 72b and 72c included in the previous reference image 72 is encoded.

Next, a description is given of a reference image and a macroblock in a B-picture.

FIG. 5 is a diagram illustrating inter-picture forward reference and backward reference. Referring to FIG. 5, five images (pictures) 81, 82, 83, 84 and 85 are captured in this order. The currently processed image 83 includes four macroblocks 83a, 83b, 83c and 83d. The currently processed image 83 is a B-picture. The macroblock 83a is equal or similar to a macroblock 81a of the previous reference image 81 (earlier than the currently processed image 83 in temporal order). The reference image 81 is an I-picture or a P-picture, and has been encoded before the currently processed image 83. Accordingly, in the currently processed image 83, a difference from information indicating the macroblock 81a included in the reference image 81 is encoded.

The macroblock 83b of the currently processed image 83 is equal or similar to a macroblock 82a of the previous reference image 82. Furthermore, the macroblock 83b is equal or similar to a macroblock 84a of the subsequent (future) reference image 84 (later than the currently processed image 83 in temporal order). The reference image 84 is an I-picture or a P-picture, and has been encoded before the currently processed image 83. Accordingly, in the currently processed image 83, a difference from information indicating the macroblocks 82a and 84a included in the reference images 82 and 84, respectively, is encoded.

The macroblock 83c of the currently processed image 83 is equal or similar to a macroblock 85a of the subsequent reference image 85. The reference image 85 is an I-picture or a P-picture, and has been encoded before the currently processed image 83. Accordingly, in the currently processed image 83, a difference from information indicating the macroblock 85a included in the reference image 85 is encoded.

The macroblock 83d of the currently processed image 83 is equal or similar to a macroblock 82b of the previous reference image 82. Furthermore, the macroblock 83d is equal or similar to a macroblock 84b of the subsequent reference image 84. Accordingly, in the currently processed image 83, a difference from information indicating the macroblocks 82b and 84b included in the reference images 82 and 84, respectively, is encoded.

Next, a description is given of the order of processing and the process of calculating the motion vector predictor MVP and the motion vector difference MVD in a picture.

Figure 6:
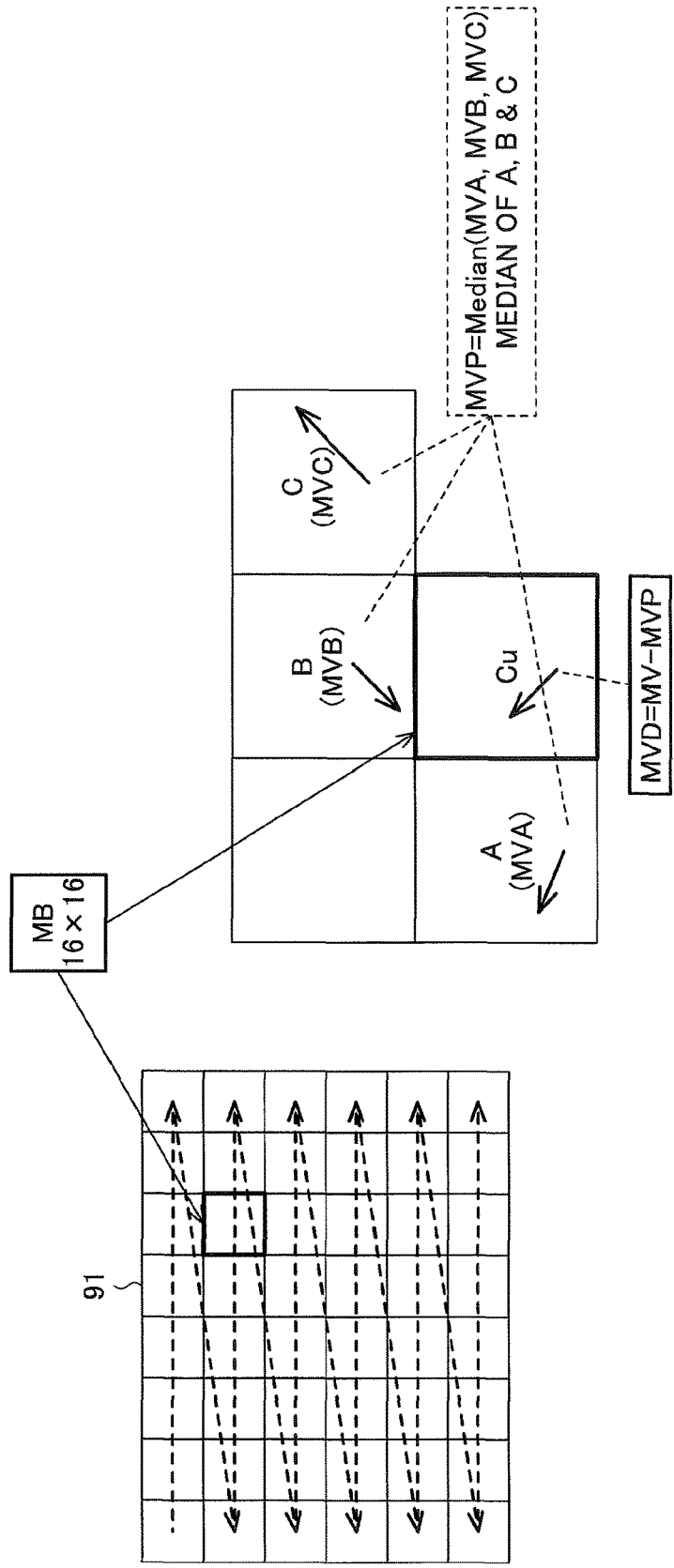

FIG. 6 is a diagram illustrating order macroblocks are processed and calculation of the motion vector predictor MVP and so on. Referring to FIG. 6, a single picture (frame) 91 includes multiple (8×6) macroblocks arranged in a matrix. Each macroblock is a pixel matrix of, for example, 16 pixels in a horizontal direction and 16 pixels in a vertical direction.

As indicated by broken arrows in FIG. 6, coding is performed with respect to each set (line) of macroblocks arranged in a raster scan direction. That is, the macroblocks of the topmost line are first encoded in order from the left-end macroblock to the right-end macroblock. Next, the macroblocks at the second line from the top are encoded in order from the left-end macroblock to the right-end macroblock. Thereafter, the encoding of macroblocks in order from the left-end macroblock to the right-end macroblock is repeated line by line until the macroblocks of the bottom-most line are encoded.

In FIG. 6, a macroblock that is a target of processing (current macroblock) is indicated by "Cu". The motion vector predictor MVP is calculated based on the motion vectors MVA, MVB and MVC of the surrounding macroblocks "A," "B" and "C" of the current macroblock Cu. The motion vector predictor MVP is the median of the motion vectors MVA, MVB and MVC of the surrounding macroblocks "A," "B" and "C." That is, the motion vector predictor MVP is calculated by MVP=Median (MVA, MVB, MVC). The "Median" is an arithmetic operator that returns a median. Then, the motion vector difference MVD is calculated, based on the motion vector MV of the current macroblock Cu and the motion vector predictor MVP, by MVD=MV−MVP.

Next, an overview is given of the motion vector search.

Figure 7A:
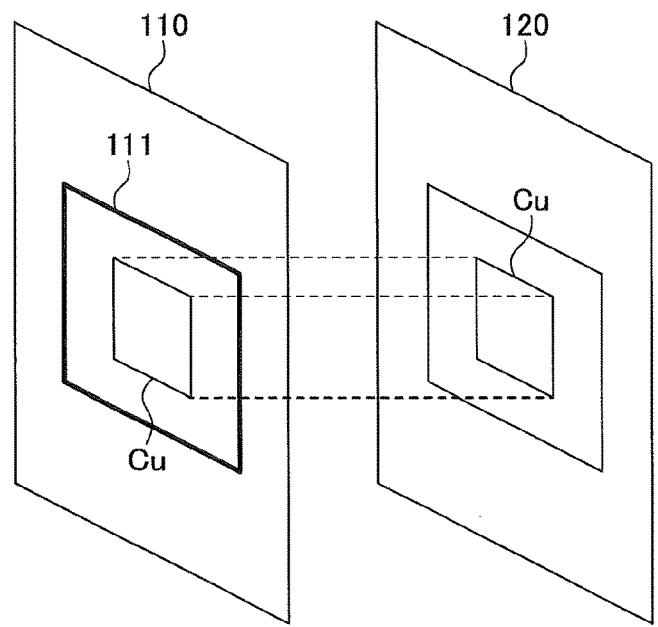
FIGS. 7A and 7B are diagrams illustrating a motion vector search in a currently processed image.
Figure 7B:
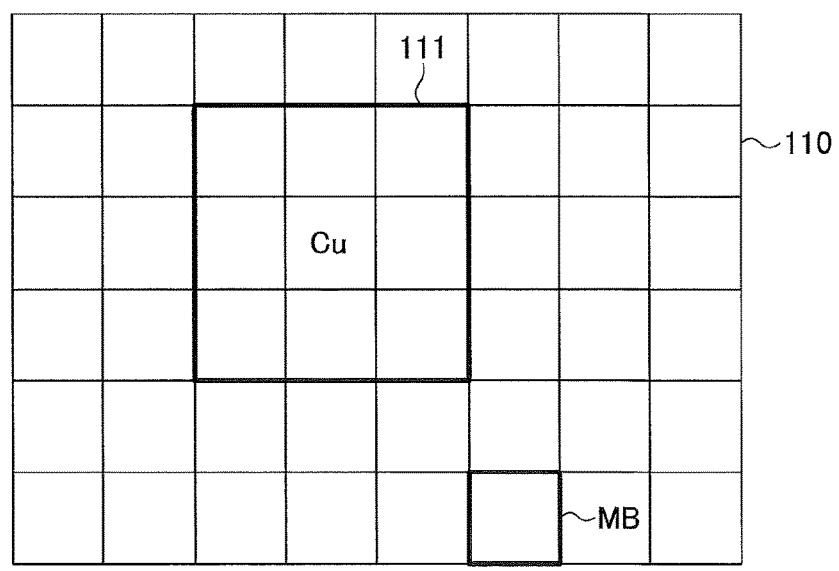

FIGS. 7A and 7B are diagrams illustrating a motion vector search in a currently processed image. As illustrated in FIG. 7A, the motion vector of the current macroblock Cu included in a currently processed image 120 is detected. The detection employs a reference image 110 that is an image temporally different from the currently processed image 120 and has been encoded before the currently processed image 120. In the reference image 110, a search range 111 that includes a virtual macroblock spatially at the same position as the current macroblock Cu is set. The virtual macroblock corresponding to the current macroblock Cu may be referred to by the same reference symbol "Cu" for its explicit indication. The motion search searches for a candidate block whose evaluation value is the smallest relative to the current macroblock Cu within the search range 111.

As illustrated in FIG. 7B, the size of the search range 111 is determined so as to include the virtual macroblock Cu and the eight surrounding macroblocks of the virtual macroblock Cu. The current macroblock Cu is, for example, a pixel matrix of 16×16 pixels. Based on this macroblock size, the size of the search range 111 is determined so as to include ±16 pixels in each of a horizontal direction and a vertical direction relative to the current macroblock Cu. In the case of this setting, the size of the search range 111 is 48×48 pixels (which is a size including 3×3 macroblocks).

Here, a description is given of a full search of a search range.

Figure 11B:
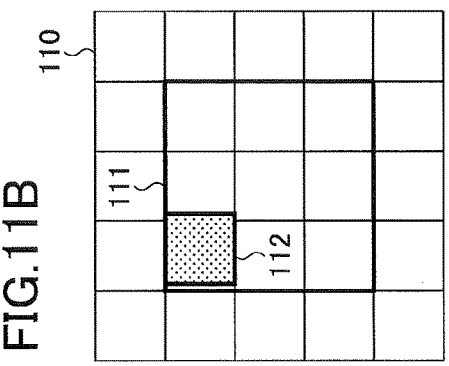
Figure 11A:
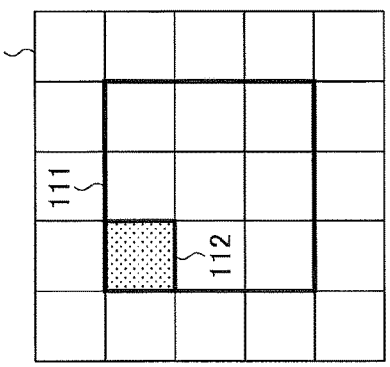

FIGS. 11A through 11F are diagrams illustrating a full search in a motion search. First, as illustrated in FIG. 11A, a candidate block 112 is set at the top left of the search range 111. Then, an evaluation value is calculated based on the pixel values of the pixels included in the candidate block 112 and the pixel values of the pixels included in the current macroblock Cu. As described above, the evaluation value is, for example, an SAD. The evaluation value thus calculated is stored in correlation with the position information of the candidate block 112. For example, in the case of performing this search in the motion search part 44 illustrated in FIG. 2, the calculated evaluation value is stored in, for example, a buffer included in the motion search part 44. The evaluation values calculated in the following description also are stored in the same manner.

Next, as illustrated in FIG. 11B, the candidate block 112 is shifted rightward by one pixel in the search range 111. Then, the evaluation value of this candidate block 112 is calculated. In this manner, the evaluation value of the candidate block 112 is successively calculated by shifting the candidate block 112 rightward one pixel by one pixel. Then, when the evaluation value of the candidate block 112 set at the right end in the search range 111 is calculated as illustrated in FIG. 11C, the same process as described above is performed on the candidate block 112 shifted downward by one pixel from the top left block.

That is, as illustrated in FIG. 11D, the candidate block 112 is set at the position shifted downward by one pixel from the top end at the left end in the search range 111. Then, the evaluation value of this candidate block 112 is calculated. Then, as illustrated in FIG. 11E, the candidate block 112 is shifted rightward by one pixel in the search range 111. Then, the evaluation value of this candidate block 112 is calculated. In this manner, the setting position of the candidate block 112 is shifted one pixel by one pixel, and the evaluation value of the candidate block 112 set at each position is calculated. Then, as illustrated in FIG. 11F, the candidate block 112 is set at the bottom right of the search range 111, and the evaluation value of this candidate block 112 is calculated.

In this manner, the evaluation values of all the candidate blocks 112 set in the search range 111 are calculated and stored, and the position information of the candidate block 112 correlated with the smallest one of all the stored evaluation values is obtained.

Figure 12:
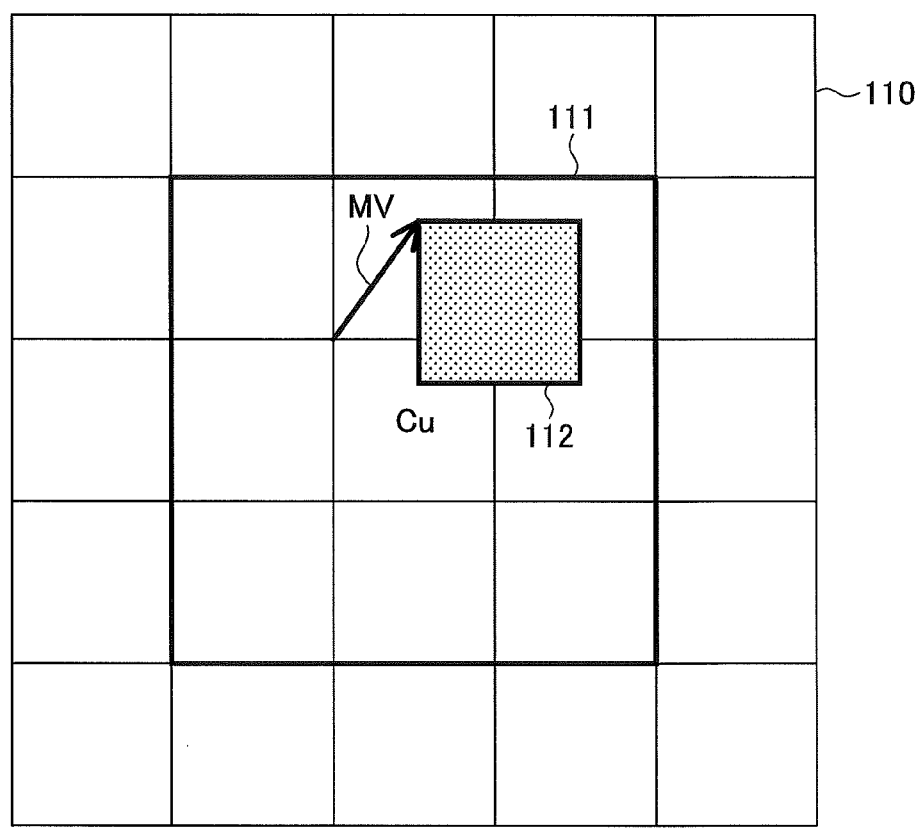
FIG. 12 is a diagram illustrating a reference image, a search range, and a search result.

For example, as illustrated in FIG. 12, the candidate block 112 whose evaluation value is the smallest is detected by the above-described motion search. Then, the displacement from the virtual macroblock Cu to the detected candidate block 112 is calculated in the reference image 110. This displacement is the motion vector MV of the current macroblock Cu.

Next, a description is given of a motion search with reduced images.

Figure 8A:
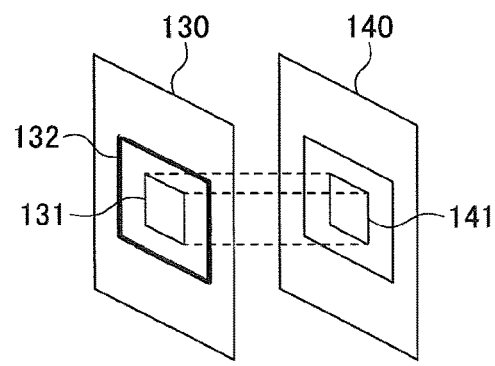
FIGS. 8A and 8B are diagrams illustrating a motion vector search in a reduced image.
Figure 8B:
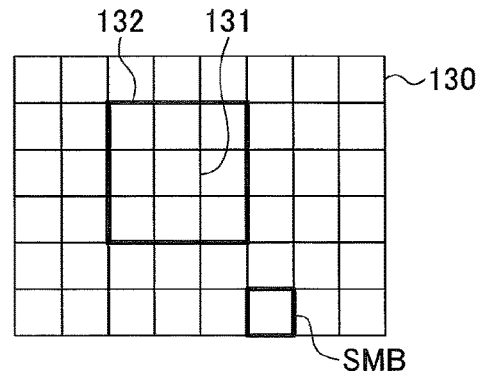

FIGS. 8A and 8B are diagrams illustrating a motion vector search in a reduced image. The reduced image of each of the currently processed image 120 and the reference image 110 illustrated in FIG. 7A is generated.

Referring to FIG. 8A, a reduced-size image 140 is obtained by reducing the currently processed image 120 illustrated in FIG. 7A by, for example, ½ in size. Likewise, a reduced reference image 130 is obtained by reducing the reference image 110 illustrated in FIG. 7A by, for example, ½ in size. A reduced-size macroblock 141 included in the reduced-size image 140 is obtained by reducing the current macroblock Cu illustrated in FIG. 7A by ½ in size. With respect to this reduced-size macroblock 141, a search range 132 whose center is at a virtual macroblock 131 spatially at the same position as the reduced-size macroblock 141 is set in the reduced reference image 130.

As illustrated in FIG. 8B, the size of the search range 132 is determined in accordance with the virtual macroblock 131 and the size of the virtual macroblock 131. A single reduced-size macroblock SMB is, for example, a pixel matrix of 8×8 pixels. Based on this size of the reduced-size macroblock SMB, the search range 132 is determined so as to include, for example, ±8 pixels in each of a horizontal direction and a vertical direction relative to the reduced-size macroblock SMB. In the case of this setting, the size of the search range 132 is 24×24 pixels. In this search range 132, a search is performed using the current reduced-size macroblock SMB.

Figure 9A:
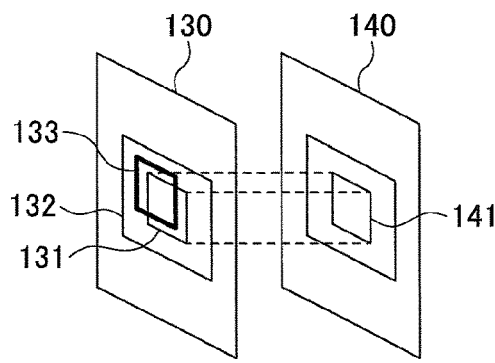
FIGS. 9A and 9B are diagrams illustrating the motion vector search in the reduced image.
Figure 9B:
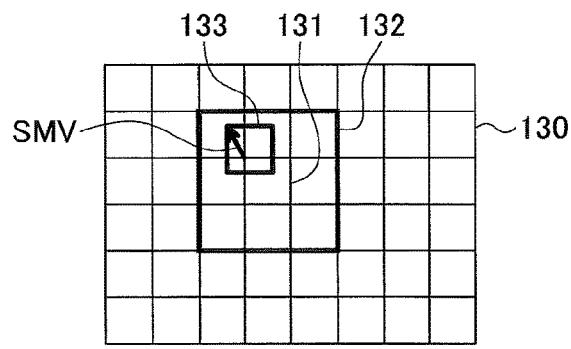

As illustrated in FIG. 9A, a candidate block 133 whose evaluation value is the smallest relative to the reduced-size macroblock SMB is detected in the search range 132. Then, as illustrated in FIG. 9B, the displacement (motion vector SMV) of the candidate block 133 relative to the virtual macroblock 131 is calculated. Based on the motion vector detected in this manner, the motion vector MV is detected with respect to the original size image.

Figure 10A:
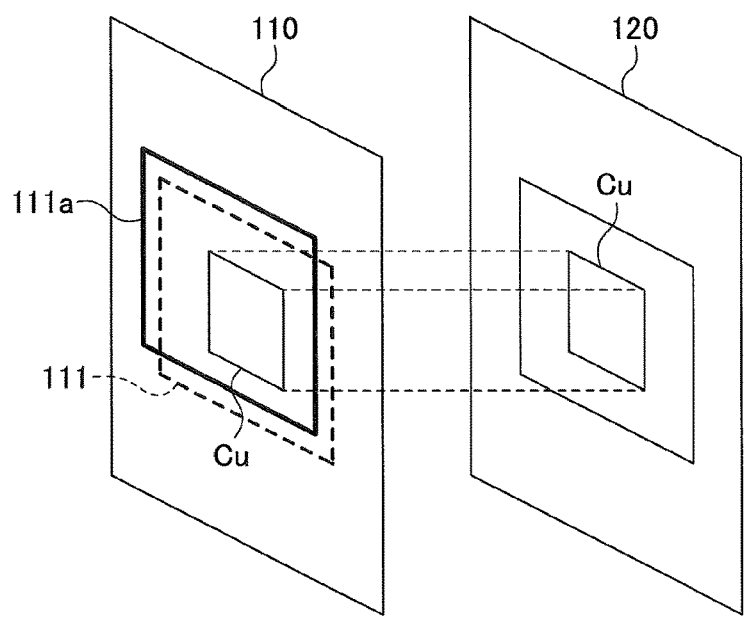
FIGS. 10A and 10B are diagrams illustrating a motion vector search in the currently processed image.

That is, as illustrated in FIG. 10A, in the reference image 110, a search range is determined based on the motion vector SMV detected as described above. The motion vector SMV is a motion vector searched out with the reduced-size image 140 and the reduced reference image 130 (see FIG. 8A) to which the currently processed image 120 and the reference image 110 are reduced by ½, respectively. Therefore, a virtual motion vector PMV is calculated by doubling each of the horizontal component and the vertical component of the motion vector SMV. The virtual motion vector PMV indicates a location where a candidate block whose evaluation value is the smallest with respect to the current macroblock Cu can be present with high probability.

Figure 10B:
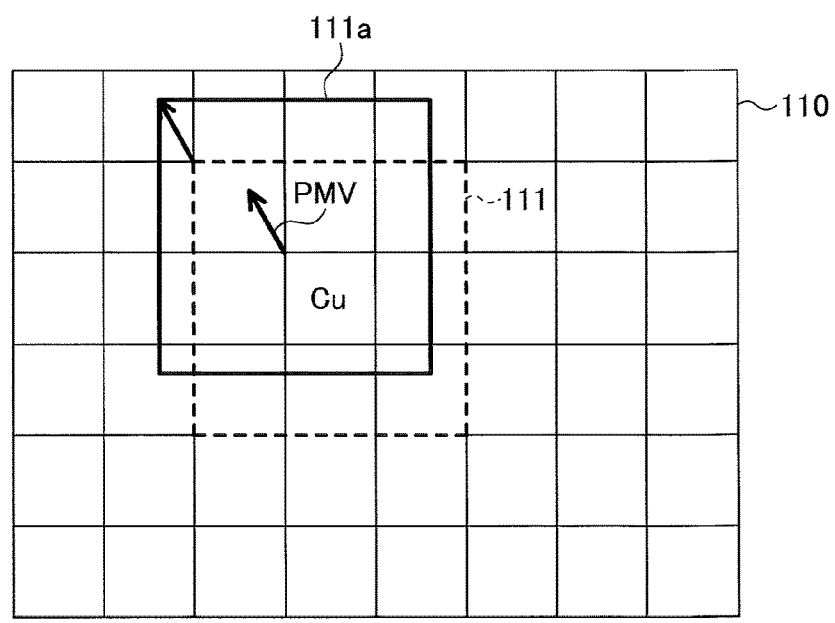

Therefore, as illustrated in FIG. 10B, a search range is set in the reference image 110 in accordance with the virtual motion vector PMV. For example, a search range 111a to which the search range 111 whose center is at the virtual macroblock Cu is offset in accordance with the virtual motion vector PMV is set. It is highly probable that the candidate block 112 that has the smallest evaluation value in correspondence to the current macroblock Cu is present at the center of the search range 111a thus determined. That is, pixels whose difference from the pixels of the current macroblock Cu is the smallest are included in the center of the search range 111a thus determined. On the other hand, pixels whose difference from the pixels of the current macroblock Cu are included in a region between the search range 111a and the search range 111 outside the search range 111a. Accordingly, by thus setting the offset search range 111a, it is possible to perform an efficient search.

Figure 13:
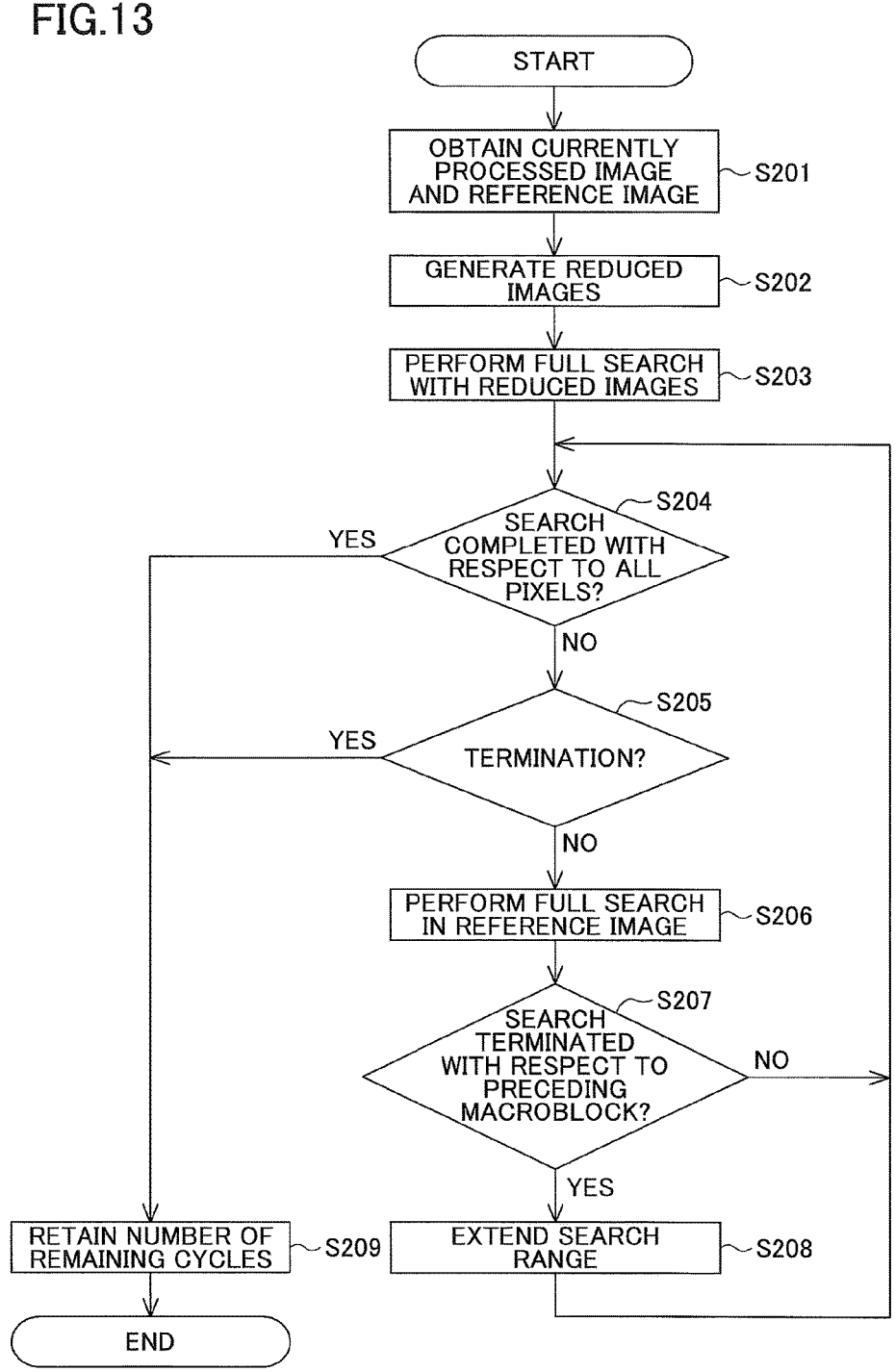
FIG. 13 is a flowchart illustrating a process according to an embodiment.

FIG. 13 is a flowchart functionally illustrating a process performed on a single macroblock in the motion vector detection part 32. It is also possible to perform a process for detecting a motion vector in accordance with this flowchart.

First, at step S201, a currently processed image and a reference image are obtained. Then, at step S202, a reduced image is generated for each of the currently processed image and the reference image. Next, at step S203, a search is performed in accordance with the full search process using the reduced images (reduced-size image and reduced reference image) so as to detect the motion vector SMV of the current macroblock Cu.

Next, at step S204, it is determined whether the search is completed with respect to all pixels. If the search is not completed with respect to all the pixels included in a search range (NO at step S204), the process proceeds to step S205. Next, at step S205, it is determined whether the process is to be terminated. If the process is not to be terminated (NO at step S205), the process proceeds to step S206.

At step S206, a search range is set in the reference image based on the motion vector SMV detected with the reduced images. Furthermore, a search start position Gs and a search direction Sd are set based on the statistical results of motion vectors in the currently processed image and motion vectors in a forward reference image (statistical motion vectors). Then, a search is performed in the search range in the reference image in accordance with the full search process.

Next, at step S207, it is determined whether there has been termination in a search process with respect to a preceding macroblock. If there has been termination (YES at step S207), the process proceeds to step S208. On the other hand, if there has been no termination (NO at step S207), the process proceeds to step S204.

At step S208, the search range is extended in accordance with the state of the termination in the search process with respect to the preceding macroblock. At this point, the size of an extension area is determined based on the number of cycles retained in the register 44a. Furthermore, a direction in which the area is to be extended is determined based on the statistical motion vectors MVS and MVR. Then, the process proceeds to step S204.

If it is determined at step S204 that the search is completed with respect to all pixels (YES at step S204), the process proceeds to step S209. Furthermore, if it is determined at step S205 that the process is to be terminated (YES at step S205), the process proceeds to step S209. At step S209, the remaining number of cycles is stored in the register 44a, and the process with respect to the current macroblock Cu ends.

Next, a description is given of a process according to a comparative example.

Figure 14:
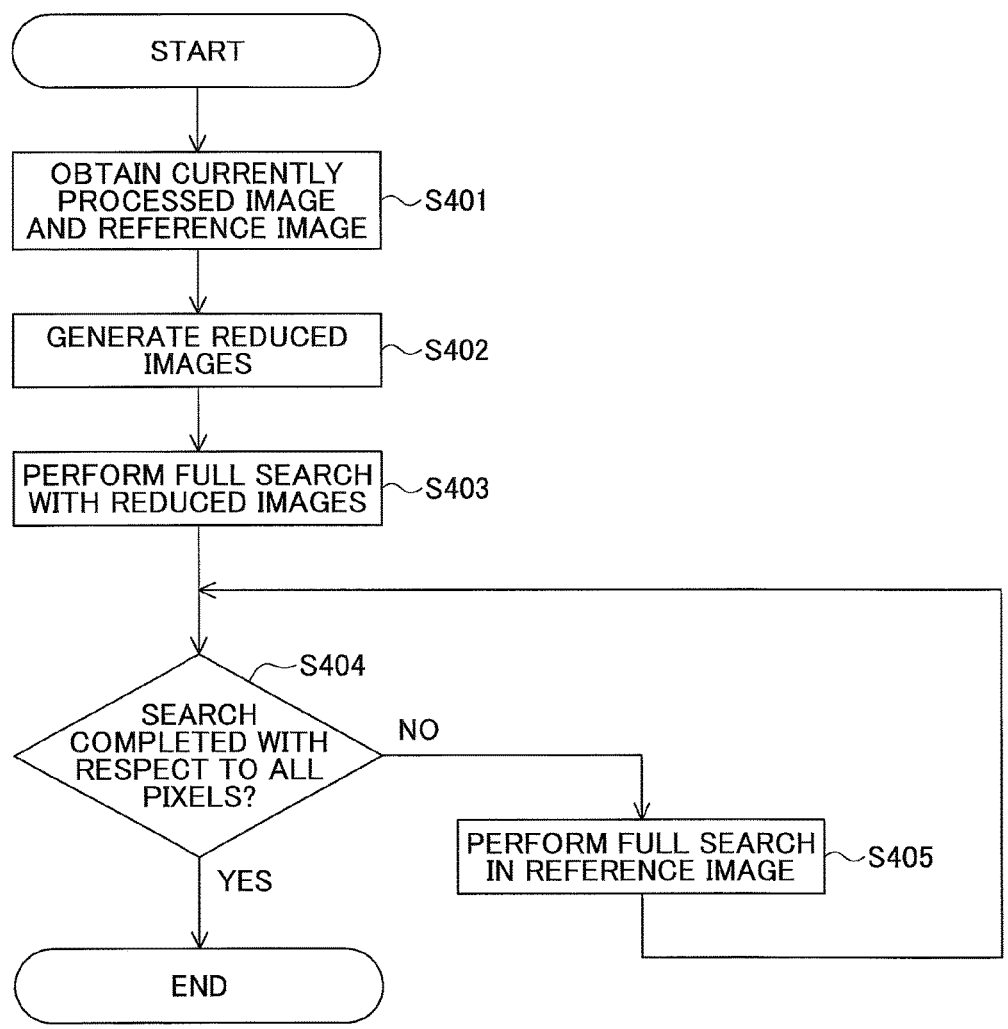
FIG. 14 is a flowchart illustrating a process according to a comparative example.

FIG. 14 is a flowchart illustrating a process according to a comparative example. As illustrated in FIG. 14, at step S401, a currently processed image and a reference image are obtained. At step S402, a single reduced image is generated for each of the currently processed image and the reference image (a reduced-size image and a reduced reference image). At step S403, a search is performed in accordance with the full search process using the reduced images (reduced-size image and reduced reference image) so as to detect the motion vector SMV of the current macroblock Cu. At step S404, it is determined whether the search is completed with respect to all pixels. If the search is completed with respect to all the pixels included in a search range (YES at step S404), the process ends. If the search is not completed with respect to all the pixels (NO at step S404), the process proceeds to step S255. At step S405, a search range is set in the reference image based on the detected motion vector SMV, and a search is performed in the search range in accordance with the full search process.

Next, a description is given of motion vectors used for statistical processing.

Figure 15:
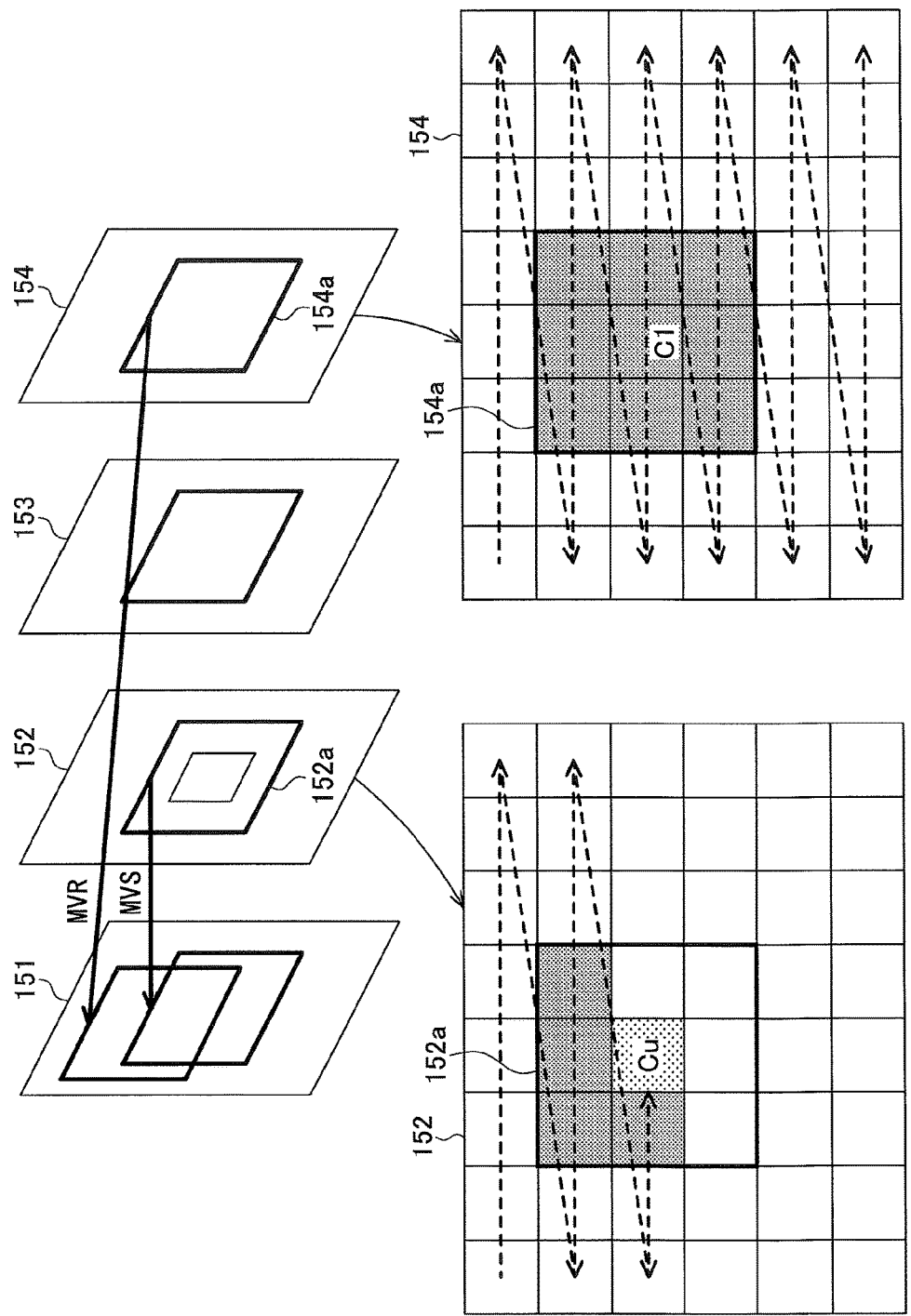
FIG. 15 is a diagram illustrating macroblocks used in statistical processing.

FIG. 15 is a diagram illustrating macroblocks used for statistical processing. As illustrated in FIG. 15, four images (pictures) 151, 152, 153 and 154 are captured in this order. For example, the picture 151 is an I-picture or a P-picture, the picture 154 is a P-picture, and the pictures 152 and 153 are B-pictures.

For example, it is assumed that the picture 152 is a currently processed image, and the motion vector of a current macroblock Cu included in this currently processed image 152 is detected. At this point, in the currently processed image 152, macroblocks have been encoded in order from the top left macroblock along a raster direction (indicated by broken arrows), and motion vectors have been generated with respect to these macroblocks. The motion vectors obtained by referring to the previous reference image 151 from the currently processed image 152 are used in, of these encoded macroblocks, those included in a reference region 152a whose center is at the current macroblock Cu (the macroblocks indicated by darker hatching than the current macroblock Cu). The reference region 152a is set to the same size as the search range 111 illustrated in FIG. 7B, for example. The statistical motion vector MVS is generated by performing statistical processing on (averaging) the motion vectors of these macroblock.

The picture 154 (forward reference image) subsequent to the currently processed image 152 is a P-picture, and this forward reference image 154 refers to the previous picture (backward reference image) 151. All the macroblocks included in this forward reference image 154 have been encoded before the currently processed image 152, and their respective motion vectors have been generated. In this forward reference image 154, the motion vectors obtained by referring to the backward reference image 151 from the forward reference image 154 are used in the macroblocks included in a reference region 154a whose center is at a reference macroblock C1 spatially at the same position as the current macroblock Cu of the currently processed image 152. Then, the statistical motion vector MVR is generated by performing statistical processing on (averaging) the motion vectors of the forward reference image 154.

[Search Start Position and Search Direction]

Next, a description is given of cases of a search start position and a search direction.

FIGS. 16A through 16E are diagrams illustrating CASE 1 of a search start position and a search direction. As illustrated in FIG. 16A, in the four images (pictures) 151 through 154, the first statistical motion vector MVS in the reference region 152a of the picture 152, which is a currently processed image, indicates an upper-right direction relative to a search range 151a in the reference picture 151. Furthermore, the second statistical motion vector MVR in the reference region 154a of the picture 154, which is a forward reference image to the picture 152, indicates an upper-right direction relative to the search range 151a in the reference picture 151. That is, as illustrated in FIG. 16B, the first statistical motion vector MVS in the reference region 152a indicates an upper-right direction. Furthermore, as illustrated in FIG. 16C, the second statistical motion vector MVR in the reference region 154a indicates an upper-right direction. This case is determined as CASE 1.

As illustrated in FIG. 16D, in CASE 1, the search start position Gs is to the upper right of a virtual macroblock C0 in the search range 151a. Then, as illustrated in FIG. 16E, the search direction Sd is determined so that a search is obliquely performed to the lower left from the search start position Gs. In FIG. 16E, numbers in squares indicate search order. A search is thus performed alternately on one and the other of the right and left sides of the search direction Sd.

Figure 17A:
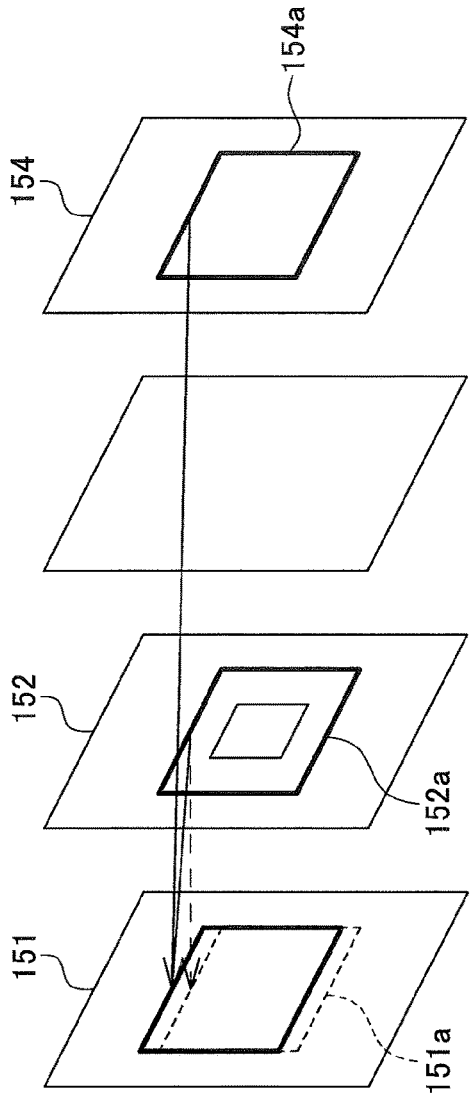
FIGS. 17A through 17E are diagrams illustrating CASE 2 of the search start position and the search direction.
Figure 17E:
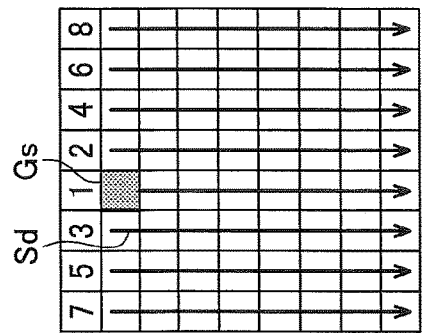
Figure 17D:
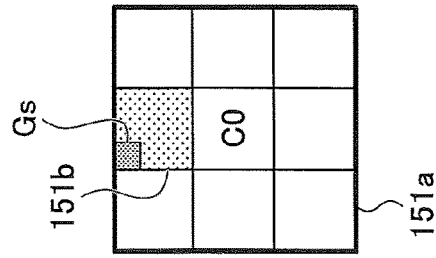
Figure 17C:
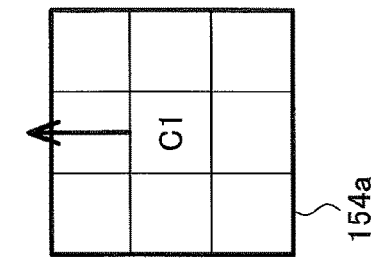
Figure 17B:
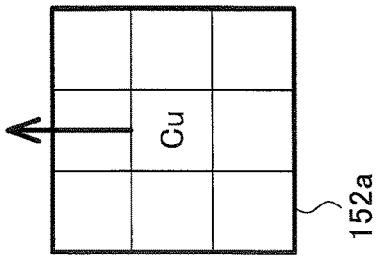

FIGS. 17A through 17E are diagrams illustrating CASE 2 of a search start position and a search direction. As illustrated in FIG. 17A, the first statistical motion vector MVS in the reference region 152a of the picture 152 indicates an upward direction relative to the search range 151a in the picture 151. Furthermore, the second statistical motion vector MVR in the reference region 154a of the picture 154 indicates an upward direction relative to the search range 151a in the picture 151. That is, as illustrated in FIG. 17B, the first statistical motion vector MVS in the reference region 152a indicates an upward direction. Furthermore, as illustrated in FIG. 17C, the second statistical motion vector MVR in the reference region 154a indicates an upward direction. This case is determined as CASE 2.

As illustrated in FIG. 17D, in CASE 2, the search start position Gs is above the virtual macroblock C0 in the search range 151a. Then, as illustrated in FIG. 17E, the search direction Sd is determined so that a search is performed downward from the search start position Gs. In FIG. 17E, numbers in squares indicate search order. A search is thus performed alternately on one and the other of the right and left sides of the search direction Sd.

FIGS. 18A through 18E are diagrams illustrating CASE 3 of a search start position and a search direction. As illustrated in FIG. 18A, the first statistical motion vector MVS in the reference region 152a of the picture 152 indicates an upper-left direction relative to the search range 151a in the picture 151. Furthermore, the second statistical motion vector MVR in the reference region 154a of the picture 154 indicates an upper-left direction relative to the search range 151a in the picture 151. That is, as illustrated in FIG. 18B, the first statistical motion vector MVS in the reference region 152a indicates an upper-left direction. Furthermore, as illustrated in FIG. 18C, the second statistical motion vector MVR in the reference region 154a indicates an upper-left direction. This case is determined as CASE 3.

As illustrated in FIG. 18D, in CASE 3, the search start position Gs is to the upper left of the virtual macroblock C0 in the search range 151a. Then, as illustrated in FIG. 18E, the search direction Sd is determined so that a search is obliquely performed to the lower right from the search start position Gs. In FIG. 18E, numbers in squares indicate search order. A search is thus performed alternately on one and the other of the right and left sides of the search direction Sd.

FIGS. 19A through 19E are diagrams illustrating CASE 4 of a search start position and a search direction. As illustrated in FIG. 19A, the first statistical motion vector MVS in the reference region 152a of the picture 152 indicates a leftward direction relative to the search range 151a in the picture 151. Furthermore, the second statistical motion vector MVR in the reference region 154a of the picture 154 indicates a leftward direction relative to the search range 151a in the picture 151. That is, as illustrated in FIG. 19B, the first statistical motion vector MVS in the reference region 152a indicates a leftward direction. Furthermore, as illustrated in FIG. 19C, the second statistical motion vector MVR in the reference region 154a indicates a leftward direction. This case is determined as CASE 4.

As illustrated in FIG. 19D, in CASE 4, the search start position Gs is to the left of the virtual macroblock C0 in the search range 151a. Then, as illustrated in FIG. 19E, the search direction Sd is determined so that a search is performed rightward from the search start position Gs. In FIG. 19E, numbers in squares indicate search order. A search is thus performed alternately on one and the other of the right and left sides of the search direction Sd.

There are cases where the direction of the first statistical motion vector MVS and the direction of the second statistical motion vector MVR are opposite to those in CASE 1 through CASE 4 described above. These cases are defined as CASE 5, CASE 6, CASE 7 and CASE 8. In CASE 5 through CASE 8, the search start position and the search direction are set to be opposite in direction from those in CASE 1 through CASE 4, respectively, in accordance with the directions of the first and second statistical motion vectors MVS and MVR. Therefore, graphical illustration of CASE 5 through CASE 8 is omitted.

For example, in CASE 5 where the direction of each of the first and second statistical motion vectors MVS and MVR is a lower-left direction, the search start position Gs is to the lower left of the virtual macroblock C0 in the search range 151a. Then, the search direction Sd is determined so that a search is obliquely performed to the upper right from the search start position Gs. Then, a search is performed alternately on one and the other of the right and left sides of the search direction Sd.

Furthermore, in CASE 6 where the direction of each of the first and second statistical motion vectors MVS and MVR is a downward direction, the search start position Gs is below the virtual macroblock C0 in the search range 151a. Then, the search direction Sd is determined so that a search is performed upward from the search start position Gs. Then, a search is performed alternately on one and the other of the right and left sides of the search direction Sd.

Furthermore, in CASE 7 where the direction of each of the first and second statistical motion vectors MVS and MVR is a lower-right direction, the search start position Gs is to the lower right of the virtual macroblock C0 in the search range 151a. Then, the search direction Sd is determined so that a search is obliquely performed to the upper left from the search start position Gs. Then, a search is performed alternately on one and the other of the right and left sides of the search direction Sd.

Furthermore, in CASE 8 where the direction of each of the first and second statistical motion vectors MVS and MVR is a rightward direction, the search start position Gs is to the right of the virtual macroblock C0 in the search range 151a. Then, the search direction Sd is determined so that a search is performed leftward from the search start position Gs. A search is performed alternately on one and the other of the right and left sides of the search direction Sd.

That is, when the directions of the first and second statistical motion vectors MVS and MVR are the same, the search start position is set in the directions of the first and second statistical motion vectors MVS and MVR relative to the virtual macroblock C0 in the search range. Then, a search direction opposite from the directions of the first and second statistical motion vectors MVS and MVR is determined.

FIGS. 20A through 20E are diagrams illustrating CASE 9 of a search start position and a search direction. As illustrated in FIG. 20A, the first statistical motion vector MVS in the reference region 152a of the picture 152 indicates an upper-right direction relative to the search range 151a in the picture 151. Furthermore, the second statistical motion vector MVR in the reference region 154a of the picture 154 indicates a lower-left direction relative to the search range 151a in the picture 151. That is, as illustrated in FIG. 20B, the first statistical motion vector MVS in the reference region 152a indicates an upper-right direction. Furthermore, as illustrated in FIG. 20C, the second statistical motion vector MVR in the reference region 154a indicates a lower-left direction. This case is determined as CASE 9. CASE 9 also includes a case where the first and second statistical motion vectors MVS and MVR indicate directions opposite from those illustrated, that is, the direction of the first statistical motion vector MVS is a lower-left direction and the direction of the second statistical motion vector MVR is an upper-right direction.

As illustrated in FIG. 20D, in CASE 9, the search start position Gs is set at the upper left pixel of the virtual macroblock C0 in the search range 151a. Then, the search direction Sd is determined so that a search is started to the upper right from the search start position Gs to sequentially extend outward in a spiral as illustrated in FIG. 20E. A broken-line portion of the arrow indicating the search direction Sd indicates search order in the extension search range.

Figure 21A:
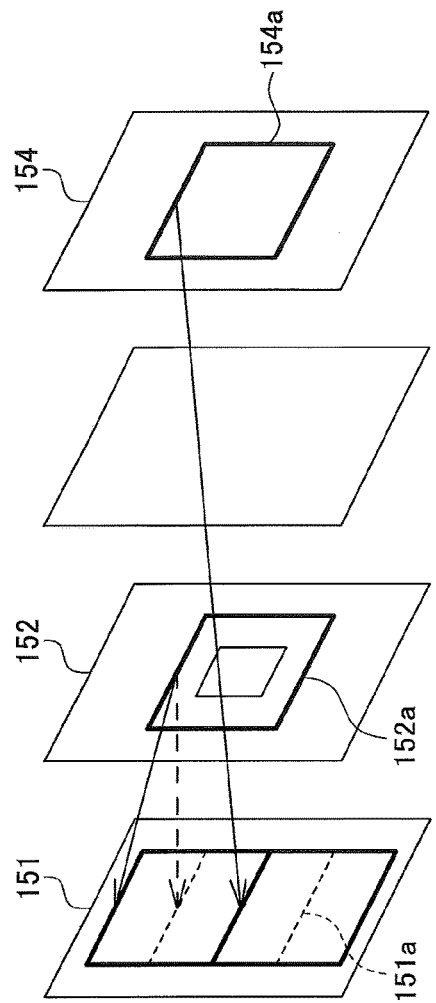
FIGS. 21A through 21E are diagrams illustrating CASE 10 of the search start position and the search direction.
Figure 21E:
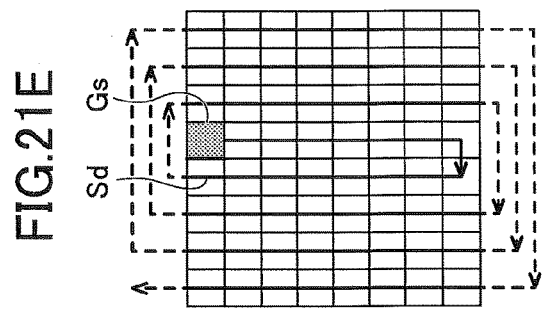
Figure 21D:
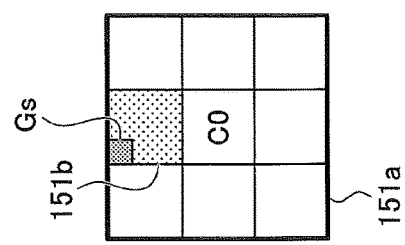
Figure 21C:
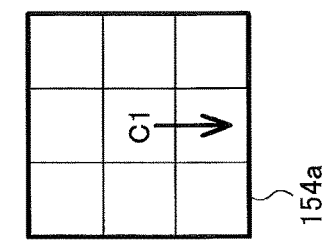
Figure 21B:
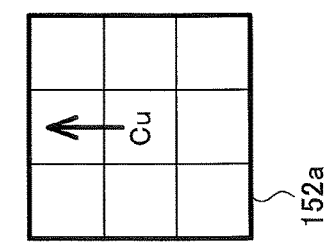

FIGS. 21A through 21E are diagrams illustrating CASE 10 of a search start position and a search direction. As illustrated in FIG. 21A, the first statistical motion vector MVS in the reference region 152a of the picture 152 indicates an upward direction relative to the search range 151a in the picture 151. Furthermore, the second statistical motion vector MVR in the reference region 154a of the picture 154 indicates a downward direction relative to the search range 151a in the picture 151. That is, as illustrated in FIG. 21B, the first statistical motion vector MVS in the reference region 152a indicates an upward direction. Furthermore, as illustrated in FIG. 21C, the second statistical motion vector MVR in the reference region 154a indicates a downward direction. This case is determined as CASE 10. CASE 10 also includes a case where the first and second statistical motion vectors MVS and MVR indicate directions opposite from those illustrated, that is, the direction of the first statistical motion vector MVS is a downward direction and the direction of the second statistical motion vector MVR is an upward direction.

As illustrated in FIG. 21D, in CASE 10, the search start position Gs is above the virtual macroblock C0 in the search range 151a. Then, the search direction Sd is determined so that a search is started upward from the search start position Gs to sequentially extend outward in a vertically elongated rectangular spiral as illustrated in FIG. 21E. A broken-line portion of the arrow indicating the search direction Sd indicates search order in the extension search range. As an alternative, the search start position Gs may be below the virtual macroblock C0 so as to start a search in an upward direction.

FIGS. 22A through 22E are diagrams illustrating CASE 11 of a search start position and a search direction. As illustrated in FIG. 22A, the first statistical motion vector MVS in the reference region 152a of the picture 152 indicates an upper-left direction relative to the search range 151a in the picture 151. Furthermore, the second statistical motion vector MVR in the reference region 154a of the picture 154 indicates a lower-right direction relative to the search range 151a in the picture 151. That is, as illustrated in FIG. 22B, the first statistical motion vector MVS in the reference region 152a indicates an upper-left direction. Furthermore, as illustrated in FIG. 22C, the second statistical motion vector MVR in the reference region 154a indicates a lower-right direction. This case is determined as CASE 11. CASE 11 also includes a case where the first and second statistical motion vectors MVS and MVR indicate directions opposite from those illustrated, that is, the direction of the first statistical motion vector MVS is a lower-right direction and the direction of the second statistical motion vector MVR is an upper-left direction.

As illustrated in FIG. 22D, in CASE 9, the search start position Gs is set at the upper left pixel of the virtual macroblock C0 in the search range 151a. Then, the search direction Sd is determined so that a search is started to the upper left from the search start position Gs to sequentially extend outward in a spiral as illustrated in FIG. 22E. A broken-line portion of the arrow indicating the search direction Sd indicates search order in the extension search range.

FIGS. 23A through 23E are diagrams illustrating CASE 12 of a search start position and a search direction. As illustrated in FIG. 23A, the first statistical motion vector MVS in the reference region 152a of the picture 152 indicates a leftward direction relative to the search range 151a in the picture 151. Furthermore, the second statistical motion vector MVR in the reference region 154a of the picture 154 indicates a rightward direction relative to the search range 151a in the picture 151. That is, as illustrated in FIG. 23B, the first statistical motion vector MVS in the reference region 152a indicates a leftward direction. Furthermore, as illustrated in FIG. 23C, the second statistical motion vector MVR in the reference region 154a indicates a rightward direction. This case is determined as CASE 12. CASE 12 also includes a case where the first and second statistical motion vectors MVS and MVR indicate directions opposite from those illustrated, that is, the direction of the first statistical motion vector MVS is a rightward direction and the direction of the second statistical motion vector MVR is a leftward direction.

As illustrated in FIG. 23D, in CASE 12, the search start position Gs is to the left of the virtual macroblock C0 in the search range 151a. Then, the search direction Sd is determined so that a search is started rightward from the search start position Gs to sequentially extend outward in a horizontally elongated rectangular spiral as illustrated in FIG. 23E. A broken-line portion of the arrow indicating the search direction Sd indicates search order in the extension search range. As an alternative, the search start position Gs may be to the right of the virtual macroblock C0 so as to start a search in a leftward direction.

Figure 24A:
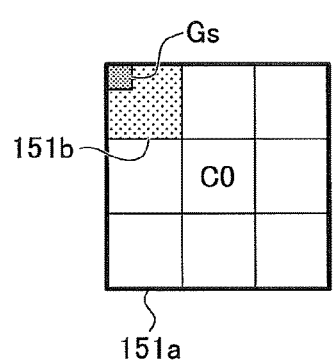
FIGS. 24A and 24B are diagrams illustrating CASE 13 of the search start position and the search direction.
Figure 24B:
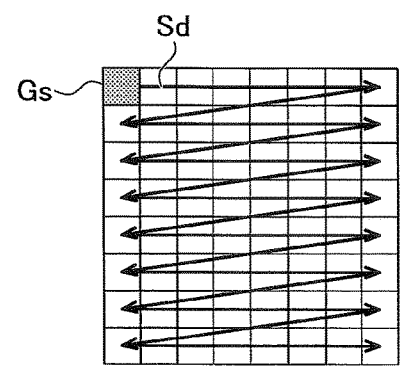

FIGS. 24A and 24B are diagrams illustrating CASE 13 of a search start position and a search direction. A case where the direction of the first statistical motion vector MVS and the direction of the second statistical motion vector MVR do not correspond to those of any of the above-described cases is determined as CASE 13. In CASE 13, as illustrated in FIG. 24A, the search start position Gs is to the left of the virtual macroblock C0 in the search range 151a. Then, the search direction Sd is determined so that a search is started rightward from the search start position Gs so as to be performed line by line in a downward direction as illustrated in FIG. 24B.

Next, a description is given of a flow of how each case of a search start position and a search direction is selected.

Figure 25A:
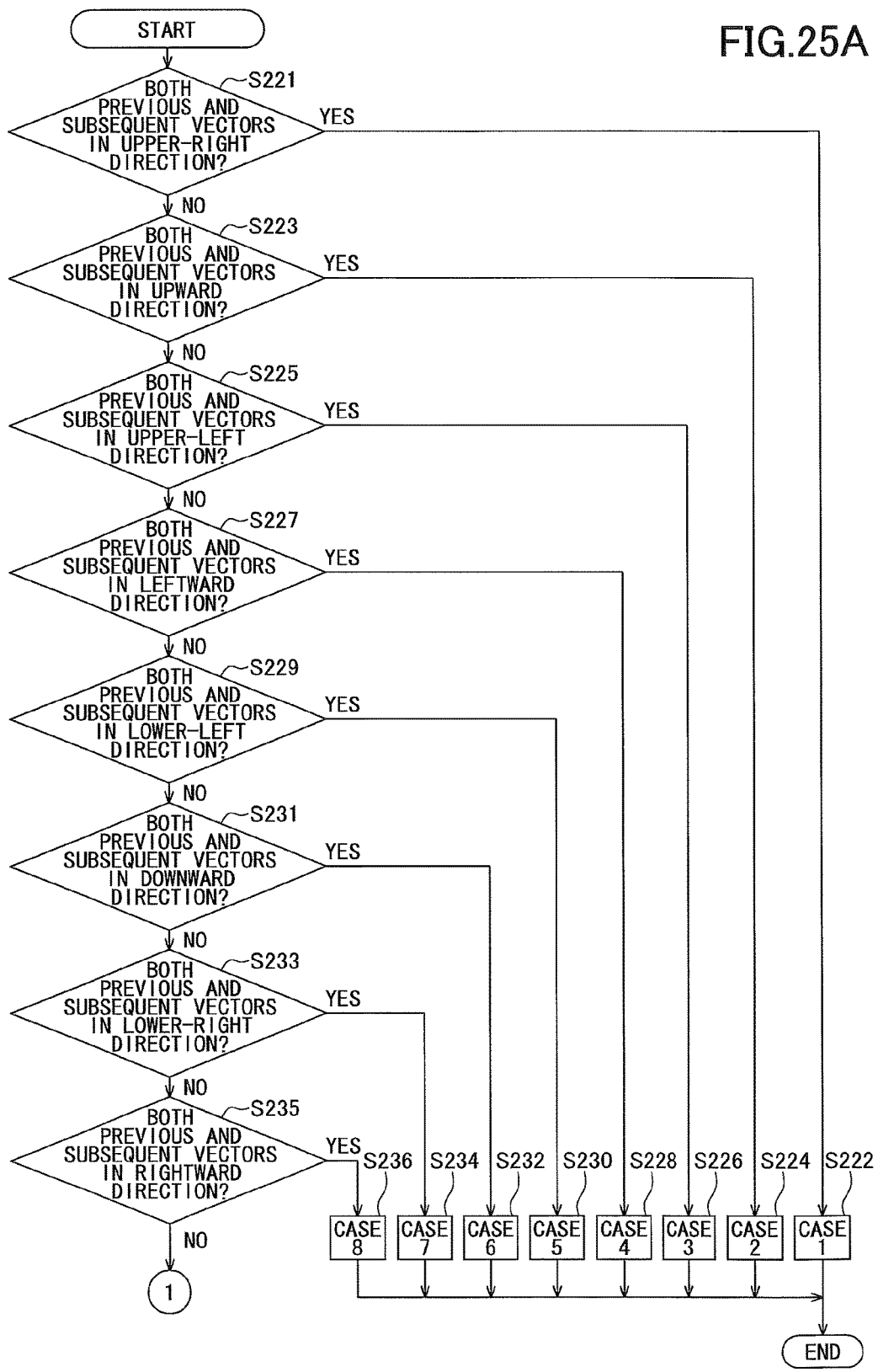
FIGS. 25A and 25B are flowcharts illustrating a process of selecting a case of the search start position and the search direction.
Figure 25B:
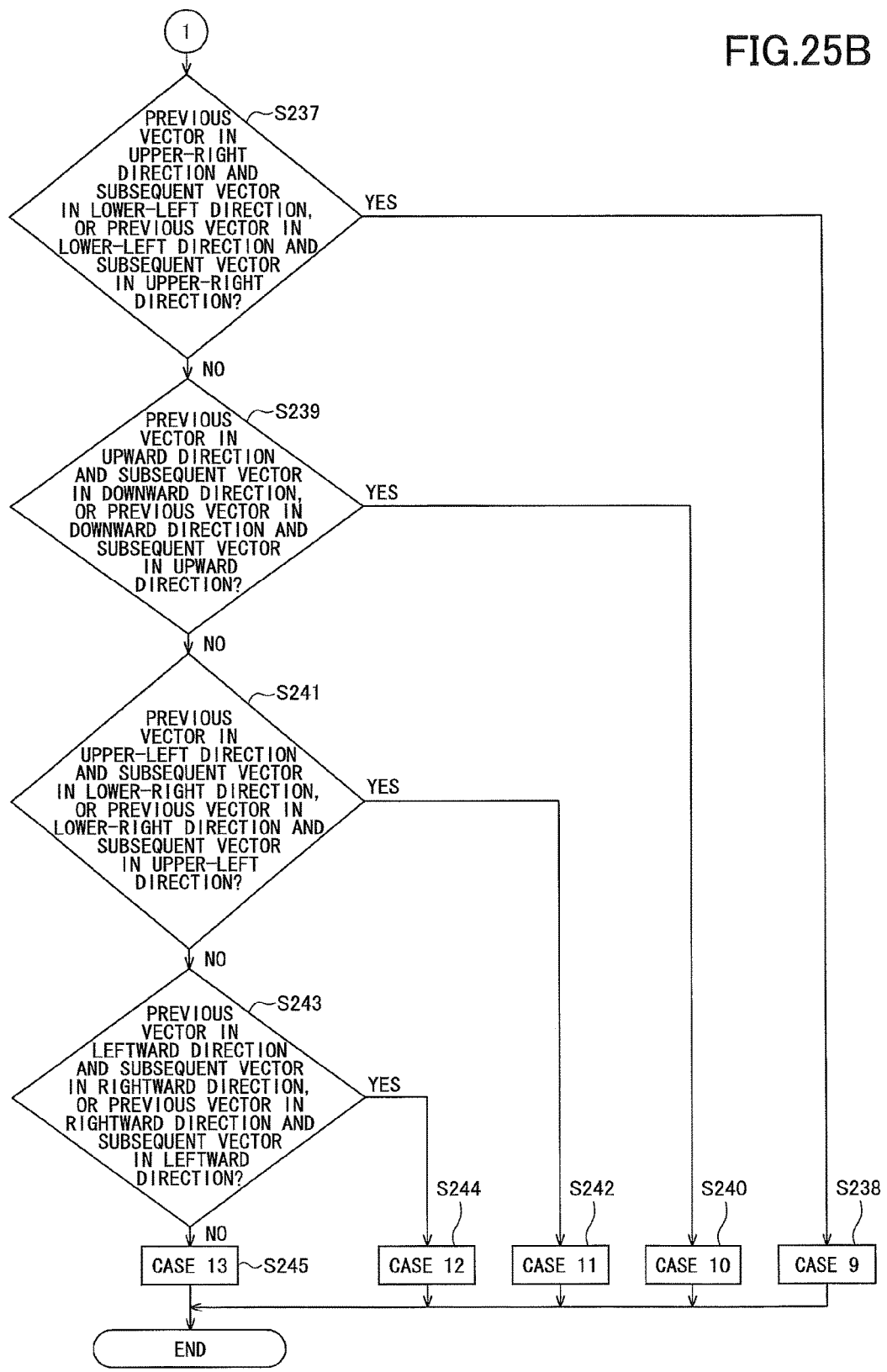

FIGS. 25A and 25B are flowcharts illustrating a process of selecting a case of a search start position and a search direction. In FIGS. 25A and 25B, the first statistical motion vector MVS in the currently processed image 152 (see FIG. 15) is referred to as "previous vector" and the second statistical motion vector MVR in the forward reference image 154 (see FIG. 15) is referred to as "subsequent vector."

The search start position and the search direction of CASE n are determined in accordance with the direction of the previous vector, that is, the first statistical motion vector MVS, and the direction of the subsequent vector, that is, the second statistical motion vector MVR.

The search start position and the search direction of each CASE n are, for example, a relative position and direction with reference to coordinate values (for example, the coordinate values of the upper left pixel) of the current macroblock Cu. Furthermore, the search start position and the search direction of each CASE n are stored in a register or the like as table data.

First, at step S221 of FIG. 25A, it is determined whether both the first statistical motion vector MVS and the second statistical motion vector MVR are in an upper-right direction. If both the first statistical motion vector MVS and the second statistical motion vector MVR are in an upper-right direction (YES at step S221), at step S222, the search start position and the search direction of CASE 1 are set. For example, values stored as the information of CASE 1 are read from a register, and the values are determined as the search start position and the search direction. If both the first statistical motion vector MVS and the second statistical motion vector MVR are not in an upper-right direction (NO at step S221), at step S223, it is determined whether both the first statistical motion vector MVS and the second statistical motion vector MVR are in an upward direction. If both the first statistical motion vector MVS and the second statistical motion vector MVR are in an upward direction (YES at step S223), at step S224, the search start position and the search direction of CASE 2 are set.

If both the first statistical motion vector MVS and the second statistical motion vector MVR are not in an upward direction (NO at step S223), at step S225, it is determined whether both the first statistical motion vector MVS and the second statistical motion vector MVR are in an upper-left direction. If both the first statistical motion vector MVS and the second statistical motion vector MVR are in an upper-left direction (YES at step S225), at step S226, the search start position and the search direction of CASE 3 are set. If both the first statistical motion vector MVS and the second statistical motion vector MVR are not in an upper-left direction (NO at step S225), at step S227, it is determined whether both the first statistical motion vector MVS and the second statistical motion vector MVR are in a leftward direction. If both the first statistical motion vector MVS and the second statistical motion vector MVR are in a leftward direction (YES at step S227), at step S228, the search start position and the search direction of CASE 4 are set.

If both the first statistical motion vector MVS and the second statistical motion vector MVR are not in a leftward direction (NO at step S227), at step S229, it is determined whether both the first statistical motion vector MVS and the second statistical motion vector MVR are in a lower-left direction. If both the first statistical motion vector MVS and the second statistical motion vector MVR are in a lower-left direction (YES at step S229), at step S230, the search start position and the search direction of CASE 5 are set. If both the first statistical motion vector MVS and the second statistical motion vector MVR are not in a lower-left direction (NO at step S229), at step S231, it is determined whether both the first statistical motion vector MVS and the second statistical motion vector MVR are in a downward direction. If both the first statistical motion vector MVS and the second statistical motion vector MVR are in a downward direction (YES at step S231), at step S232, the search start position and the search direction of CASE 6 are set.

If both the first statistical motion vector MVS and the second statistical motion vector MVR are not in a downward direction (NO at step S231), at step S233, it is determined whether both the first statistical motion vector MVS and the second statistical motion vector MVR are in a lower-right direction. If both the first statistical motion vector MVS and the second statistical motion vector MVR are in a lower-right direction (YES at step S233), at step S234, the search start position and the search direction of CASE 7 are set. If both the first statistical motion vector MVS and the second statistical motion vector MVR are not in a lower-right direction (NO at step S233), at step S235, it is determined whether both the first statistical motion vector MVS and the second statistical motion vector MVR are in a rightward direction. If both the first statistical motion vector MVS and the second statistical motion vector MVR are in a rightward direction (YES at step S235), at step S236, the search start position and the search direction of CASE 8 are set.

If both the first statistical motion vector MVS and the second statistical motion vector MVR are not in a rightward direction (NO at step S235), at step S237 of FIG. 25B, it is determined whether or not the first statistical motion vector MVS and the second statistical motion vector MVR are in an upper-right direction and a lower-left direction, respectively, or in a lower-left direction and an upper-right direction, respectively. If the first statistical motion vector MVS and the second statistical motion vector MVR are in an upper-right direction and a lower-left direction, respectively, or in a lower-left direction and an upper-right direction, respectively (YES at step S237), at step S238, the search start position and the search direction of CASE 9 are set.

If the first statistical motion vector MVS and the second statistical motion vector MVR are neither in an upper-right direction and a lower-left direction, respectively, nor in a lower-left direction and an upper-right direction, respectively (NO at step S237), at step S239, it is determined whether or not the first statistical motion vector MVS and the second statistical motion vector MVR are in an upward direction and a downward direction, respectively, or in a downward direction and an upward direction, respectively. If the first statistical motion vector MVS and the second statistical motion vector MVR are in an upward direction and a downward direction, respectively, or in a downward direction and an upward direction, respectively (YES at step S239), at step S240, the search start position and the search direction of CASE 10 are set.

If the first statistical motion vector MVS and the second statistical motion vector MVR are neither in an upward direction and a downward direction, respectively, nor in a downward direction and an upward direction, respectively (NO at step S239), at step S241, it is determined whether or not the first statistical motion vector MVS and the second statistical motion vector MVR are in an upper-left direction and a lower-right direction, respectively, or in a lower-right direction and an upper-left direction, respectively. If the first statistical motion vector MVS and the second statistical motion vector MVR are in an upper-left direction and a lower-right direction, respectively, or in a lower-right direction and an upper-left direction, respectively (YES at step S241), at step S242, the search start position and the search direction of CASE 11 are set.

If the first statistical motion vector MVS and the second statistical motion vector MVR are neither in an upper-left direction and a lower-right direction, respectively, nor in a lower-right direction and an upper-left direction, respectively (NO at step S241), at step S243, it is determined whether or not the first statistical motion vector MVS and the second statistical motion vector MVR are in a leftward direction and a rightward direction, respectively, or in a rightward direction and a leftward direction, respectively. If the first statistical motion vector MVS and the second statistical motion vector MVR are in a leftward direction and a rightward direction, respectively, or in a rightward direction and a leftward direction, respectively (YES at step S243), at step S244, the search start position and the search direction of CASE 12 are set.

If the first statistical motion vector MVS and the second statistical motion vector MVR are in directions other than those described above (NO at step S243), at step S245, the search start position and the search direction of CASE 13 are set.

Next, a description is given of a full search based on a set search start position and search direction. Here, a description is given based on the search start position Gs and the search direction Sd of CASE 1 illustrated in FIG. 16E.

Figure 26A:
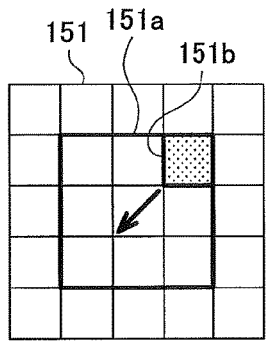
FIGS. 26A through 26I are diagrams illustrating a full search based on CASE 1.

FIGS. 26A through 26I are diagrams illustrating a full search based on CASE 1. First, as illustrated in FIG. 26A, a candidate block 151b is set at the upper right end of the search range 151a of the reference image 151. Then, an evaluation value is calculated based on the pixel values of the pixels included in the candidate block 151b and the pixel values of the pixels included in the current macroblock Cu. As described above, the evaluation value is, for example, an SAD. The evaluation value thus calculated is stored in correlation with the position information of the candidate block 151b.

Figure 26B:
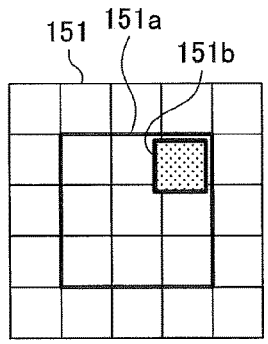
Figure 26C:
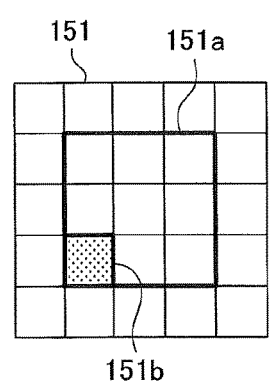

Next, as illustrated in FIG. 26B, the candidate block 151b is shifted in a lower-left direction by one pixel in the search range 151a so as to be set. Then, the evaluation value of this candidate block 151b is calculated. The evaluation values of candidate blocks thus set by being shifted one pixel by one pixel toward the lower left are calculated. Then, as illustrated in FIG. 26C, the evaluation value of the candidate block 151b set at the lower left end in the search range 151a is calculated.

Next, a search is performed according to the second search direction Sd illustrated in FIG. 16E.

Figure 26D:
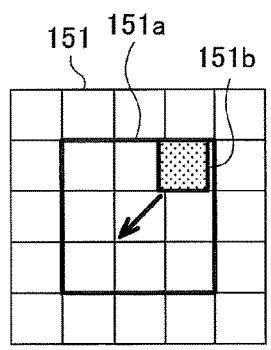
Figure 26E:
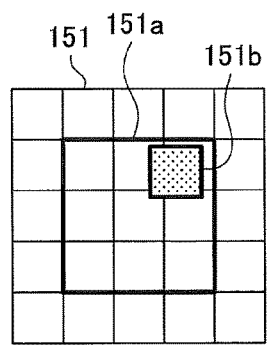
Figure 26F:
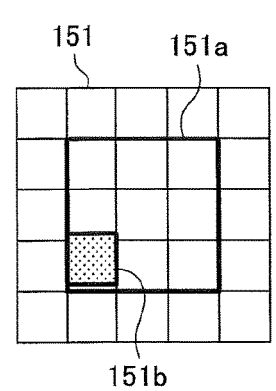

That is, as illustrated in FIG. 26D, the candidate block 151b is set at a position shifted leftward by one pixel from the upper right end of the search range 151a. Then, the evaluation value of this candidate block 151b is calculated. Then, as illustrated in FIG. 26E, the candidate block 151b is set by being shifted in a lower-left direction by one pixel in the search range 151a. Then, the evaluation value of this candidate block 151b is calculated. The evaluation value of the candidate block 151b set at each position is calculated by thus shifting the setting position of the candidate block 151b one pixel by one pixel in a lower-left direction. Then, as illustrated in FIG. 26F, the candidate block 151b is set at the left end of the search range 151b, and the evaluation value of this candidate block 151b is calculated.

Next, a search is performed according to the third search direction Sd illustrated in FIG. 16E.

Figure 26G:
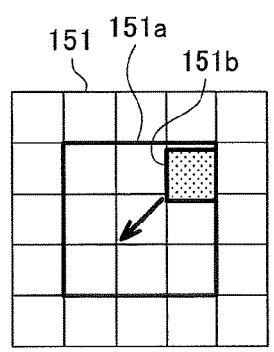
Figure 26H:
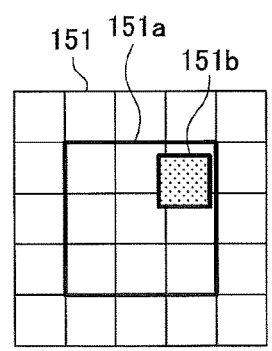
Figure 26I:
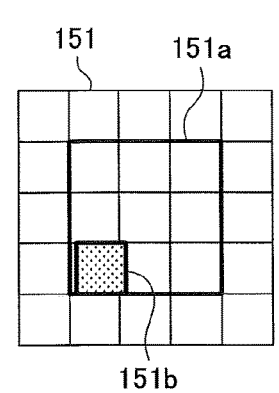

That is, as illustrated in FIG. 26G, the candidate block 151b is set at a position shifted downward by one pixel from the upper right end of the search range 151a. Then, the evaluation value of this candidate block 151b is calculated. Then, as illustrated in FIG. 26H, the candidate block 151b is set by being shifted in a lower-left direction by one pixel in the search range 151a. Then, the evaluation value of this candidate block 151b is calculated. The evaluation value of the candidate block 151b set at each position is calculated by thus shifting the setting position of the candidate block 151b one pixel by one pixel in a lower-left direction. Then, as illustrated in FIG. 26I, the candidate block 151b is set at the lower end of the search range 151b, and the evaluation value of this candidate block 151b is calculated.

[Process of Adjusting Determination Threshold in Search Process]

Next, a description is given of cases of extension of a search period with respect to termination of a motion search.

Figure 27:
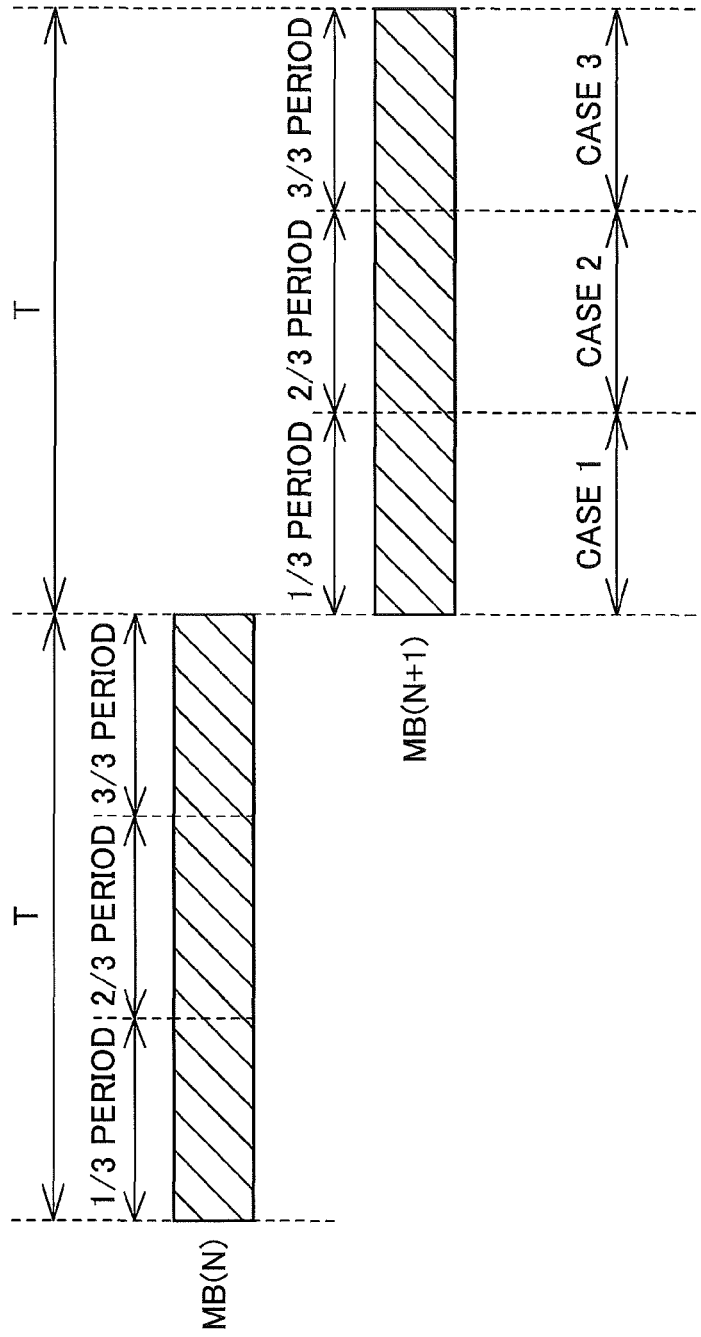
FIG. 27 is a diagram illustrating termination of a motion search and a search period.

FIG. 27 is a diagram illustrating termination of a motion search and a search period. For example, as illustrated in FIG. 27, a motion search with respect to an Nth macroblock MB(N) is performed, and then a motion search with respect to an (N+1)th macroblock MB(N+1) is performed. In FIG. 27, a period required for a motion search with respect to a single macroblock MB is determined as "T."

A period required for a search in the base search range is equally divided by a predetermined number (for example, "3"). Then, the individual periods into which the period T is divided are determined as a first period, a second period, and a third period in order from the start of the process. Then, the first period, the second period, and the third period are determined as "1/3 Period," "2/3 Period," and "3/3 Period," respectively, in accordance with the number of divisions and the order of periods from the start of the process. The determination threshold Gj is adjusted and the search period is extended regarding a motion search with respect to the macroblock MB(N+1) in accordance with the presence or absence of termination and the time of termination in a motion search with respect to the macroblock MB(N).

As illustrated in FIG. 27, when there is no termination in the preceding macroblock MB(N), the determination threshold Gj of a case corresponding to the time of processing (the number of cycles) is set in a motion search with respect to the macroblock MB(N+1). In accordance with the process with respect to the macroblock MB(N+1), the determination threshold Gj of CASE 1 is set in 1/3 Period, the determination threshold Gj of CASE 2 is set in 2/3 Period, and the determination threshold Gj of CASE 3 is set in 3/3 Period.

For example, the determination threshold Gj is calculated from the reference threshold α based on the operational expression of CASE 1. The operational expression used for the calculation is, for example, $Gj=(4/6)\Delta\alpha$. Furthermore, the operational expression of CASE 2 is, for example, $(5/6)\times\alpha$. Furthermore, the operational expression of CASE 3 is, for example, $(6/6)\times\alpha$.

Figure 28:
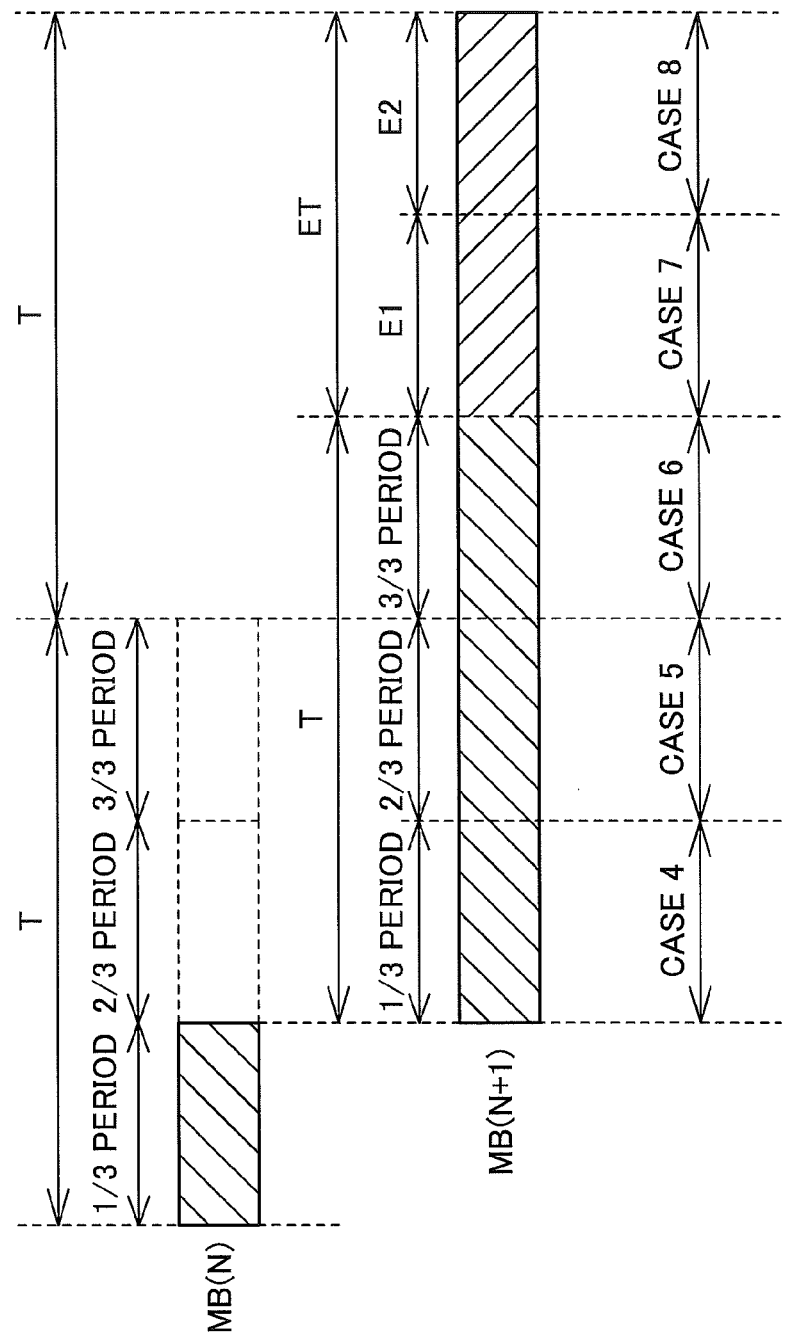
FIG. 28 is a diagram illustrating termination of the motion search and the search period.

As illustrated in FIG. 28, when there is termination during the period of 1/3 Period in the preceding macroblock MB(N), an extension search range commensurate in size with 2/3 Period and 3/3 Period is set, and a period for searching the extension search range is determined as a search period ET. Furthermore, the search period ET is divided using a divisional period (the number of cycles) of the period required for searching the base search range as a unit, so that a first extension period and a second extension period are set. The first extension period is referred to as "E1" and the second extension period is referred to as "E2."

Then, in a motion search with respect to the macroblock MB(N+1), the determination threshold Gj of a case corresponding to the time of processing (the number of cycles) is set. In accordance with the process with respect to the macroblock MB(N+1), the determination threshold Gj of CASE 4 is set in ⅓ Period, the determination threshold Gj of CASE 5 is set in ⅔ Period, and the determination threshold Gj of CASE 6 is set in 3/3 Period. Furthermore, in the extension search period ET, the determination threshold Gj of CASE 7 is set in E1, and the determination threshold Gj of CASE 8 is set in E2.

For example, the determination threshold Gj is calculated from the reference threshold α based on the operational expression of CASE 4. The operational expression used for the calculation is, for example, Gj=(2/6)×α. Furthermore, the operational expression of CASE 5 is, for example, (3/6)×α. Furthermore, the operational expression of CASE 6 is, for example, (4/6)×α. Furthermore, the operational expression of CASE 7 is, for example, (5/6)×α. Furthermore, the operational expression of CASE 8 is, for example, (6/6)×α.

Figure 29:
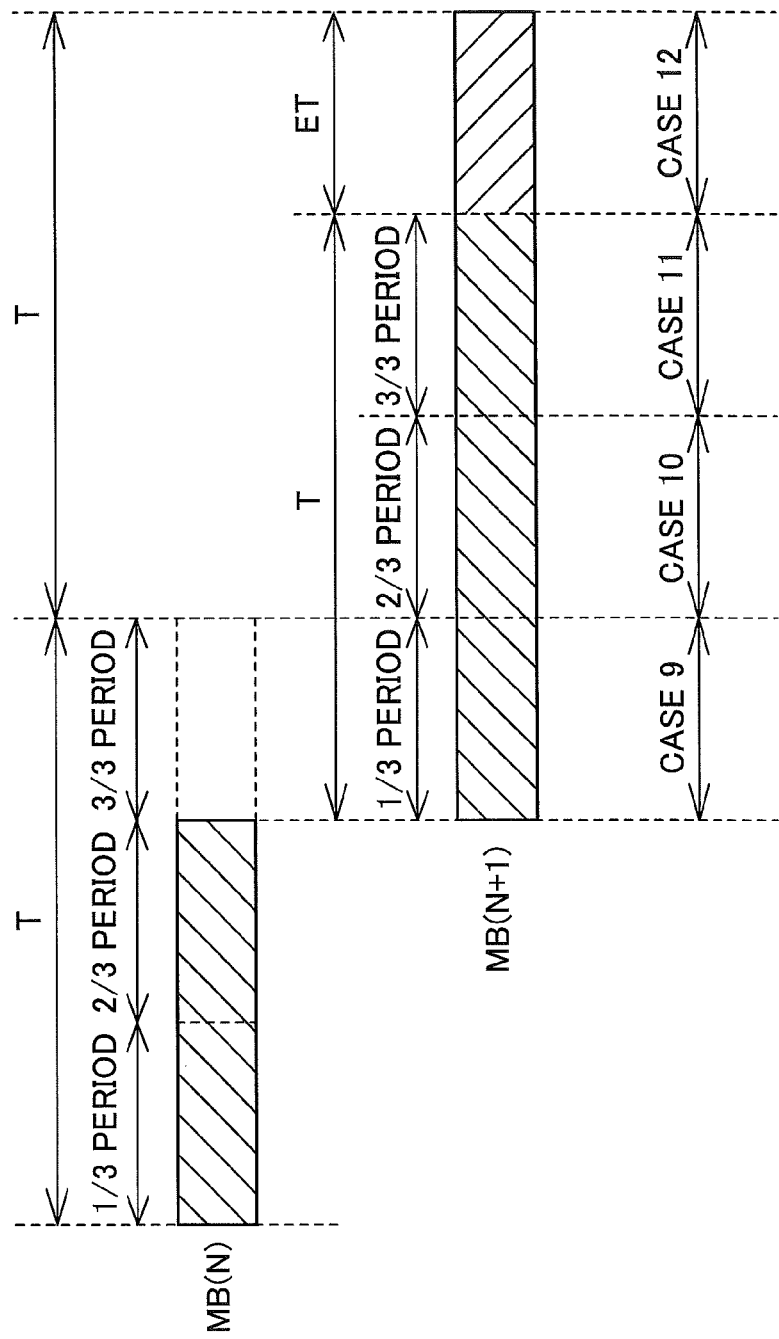
FIG. 29 is a diagram illustrating termination of the motion search and the search period.

As illustrated in FIG. 29, when there is termination during the period of ⅔ Period in the preceding macroblock MB(N), an extension search range commensurate in size with 3/3 Period is set, and a period for searching the extension search range is determined as a search period ET.

Then, in a motion search with respect to the macroblock MB(N+1), the determination threshold Gj of a case corresponding to the time of processing (the number of cycles) is set. In accordance with the process with respect to the macroblock MB(N+1), the determination threshold Gj of CASE 9 is set in ⅓ Period, the determination threshold Gj of CASE 10 is set in ⅔ Period, the determination threshold Gj of CASE 11 is set in 3/3 Period, and the determination threshold Gj of CASE 12 is set in ET.

For example, the determination threshold Gj is calculated from the reference threshold α based on the operational expression of CASE 9. The operational expression used for the calculation is, for example, Gj=(3/6)×α. Furthermore, the operational expression of CASE 10 is, for example, (4/6)×α. Furthermore, the operational expression of CASE 11 is, for example, (5/6)×α. Furthermore, the operational expression of CASE 12 is, for example, (6/6)×α.

In FIG. 28, the process with respect to the macroblock MB(N+1) is illustrated as being performed after ⅓ Period of the macroblock MB(N), in order to illustrate the correspondence between periods (⅔ Period and 3/3 Period) in which no process was performed with respect to the macroblock MB(N) and the extension search period ET of the macroblock MB(N+1). The termination with respect to the macroblock MB(N) is performed during ⅓ Period, and the process with respect to the macroblock MB(N+1) is performed after the termination. Therefore, the process with respect to the macroblock MB(N+1) may be started earlier (at a point more to the left) than as illustrated in FIG. 28. The same is the case with FIG. 29.

Each period is determined based on, for example, the number of cycles. For example, it is assumed that a period (cycle) required for the processing of one candidate block is "1." Letting the size of the base search range be 48×48 pixels, the number of cycles required for searching the base search range is "1089." Then, the number of cycles of ⅓ Period is from "1" to "363." Likewise, the number of cycles of ⅔ Period is from "364" to "726," and the number of cycles of ⅔ Period is from "727" to "1089." Furthermore, in the extension search period ET, the number of cycles of E1 is from "1090" to "1452," and the number of cycles of E2 is from "1453" to "1815." Letting a cycle in process be t, it is possible to determine each period by determining within which of the above-described ranges the cycle t falls.

Next, a description is given of how each case of the termination process is selected.

Figure 30A:
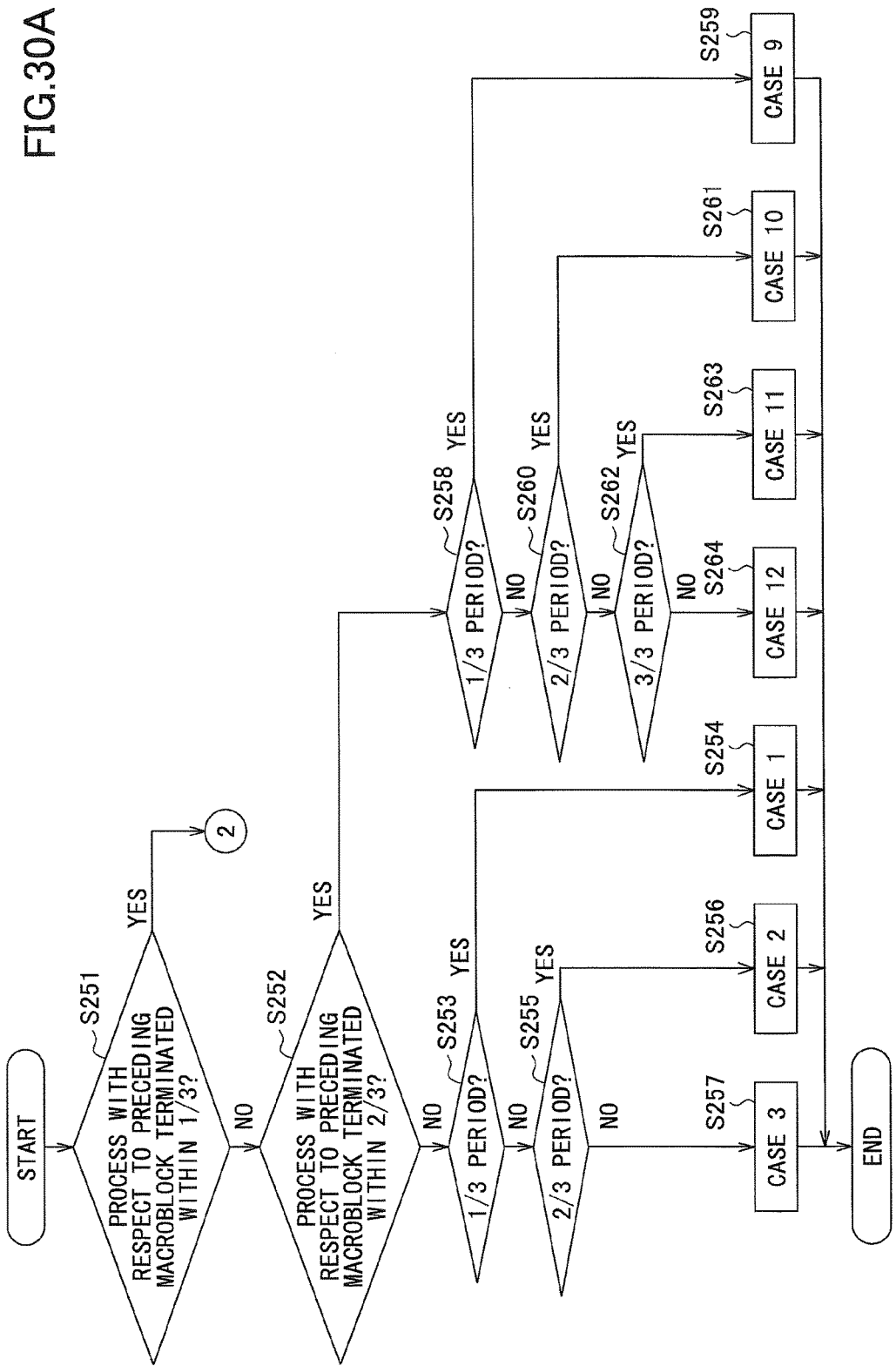

FIGS. 30A and 30B are flowcharts illustrating a process of selecting a case of the termination process.

At step S251 of FIG. 30A, it is determined whether a search process with respect to a preceding macroblock has been terminated while the elapsed time after the start of the search process is within one-third (⅓) of the total number of search cycles, that is, ⅓ Period. If the termination is not within ⅓ (NO at step S251), the selection process proceeds to step S252.

At step S252, it is determined whether the search process with respect to the preceding macroblock has been terminated while the elapsed time after the start of the search process is within two-thirds (⅔) of the total number of search cycles, that is, ⅔ Period. If the termination is not within ⅔ (NO at step S252), the selection process proceeds to step S253. That is, if there has been no termination in the search process with respect to the preceding macroblock, the selection process proceeds to step S253.

At step S253, it is determined whether a search process with respect to the current macroblock Cu is in ⅓ Period. If the search process is in ⅓ Period (YES at step S253), at step S254, the determination threshold Gj of CASE 1 is set. The evaluation values of candidate blocks are calculated according to a full search process, and each evaluation value is compared with the determination threshold Gj. When the evaluation value is lower than or equal to the determination threshold Gj, a candidate block of the evaluation value is adopted, and the motion vector of the current macroblock Cu is calculated.

If the search process is not in ⅓ Period at step S253 (NO at step S253), the selection process proceeds to step S255. At step S255, it is determined whether the search process is in ⅔ Period. If the search process is in ⅔ Period (YES at step S255), at step S256, the determination threshold Gj of CASE 2 is set. The evaluation values of candidate blocks are calculated according to a full search process, and each evaluation value is compared with the determination threshold Gj. When the evaluation value is lower than or equal to the determination threshold Gj, a candidate block of the evaluation value is adopted, and the motion vector of the current macroblock Cu is calculated.

If the search process is not in ⅔ Period at step S255 (NO at step S255), at step S257, the determination threshold Gj of CASE 3 is set. The evaluation values of candidate blocks are calculated according to a full search process, and each evaluation value is compared with the determination threshold Gj. When the evaluation value is lower than or equal to the determination threshold Gj, a candidate block of the evaluation value is adopted, and the motion vector of the current macroblock Cu is calculated.

If it is determined at step S252 that the termination with respect to the preceding macroblock is within ⅔, that is, in ⅔ Period (YES at step S252), the selection process proceeds to step S258.

At step S258, it is determined whether the search process is in ⅓ Period. If the search process is in ⅓ Period (YES at step S253), at step S259, the determination threshold Gj of CASE 9 is set. The evaluation values of candidate blocks are calculated according to a full search process, and each evaluation value is compared with the determination threshold Gj. When the evaluation value is lower than or equal to the determination threshold Gj, a candidate block of the evaluation value is adopted, and the motion vector of the current macroblock Cu is calculated.

If the search process is not in ⅓ Period at step S258 (NO at step S258), the selection process proceeds to step S260. At step S260, it is determined whether the search process is in ⅔ Period. If the search process is in ⅔ Period (YES at step S260), at step S261, the determination threshold Gj of CASE 10 is set. The evaluation values of candidate blocks are calculated according to a full search process, and each evaluation value is compared with the determination threshold Gj. When the evaluation value is lower than or equal to the determination threshold Gj, a candidate block of the evaluation value is adopted, and the motion vector of the current macroblock Cu is calculated.

If the search process is not in ⅔ Period at step S260 (NO at step S260), the selection process proceeds to step S262. At step S262, it is determined whether the search process is in 3/3 Period. If the search process is in 3/3 Period (YES at step S262), at step S263, the determination threshold Gj of CASE 11 is set. The evaluation values of candidate blocks are calculated according to a full search process, and each evaluation value is compared with the determination threshold Gj. When the evaluation value is lower than or equal to the determination threshold Gj, a candidate block of the evaluation value is adopted, and the motion vector of the current macroblock Cu is calculated.

If the search process is not in 3/3 Period at step S262 (NO at step S262), at step S264, the determination threshold Gj of CASE 12 is set. The evaluation values of candidate blocks are calculated according to a full search process, and each evaluation value is compared with the determination threshold Gj. When the evaluation value is lower than or equal to the determination threshold Gj, a candidate block of the evaluation value is adopted, and the motion vector of the current macroblock Cu is calculated.

If it is determined at step S251 that the termination with respect to the preceding macroblock is within ⅓, that is, in ⅓ Period (YES at step S251), the selection process proceeds to step S265 of FIG. 30B.

At step S265, it is determined whether the search process is in ⅓ Period. If the search process is in ⅓ Period (YES at step S265), at step S266, the determination threshold Gj of CASE 4 is set. The evaluation values of candidate blocks are calculated according to a full search process, and each evaluation value is compared with the determination threshold Gj. When the evaluation value is lower than or equal to the determination threshold Gj, a candidate block of the evaluation value is adopted, and the motion vector of the current macroblock Cu is calculated.

If the search process is not in ⅓ Period at step S265 (NO at step S265), the selection process proceeds to step S267. At step S267, it is determined whether the search process is in ⅔ Period. If the search process is in ⅔ Period (YES at step S267), at step S268, the determination threshold Gj of CASE 5 is set. The evaluation values of candidate blocks are calculated according to a full search process, and each evaluation value is compared with the determination threshold Gj. When the evaluation value is lower than or equal to the determination threshold Gj, a candidate block of the evaluation value is adopted, and the motion vector of the current macroblock Cu is calculated.

If the search process is not in ⅔ Period at step S267 (NO at step S267), the selection process proceeds to step S269. At step S269, it is determined whether the search process is in 3/3 Period. If the search process is in 3/3 Period (YES at step S269), at step S270, the determination threshold Gj of CASE 6 is set. The evaluation values of candidate blocks are calculated according to a full search process, and each evaluation value is compared with the determination threshold Gj. When the evaluation value is lower than or equal to the determination threshold Gj, a candidate block of the evaluation value is adopted, and the motion vector of the current macroblock Cu is calculated.

If the search process is not in 3/3 Period at step S269 (NO at step S269), the selection process proceeds to step S271. At step S271, it is determined whether the search process is in E1. If the search process is in E1 (YES at step S271), at step S272, the determination threshold Gj of CASE 7 is set. The evaluation values of candidate blocks are calculated according to a full search process, and each evaluation value is compared with the determination threshold Gj. When the evaluation value is lower than or equal to the determination threshold Gj, a candidate block of the evaluation value is adopted, and the motion vector of the current macroblock Cu is calculated.

If the process is not in E1 at step S271 (NO at step S271), at step S273, the determination threshold Gj of CASE 8 is set. The evaluation values of candidate blocks are calculated according to a full search process, and each evaluation value is compared with the determination threshold Gj. When the evaluation value is lower than or equal to the determination threshold Gj, a candidate block of the evaluation value is adopted, and the motion vector of the current macroblock Cu is calculated.

[Extension of Search Range]

Next, a description is given of extension of a search range and a search direction.

Figure 31A:
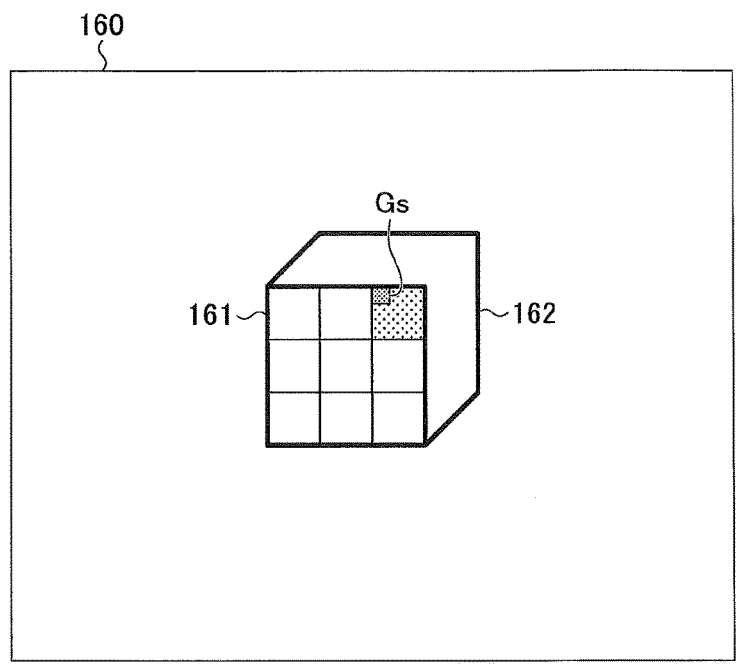
FIG. 31A is a diagram illustrating extension of a search range.
Figure 31B:
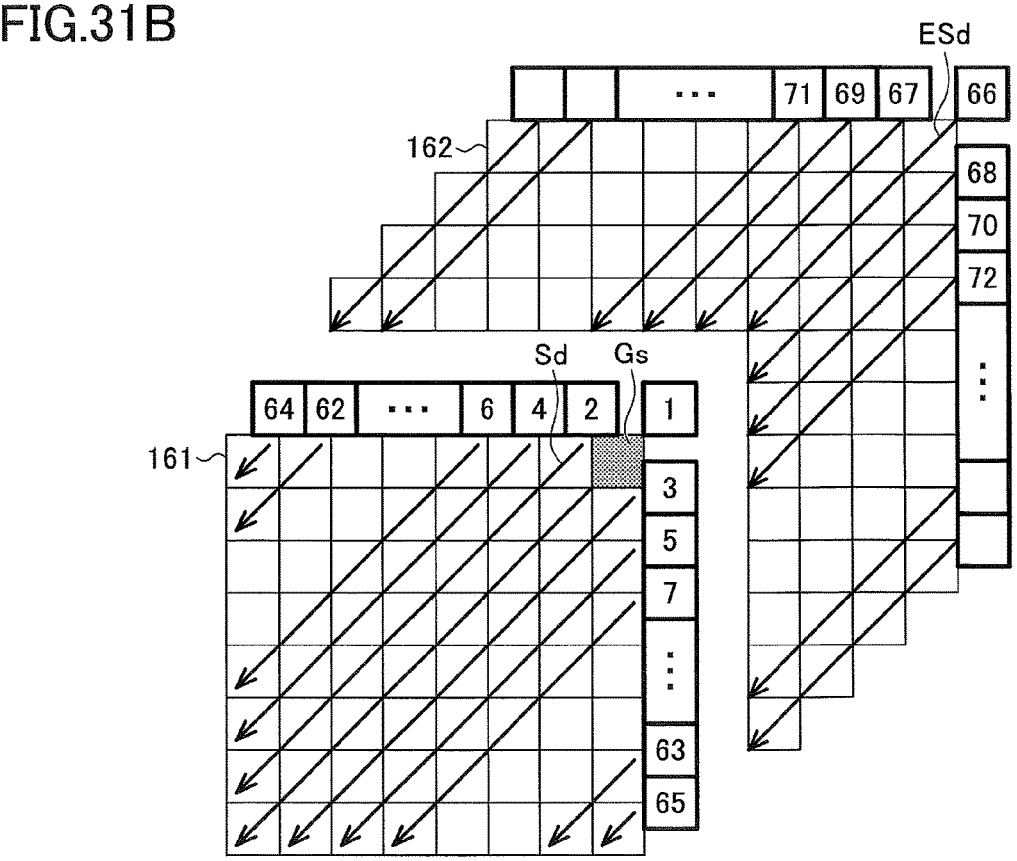
FIG. 31B is a diagram illustrating the search direction.

FIG. 31A is a diagram illustrating extension of a search range. FIG. 31B is a diagram illustrating a search direction.

FIG. 31A illustrates an extension search range corresponding to the first statistical motion vector MVS and the second statistical motion vector MVR of CASE1 illustrated in FIGS. 16A through 16E.

As illustrated in FIG. 31A, a base search range 161 is set in a reference image 160. An extension search range 162 is set with respect to the base search range 161 so as to be to the upper right of the base search range 161 based on the first statistical motion vector MVS and the second statistical motion vector MVR. The extension search range 162 is set by, for example, extending the base search range 161 in an upper-right direction in accordance with the directions of the first statistical motion vector MVS and the second statistical motion vector MVR.

As illustrated in FIG. 31B, a search direction ESd in the extension search range 162 is a direction equal to the search direction Sd in the base search range 161, and is set so that a search is performed in the same order as in the base search range 161. For example, the extension search range 162 is searched after searching the base search range 161 according to the numbers "1" through "65" in squares.

Next, a description is given of cases of extension of a search range.

FIGS. 32A through 32D and FIGS. 33A through 33E illustrate the sizes of the extension search range in the case where a motion search is terminated in ⅓ Period.

Figure 32A:
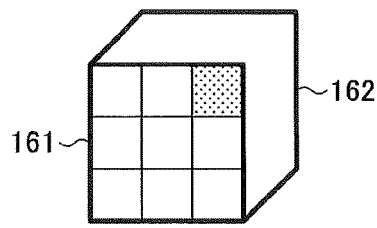
FIGS. 32A through 32D are diagrams illustrating a case of extension of the search range.
Figure 32B:
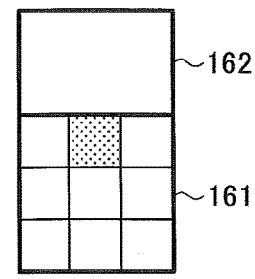
Figure 32C:
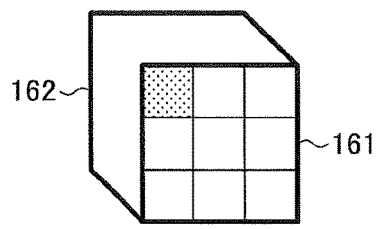
Figure 32D:
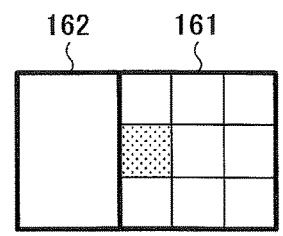

As illustrated in FIG. 32A, the extension search range 162 of CASE 1 is of the case where both the first statistical motion vector MVS and the second statistical motion vector MVR are in an upper-right direction as described above. A region indicated by a dot pattern indicates a search start position. As illustrated in FIG. 32B, the extension search range 162 of CASE 2 is of the case where both the first statistical motion vector MVS and the second statistical motion vector MVR are in an upward direction. The extension search range 162 is on top of the base search range 161. As illustrated in FIG. 32C, the extension search range 162 of CASE 3 is of the case where both the first statistical motion vector MVS and the second statistical motion vector MVR are in an upper-left direction. The extension search range 162 is to the upper left of the base search range 161. As illustrated in FIG. 32D, the extension search range 162 of CASE 4 is of the case where both the first statistical motion vector MVS and the second statistical motion vector MVR are in a leftward direction. The extension search range 162 is to the left of the base search range 161.

Like in the settings of the search start position and the search direction, the cases where the direction of the first statistical motion vector MVS and the direction of the second statistical motion vector MVR are opposite to those in CASE 1 through CASE 4 described above are determined as CASE 5 through CASE 8. In CASE 5 through CASE 8, the extension search range is set in a direction opposite from that in CASE 1 through CASE 4, respectively, in accordance with the directions of the first and second statistical motion vectors MVS and MVR. Therefore, graphical illustration of CASE 5 through CASE 8 is omitted.

For example, in CASE 5 where both the first and second statistical motion vectors MVS and MVR are in a lower-left direction, the extension search range 162 is to the lower left of the base search range 161. Furthermore, in CASE 6 where both the first and second statistical motion vectors MVS and MVR are in a downward direction, the extension search range 162 is under the base search range 161. Furthermore, in CASE 7 where both the first and second statistical motion vectors MVS and MVR are in a lower-right direction, the extension search range 162 is to the lower right of the base search range 161. Furthermore, in CASE 8 where both the first and second statistical motion vectors MVS and MVR are in a rightward direction, the extension search range 162 is to the right of the base search range 161.

FIGS. 33A through 33E illustrate the settings of the extension search range in the case where the first statistical motion vector MVS and the second statistical motion vector MVR are in directions opposite from each other.

Figure 33A:
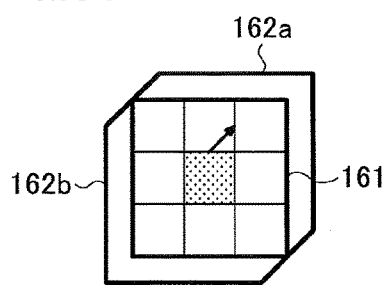
FIGS. 33A through 33E are diagrams illustrating a case of the extension of the search range.
Figure 33B:
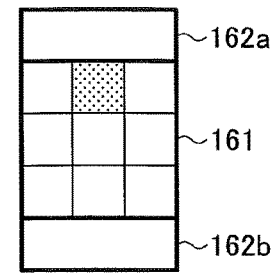

As illustrated in FIG. 33A, extension search ranges 162*a* and 162*b* of CASE 9 are of the case where the first statistical motion vector MVS is in an upper-right direction and the second statistical motion vector MVR is in a lower-left direction. The extension search range 162*a* is to the upper right of the base search range 161, and the extension search range 162*b* is to the lower left of the base search range 161. When the first and second statistical motion vectors MVS and MVR are in directions opposite to those described above, that is, when the first statistical motion vector MVS is in a lower-left direction and the second statistical motion vector MVR is in an upper-right direction, the extension search ranges 162*a* and 162*b* are set in the same manner. As illustrated in FIG. 33B, the extension search ranges 162*a* and 162*b* of CASE 10 are of the case where the first statistical motion vector MVS is in an upward direction and the second statistical motion vector MVR is in a downward direction, or the first statistical motion vector MVS is in a downward direction and the second statistical motion vector MVR is in an upward direction. The extension search range 162*a* is on top of the base search range 161, and the extension search range 162*b* is under the base search range 161.

Figure 33C:
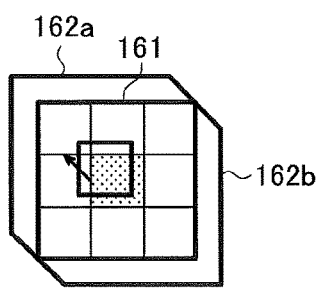
Figure 33D:
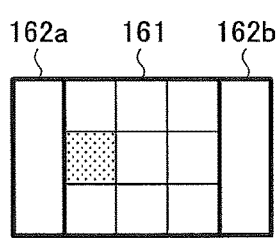

As illustrated in FIG. 33C, the extension search ranges 162*a* and 162*b* of CASE 11 are of the case where the first statistical motion vector MVS is in an upper-left direction and the second statistical motion vector MVR is in a lower-right direction, or the first statistical motion vector MVS is in a lower-right direction and the second statistical motion vector MVR is in an upper-left direction. The extension search range 162*a* is to the upper left of the base search range 161, and the extension search range 162*b* is to the lower right of the base search range 161. As illustrated in FIG. 33D, the extension search ranges 162*a* and 162*b* of CASE 12 are of the case where the first statistical motion vector MVS is in a leftward direction and the second statistical motion vector MVR is in a rightward direction, or the first statistical motion vector MVS is in a rightward direction and the second statistical motion vector MVR is in a leftward direction. The extension search range 162*a* is to the left of the base search range 161, and the extension search range 162*b* is to the right of the base search range 161.

Figure 33E:
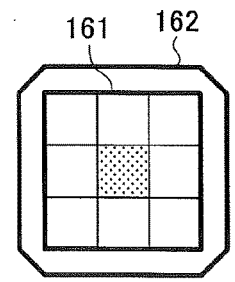

A case where the direction of the first statistical motion vector MVS and the direction of the second statistical motion vector MVR do not correspond to those of any of the above-described cases is determined as CASE 13. In CASE 13, as illustrated in FIG. 33E, the extension search range 162 is on all sides of the base search range 161, that is, surrounds the base search range 161.

FIGS. 34A through 34D and FIGS. 35A through 35E illustrate the sizes of the extension search range in the case where a motion search is terminated in ⅔ Period.

Figure 34A:
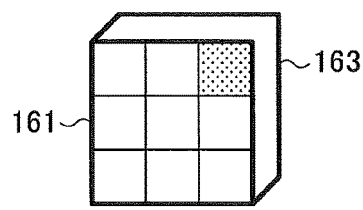
FIGS. 34A through 34D are diagrams illustrating a case of the extension of the search range.
Figure 34B:
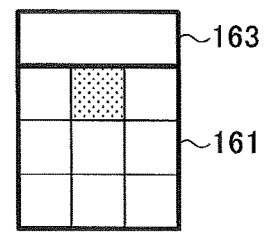
Figure 34C:
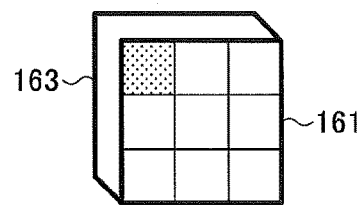
Figure 34D:
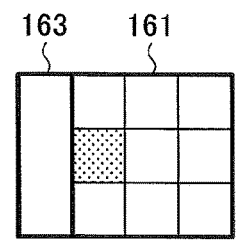

As illustrated in FIG. 34A, an extension search range 163 of CASE 21 is of the case where both the first statistical motion vector MVS and the second statistical motion vector MVR are in an upper-right direction. The extension search range 163 is to the upper right of the base search range 161. As illustrated in FIG. 34B, the extension search range 163 of CASE 22 is of the case where both the first statistical motion vector MVS and the second statistical motion vector MVR are in an upward direction. The extension search range 163 is on top of the base search range 161. As illustrated in FIG. 34C, the extension search range 163 of CASE 23 is of the case where both the first statistical motion vector MVS and the second statistical motion vector MVR are in an upper-left direction. The extension search range 163 is to the upper left of the base search range 161. As illustrated in FIG. 34D, the extension search range 163 of CASE 24 is of the case where both the first statistical motion vector MVS and the second statistical motion vector MVR are in a leftward direction. The extension search range 163 is to the left of the base search range 161.

Like in the settings of the search start position and the search direction, the cases where the direction of the first statistical motion vector MVS and the direction of the second statistical motion vector MVR are opposite to those in CASE 21 through CASE 24 described above are determined as CASE 25 through CASE 28. In CASE 25 through CASE 28, the extension search range is set in a direction opposite from that in CASE 21 through CASE 24, respectively, in accordance with the directions of the first and second statistical motion vectors MVS and MVR. Therefore, graphical illustration of CASE 25 through CASE 28 is omitted.

For example, in CASE 25 where both the first and second statistical motion vectors MVS and MVR are in a lower-left direction, the extension search range 163 is to the lower left of the base search range 161. Furthermore, in CASE 26 where both the first and second statistical motion vectors MVS and MVR are in a downward direction, the extension search range 163 is under the base search range 161. Furthermore, in CASE 27 where both the first and second statistical motion vectors MVS and MVR are in a lower-right direction, the extension search range 163 is to the lower right of the base search range 161. Furthermore, in CASE 28 where both the first and second statistical motion vectors MVS and MVR are in a rightward direction, the extension search range 163 is to the right of the base search range 161.

FIGS. 35A through 35E illustrate the settings of the extension search range in the case where the first statistical motion vector MVS and the second statistical motion vector MVR are in directions opposite from each other.

Figure 35A:
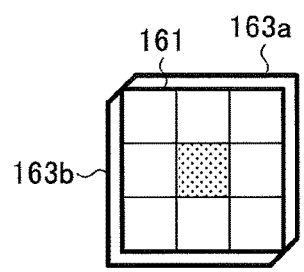
FIGS. 35A through 35E are diagrams illustrating a case of the extension of the search range.
Figure 35B:
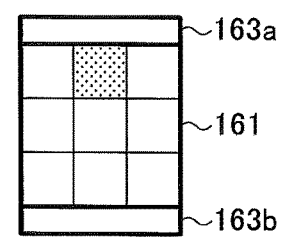

As illustrated in FIG. 35A, extension search ranges 163a and 163b of CASE 29 are of the case where the first statistical motion vector MVS is in an upper-right direction and the second statistical motion vector MVR is in a lower-left direction. The extension search range 163a is to the upper right of the base search range 161, and the extension search range 163b is to the lower left of the base search range 161. When the first and second statistical motion vectors MVS and MVR are in directions opposite to those described above, that is, when the first statistical motion vector MVS is in a lower-left direction and the second statistical motion vector MVR is in an upper-right direction, the extension search ranges 163a and 163b are set in the same manner. As illustrated in FIG. 35B, the extension search ranges 163a and 163b of CASE 30 are of the case where the first statistical motion vector MVS is in an upward direction and the second statistical motion vector MVR is in a downward direction, or the first statistical motion vector MVS is in a downward direction and the second statistical motion vector MVR is in an upward direction. The extension search range 163a is on top of the base search range 161, and the extension search range 163b is under the base search range 161.

Figure 35C:
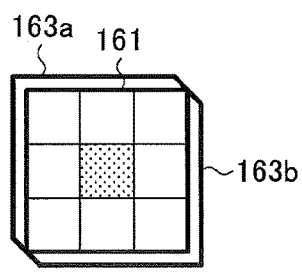
Figure 35D:
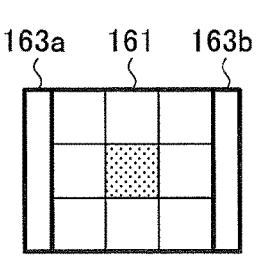

As illustrated in FIG. 35C, the extension search ranges 163a and 163b of CASE 31 are of the case where the first statistical motion vector MVS is in an upper-left direction and the second statistical motion vector MVR is in a lower-right direction, or the first statistical motion vector MVS is in a lower-right direction and the second statistical motion vector MVR is in an upper-left direction. The extension search range 163a is to the upper left of the base search range 161, and the extension search range 163b is to the lower right of the base search range 161. As illustrated in FIG. 35D, the extension search ranges 163a and 163b of CASE 32 are of the case where the first statistical motion vector MVS is in a leftward direction and the second statistical motion vector MVR is in a rightward direction, or the first statistical motion vector MVS is in a rightward direction and the second statistical motion vector MVR is in a leftward direction. The extension search range 163a is to the left of the base search range 161, and the extension search range 163b is to the right of the base search range 161.

Figure 35E:
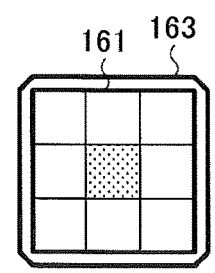

A case where the direction of the first statistical motion vector MVS and the direction of the second statistical motion vector MVR do not correspond to those of any of the above-described cases is determined as CASE 33. In CASE 33, as illustrated in FIG. 35E, the extension search range 163 is on all sides of the base search range 161, that is, surrounds the base search range 161.

Next, a description is given of a flow of how each case of extension of a search range is selected.

FIGS. 36A through 36D are flowcharts illustrating a process of selecting a case of extension of a search range. In FIGS. 36A through 36D, the first statistical motion vector MVS in the currently processed image 152 (see FIG. 15) is referred to as "previous vector" and the second statistical motion vector MVR in the forward reference image 154 (see FIG. 15) is referred to as "subsequent vector."

Figure 36A:
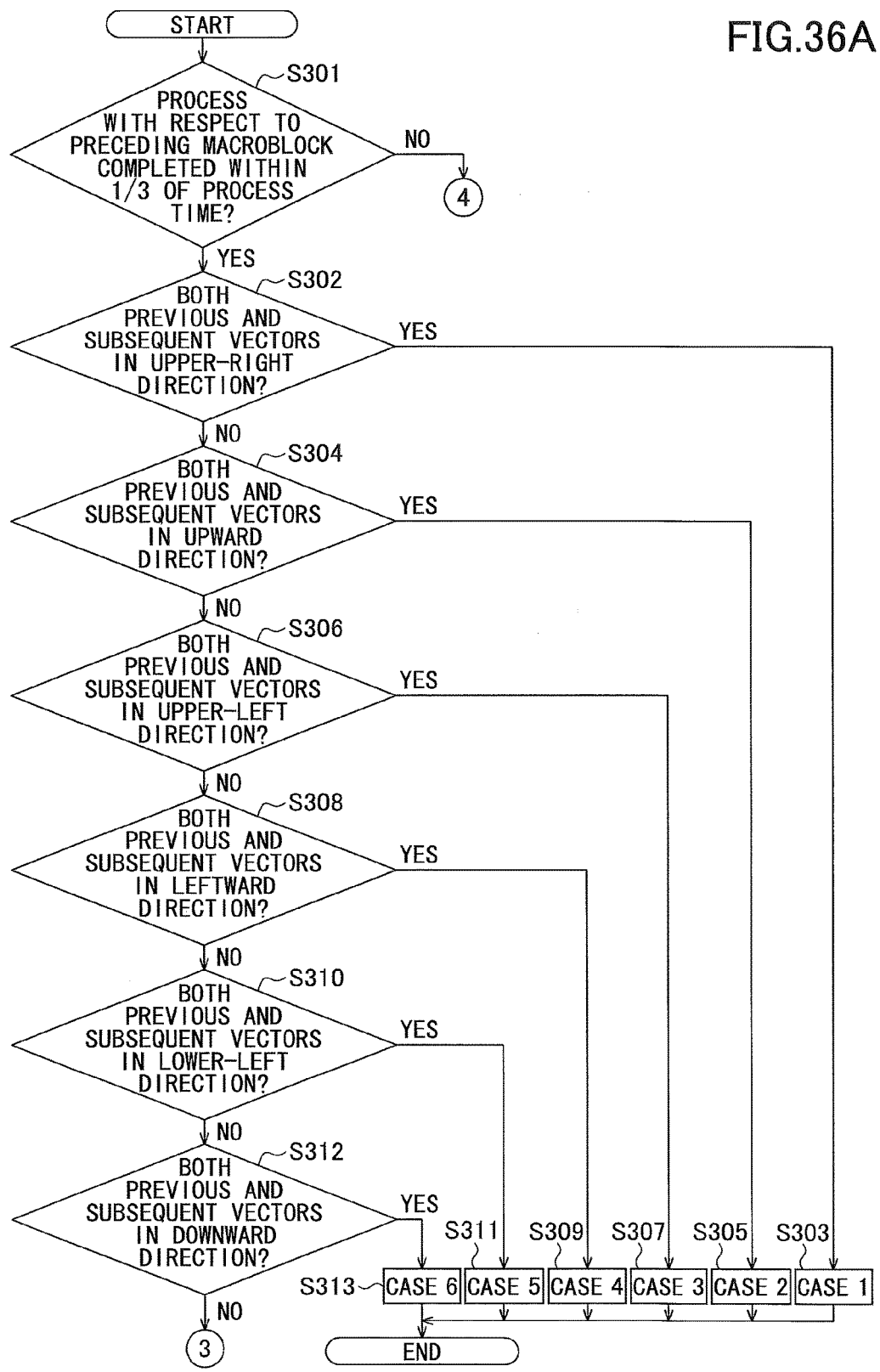

At step S301 of FIG. 36A, it is determined whether a search process with respect to a preceding macroblock has been completed within ⅓ of a process time. That is, with respect to the macroblock MB processed immediately before the current macroblock Cu, it is determined whether a motion search with respect to the macroblock MB has been terminated in ⅓ Period. If the search process has been terminated within ⅓ of the process time (YES at step S301), at step S302 and subsequent steps, the direction of the first statistical motion vector MVS and the direction of the second statistical motion vector MVR are determined.

At step S302, it is determined whether both the first statistical motion vector MVS and the second statistical motion vector MVR are in an upper-right direction. If both the first statistical motion vector MVS and the second statistical motion vector MVR are in an upper-right direction (YES at step S302), at step S303, the extension search range of CASE 1 is set. If both the first statistical motion vector MVS and the second statistical motion vector MVR are not in an upper-right direction (NO at step S302), at step S304, it is determined whether both the first statistical motion vector MVS and the second statistical motion vector MVR are in an upward direction. If both the first statistical motion vector MVS and the second statistical motion vector MVR are in an upward direction (YES at step S304), at step S305, the extension search range of CASE 2 is set.

If both the first statistical motion vector MVS and the second statistical motion vector MVR are not in an upward direction (NO at step S304), at step S306, it is determined whether both the first statistical motion vector MVS and the second statistical motion vector MVR are in an upper-left direction. If both the first statistical motion vector MVS and the second statistical motion vector MVR are in an upper-left direction (YES at step S306), at step S307, the extension search range of CASE 3 is set. If both the first statistical motion vector MVS and the second statistical motion vector MVR are not in an upper-left direction (NO at step S306), at step S308, it is determined whether both the first statistical motion vector MVS and the second statistical motion vector MVR are in a leftward direction. If both the first statistical motion vector MVS and the second statistical motion vector MVR are in a leftward direction (YES at step S308), at step S309, the extension search range of CASE 4 is set.

If both the first statistical motion vector MVS and the second statistical motion vector MVR are not in a leftward direction (NO at step S308), at step S310, it is determined whether both the first statistical motion vector MVS and the second statistical motion vector MVR are in a lower-left direction. If both the first statistical motion vector MVS and the second statistical motion vector MVR are in a lower-left direction (YES at step S310), at step S311, the extension search range of CASE 5 is set. If both the first statistical motion vector MVS and the second statistical motion vector MVR are not in a lower-left direction (NO at step S310), at step S312, it is determined whether both the first statistical motion vector MVS and the second statistical motion vector MVR are in a downward direction. If both the first statistical motion vector MVS and the second statistical motion vector MVR are in a downward direction (YES at step S312), at step S313, the extension search range of CASE 6 is set.

Figure 36B:
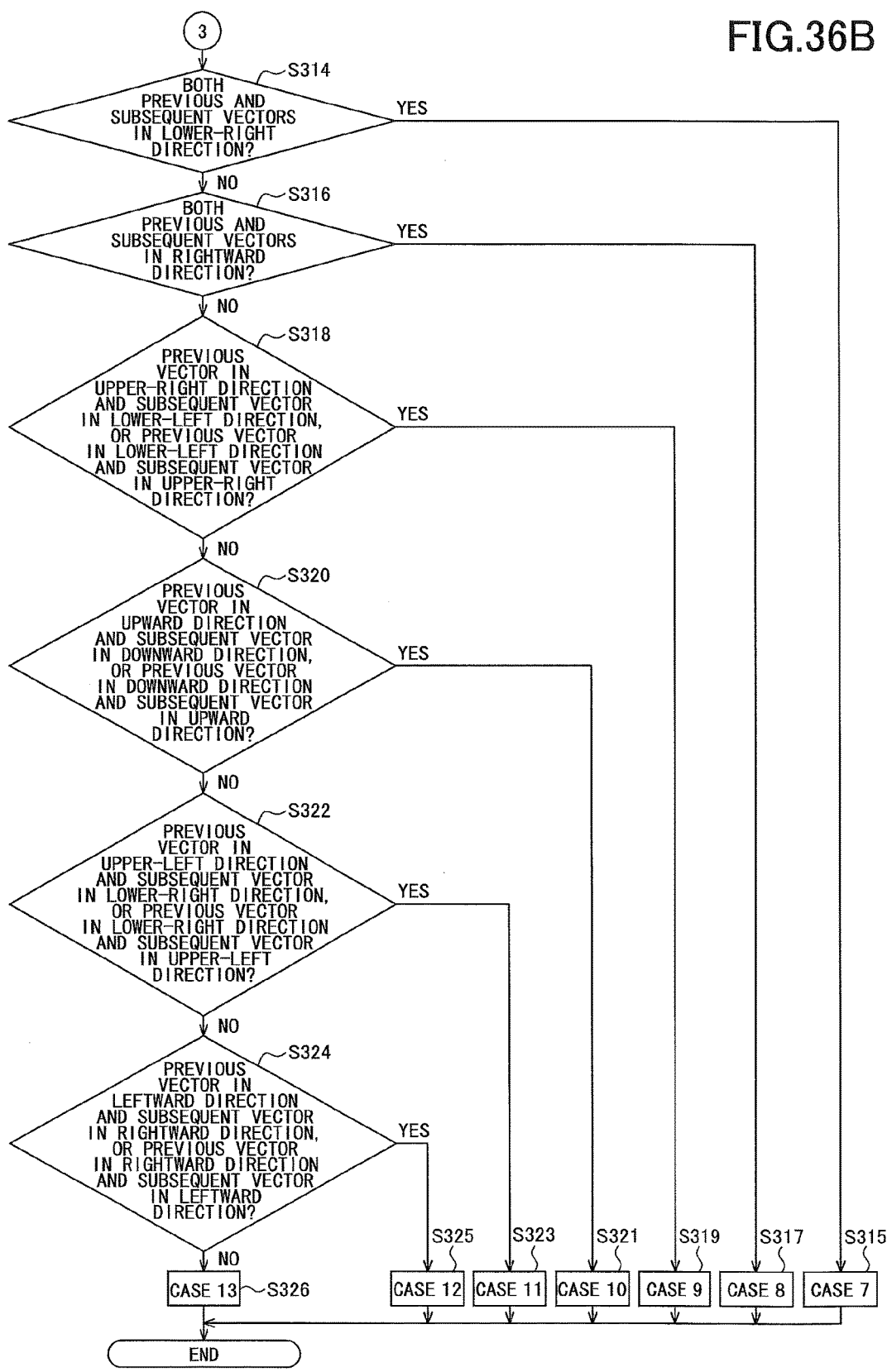

If both the first statistical motion vector MVS and the second statistical motion vector MVR are not in a downward direction (NO at step S312), at step S314 of FIG. 36B, it is determined whether both the first statistical motion vector MVS and the second statistical motion vector MVR are in a lower-right direction. If both the first statistical motion vector MVS and the second statistical motion vector MVR are in a lower-right direction (YES at step S314), at step S315, the extension search range of CASE 7 is set. If both the first statistical motion vector MVS and the second statistical motion vector MVR are not in a lower-right direction (NO at step S314), at step S316, it is determined whether both the first statistical motion vector MVS and the second statistical motion vector MVR are in a rightward direction. If both the first statistical motion vector MVS and the second statistical motion vector MVR are in a rightward direction (YES at step S316), at step S317, the extension search range of CASE 8 is set.

If both the first statistical motion vector MVS and the second statistical motion vector MVR are not in a rightward direction (NO at step S316), at step S318, it is determined whether or not the first statistical motion vector MVS and the second statistical motion vector MVR are in an upper-right direction and a lower-left direction, respectively, or in a lower-left direction and an upper-right direction, respectively. If the first statistical motion vector MVS and the second statistical motion vector MVR are in an upper-right direction and a lower-left direction, respectively, or in a lower-left direction and an upper-right direction, respectively (YES at step S318), at step S319, the extension search ranges of CASE 9 are set.

If the first statistical motion vector MVS and the second statistical motion vector MVR are neither in an upper-right direction and a lower-left direction, respectively, nor in a lower-left direction and an upper-right direction, respectively (NO at step S318), at step S320, it is determined whether or not the first statistical motion vector MVS and the second statistical motion vector MVR are in an upward direction and a downward direction, respectively, or in a downward direction and an upward direction, respectively. If the first statistical motion vector MVS and the second statistical motion vector MVR are in an upward direction and a downward direction, respectively, or in a downward direction and an upward direction, respectively (YES at step S320), at step S321, the extension search ranges of CASE 10 are set.

If the first statistical motion vector MVS and the second statistical motion vector MVR are neither in an upward direction and a downward direction, respectively, nor in a downward direction and an upward direction, respectively (NO at step S320), at step S322, it is determined whether or not the first statistical motion vector MVS and the second statistical motion vector MVR are in an upper-left direction and a lower-right direction, respectively, or in a lower-right direction and an upper-left direction, respectively. If the first statistical motion vector MVS and the second statistical motion vector MVR are in an upper-left direction and a lower-right direction, respectively, or in a lower-right direction and an upper-left direction, respectively (YES at step S322), at step S323, the extension search ranges of CASE 11 are set.

If the first statistical motion vector MVS and the second statistical motion vector MVR are neither in an upper-left direction and a lower-right direction, respectively, nor in a lower-right direction and an upper-left direction, respectively (NO at step S322), at step S324, it is determined whether or not the first statistical motion vector MVS and the second statistical motion vector MVR are in a leftward direction and a rightward direction, respectively, or in a rightward direction and a leftward direction, respectively. If the first statistical motion vector MVS and the second statistical motion vector MVR are in a leftward direction and a rightward direction, respectively, or in a rightward direction and a leftward direction, respectively (YES at step S324), at step S325, the extension search ranges of CASE 12 are set.

If the first statistical motion vector MVS and the second statistical motion vector MVR are in directions other than those described above (NO at step S324), at step S326, the extension search range of CASE 13 is set, and the selection process ends.

If it is determined at step S301 of FIG. 36A the search process with respect to the preceding macroblock MB has not been terminated within ⅓ Period (NO at step S301), the selection process proceeds to step S327 of FIG. 36C. At step S327, it is determined whether the search process with respect to the preceding macroblock MB has been terminated within ⅔ Period. That is, with respect to the macroblock MB processed immediately before the current macroblock Cu, it is determined whether the motion search with respect to the macroblock MB has been terminated in ⅔ Period. If the search process has not been terminated within ⅔ of the process time (NO at step S327), the selection process ends. On the other hand, if the search process has been terminated within ⅔ of the process time (YES at step S327), at step S328 and subsequent steps, the direction of the first statistical motion vector MVS and the direction of the second statistical motion vector MVR are determined.

At step S328, it is determined whether both the first statistical motion vector MVS and the second statistical motion vector MVR are in an upper-right direction. If both the first statistical motion vector MVS and the second statistical motion vector MVR are in an upper-right direction (YES at step S328), at step S329, the extension search range of CASE 21 is set. If both the first statistical motion vector MVS and the second statistical motion vector MVR are not in an upper-right direction (NO at step S328), at step S330, it is determined whether both the first statistical motion vector MVS and the second statistical motion vector MVR are in an upward direction. If both the first statistical motion vector MVS and the second statistical motion vector MVR are in an upward direction (YES at step S330), at step S331, the extension search range of CASE 22 is set.

If both the first statistical motion vector MVS and the second statistical motion vector MVR are not in an upward direction (NO at step S330), at step S332, it is determined whether both the first statistical motion vector MVS and the second statistical motion vector MVR are in an upper-left direction. If both the first statistical motion vector MVS and the second statistical motion vector MVR are in an upper-left direction (YES at step S332), at step S333, the extension search range of CASE 23 is set. If both the first statistical motion vector MVS and the second statistical motion vector MVR are not in an upper-left direction (NO at step S332), at step S334, it is determined whether both the first statistical motion vector MVS and the second statistical motion vector MVR are in a leftward direction. If both the first statistical motion vector MVS and the second statistical motion vector MVR are in a leftward direction (YES at step S334), at step S335, the extension search range of CASE 24 is set.

If both the first statistical motion vector MVS and the second statistical motion vector MVR are not in a leftward direction (NO at step S334), at step S336, it is determined whether both the first statistical motion vector MVS and the second statistical motion vector MVR are in a lower-left direction. If both the first statistical motion vector MVS and the second statistical motion vector MVR are in a lower-left direction (YES at step S336), at step S337, the extension search range of CASE 25 is set. If both the first statistical motion vector MVS and the second statistical motion vector MVR are not in a lower-left direction (NO at step S336), at step S338, it is determined whether both the first statistical motion vector MVS and the second statistical motion vector MVR are in a downward direction. If both the first statistical motion vector MVS and the second statistical motion vector MVR are in a downward direction (YES at step S338), at step S339, the extension search range of CASE 26 is set.

Figure 36D:
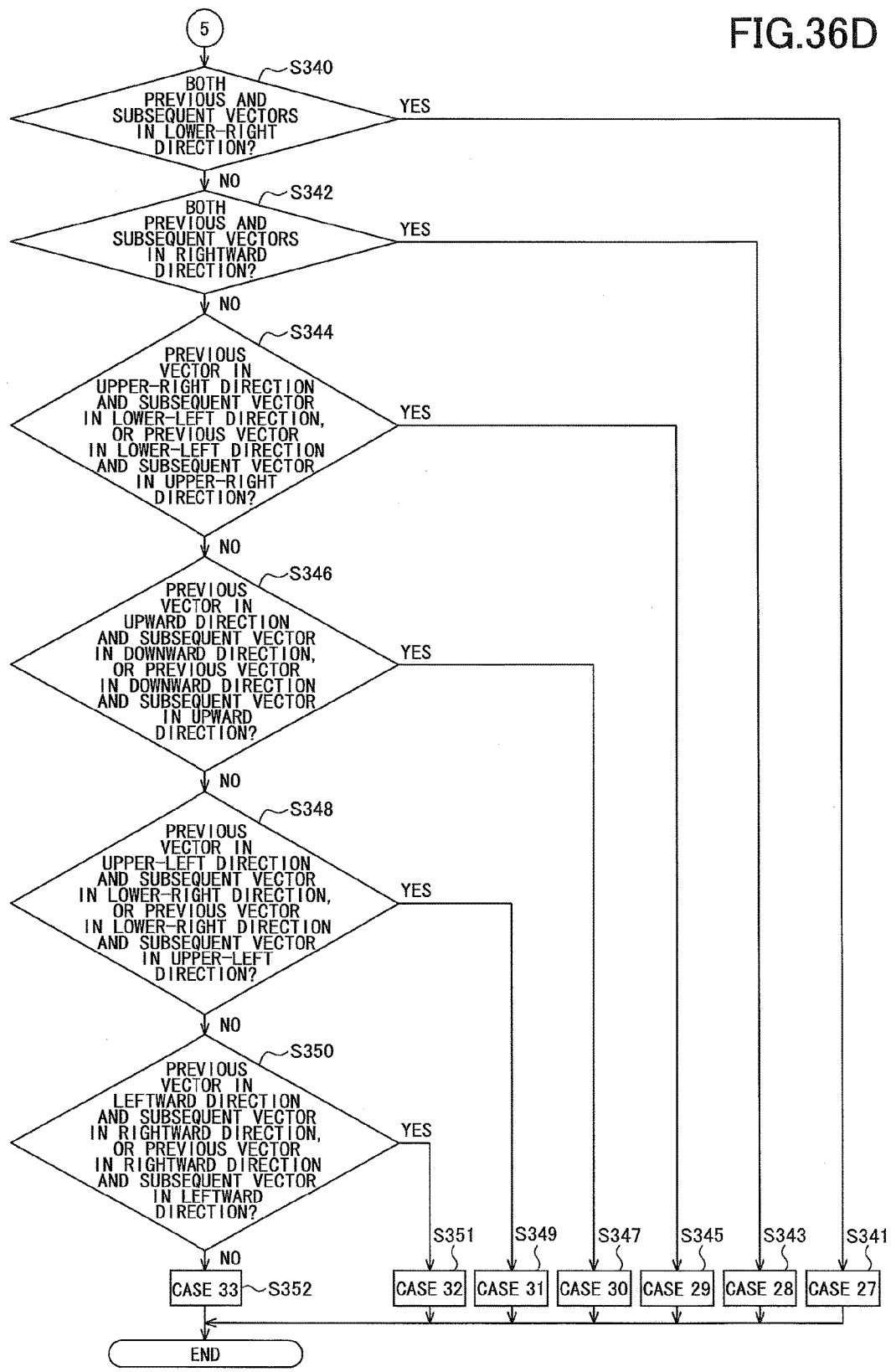

If both the first statistical motion vector MVS and the second statistical motion vector MVR are not in a downward direction (NO at step S338), at step S340 of FIG. 36D, it is determined whether both the first statistical motion vector MVS and the second statistical motion vector MVR are in a lower-right direction. If both the first statistical motion vector MVS and the second statistical motion vector MVR are in a lower-right direction (YES at step S340), at step S341, the extension search range of CASE 27 is set. If both the first statistical motion vector MVS and the second statistical motion vector MVR are not in a lower-right direction (NO at step S340), at step S342, it is determined whether both the first statistical motion vector MVS and the second statistical motion vector MVR are in a rightward direction. If both the first statistical motion vector MVS and the second statistical motion vector MVR are in a rightward direction (YES at step S342), at step S343, the extension search range of CASE 28 is set.

If both the first statistical motion vector MVS and the second statistical motion vector MVR are not in a rightward direction (NO at step S342), at step S344, it is determined whether or not the first statistical motion vector MVS and the second statistical motion vector MVR are in an upper-right direction and a lower-left direction, respectively, or in a lower-left direction and an upper-right direction, respectively. If the first statistical motion vector MVS and the second statistical motion vector MVR are in an upper-right direction and a lower-left direction, respectively, or in a lower-left direction and an upper-right direction, respectively (YES at step S344), at step S345, the extension search ranges of CASE 29 are set.

If the first statistical motion vector MVS and the second statistical motion vector MVR are neither in an upper-right direction and a lower-left direction, respectively, nor in a lower-left direction and an upper-right direction, respectively (NO at step S344), at step S346, it is determined whether or not the first statistical motion vector MVS and the second statistical motion vector MVR are in an upward direction and a downward direction, respectively, or in a downward direction and an upward direction, respectively. If the first statistical motion vector MVS and the second statistical motion vector MVR are in an upward direction and a downward direction, respectively, or in a downward direction and an upward direction, respectively (YES at step S346), at step S347, the extension search ranges of CASE 30 are set.

If the first statistical motion vector MVS and the second statistical motion vector MVR are neither in an upward direction and a downward direction, respectively, nor in a downward direction and an upward direction, respectively (NO at step S346), at step S348, it is determined whether or not the first statistical motion vector MVS and the second statistical motion vector MVR are in an upper-left direction and a lower-right direction, respectively, or in a lower-right direction and an upper-left direction, respectively. If the first statistical motion vector MVS and the second statistical motion vector MVR are in an upper-left direction and a lower-right direction, respectively, or in a lower-right direction and an upper-left direction, respectively (YES at step S348), at step S349, the extension search ranges of CASE 31 are set.

If the first statistical motion vector MVS and the second statistical motion vector MVR are neither in an upper-left direction and a lower-right direction, respectively, nor in a lower-right direction and an upper-left direction, respectively (NO at step S348), at step S350, it is determined whether or not the first statistical motion vector MVS and the second statistical motion vector MVR are in a leftward direction and a rightward direction, respectively, or in a rightward direction and a leftward direction, respectively. If the first statistical motion vector MVS and the second statistical motion vector MVR are in a leftward direction and a rightward direction, respectively, or in a rightward direction and a leftward direction, respectively (YES at step S350), at step S351, the extension search ranges of CASE 32 are set.

If the first statistical motion vector MVS and the second statistical motion vector MVR are in directions other than those described above (NO at step S350), at step S352, the extension search range of CASE 33 is set, and the selection process ends.

As described above, according to this embodiment, for example, the following effects are produced.

(a) The statistical processing part 43 performs statistical processing on multiple motion vectors detected in respective macroblocks that are units of processing into which each frame image included in video is divided. The motion search part 44 sets a search range in a reference image that is temporally different from a currently processed image, and sets a search start position in the search range based on the processing results of the statistical processing part 43. Then, the motion search part 44 searches the search range in accordance with a search direction set based on the processing results of the statistical processing part 43, and generates the motion vector MV of the current macroblock Cu of the currently processed image.

The motion of the current macroblock Cu is highly correlated with the motions of its surrounding macroblocks. Accordingly, by setting the search start position and the search direction based on the first statistical motion vector MVS obtained by performing statistical processing on motion vectors in surrounding macroblocks, it is possible to detect a candidate block similar to the current macroblock Cu and detect the motion vector MV of the current macroblock Cu in a short elapsed time after the start of a search. As a result, it is possible to improve coding efficiency.

(b) The statistical processing part 43 generates the first statistical motion vector MVS by performing statistical processing on motion vectors obtained by referring to a previous reference image with respect to a macroblock included in a currently processed image. Furthermore, the statistical processing part 43 generates the second statistical motion vector MVR by performing statistical processing on motion vectors obtained by referring to a previous reference image with respect to a macroblock included in a subsequent reference image referred to by the currently processed image. Then, the motion search part 44 sets a search start position and a search direction based on the first statistical motion vector MVS and the second statistical motion vector MVR. As a result, it is possible to improve prediction accuracy.

(c) The motion search part 44 compares the evaluation value of a candidate block with the determination threshold Gj, and terminates a motion search with respect to the current macroblock Cu based on the result of the comparison. Furthermore, the motion search part 44 gradually increases the determination threshold Gj to the reference threshold α in a period in which the set search range is searched. Accordingly, it is possible to detect a candidate block of an evaluation value smaller than the reference threshold α. A candidate block of a small evaluation value has a small pixel difference from the current macroblock Cu, thus resulting in a reduced amount of coding. As a result, it is possible to improve coding efficiency.

(d) The motion search part 44 sets an extension search range outside a search range (base search range) set in a reference image with respect to the current macroblock Cu when terminating a motion search with respect to a preceding macroblock Cu. The motion search part 44 increases a search period with respect to the current macroblock Cu by an amount (time) corresponding to the time of termination of the search process with respect to the preceding macroblock Cu. As a result, it is possible to widen a search range with respect to the current macroblock Cu without increasing a search period for a currently processed image including the current macroblock Cu. If a candidate block smaller in evaluation value than the candidate blocks in the base search range is detected in the extension search range, the amount of coding is reduced. As a result, it is possible to improve coding efficiency.

The above-described embodiment may be implemented in the following manner.

In the motion search part 44 of the above-described embodiment, it is possible to omit setting the extension search range. In this case, a process time in a circuit that uses motion vectors has a margin as a result of terminating a motion search with respect to each current macroblock Cu, so that it is possible to efficiently perform processing.

In the motion vector detection part 32 of the above-described embodiment, the reduction part 41 and the motion search part 42 may be omitted.

According to the above-described embodiment, a period required for searching the base search range is divided into three, while the period may also be divided into two or more than three. Furthermore, the divisional periods may differ in the number of cycles from each other. For example, the first period may be ½ and each of the second and third periods may be ¼ of the total number of cycles, or the first period may be ½, the second period may be ⅓, and the third period may be ⅙ of the total number of cycles.

The operational expression for calculating the determination threshold Gj in the above-described embodiment is an example, and may be suitably changed. Alternatively, the determination threshold Gj may be determined based on table data.

According to the above-described embodiment, a search start position, a search direction, etc., may be set based on the first statistical motion vector MVS in the motion search part 44.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An encoder circuit, comprising:
   a statistical processing circuit configured to perform statistical processing on a plurality of motion vectors detected with respect to each of macroblocks that are units of processing, each of a plurality of frame images included in video being divided into the macroblocks; and
   a motion search circuit configured to
      set a first search range in a reference frame image temporally different from a first frame image among the plurality of frame images;
      set a search start position within the first search range based on a result of the statistical processing;
      set a search direction within the first search range based on the result of the statistical processing;
      search the first search range from the search start position in accordance with the search direction;
      generate a motion vector of a current macroblock included in the first frame image based on a result of searching the first search range;
      set a candidate block at the search start position;
      set the candidate block at one position after another in accordance with the search direction;
      calculate an evaluation value of the candidate block at each of setting positions of the candidate block;
      compare the evaluation value with a determination threshold;
      terminate a motion search with respect to the current macroblock based on a result of the comparison; and
      set a second search range outside the first search range with respect to the current macroblock in response to termination of a motion search with respect to a preceding macroblock.

2. The encoder circuit as claimed in claim 1, wherein the statistical processing circuit is further configured to;
   generate the first statistical motion vector based on motion vectors of a first plurality of neighboring macroblocks of the current macroblock in the first frame image, the motion vectors of the first plurality of neighboring macroblocks referring to the reference frame image temporally previous to the first frame image; and
   generate the second statistical motion vector based on a motion vector of a reference macroblock spatially at the same position as the current macroblock and motion vectors of a second plurality of neighboring macroblocks of the reference macroblock in the second frame image, the motion vectors of the second plurality of neighboring macroblocks referring to the reference frame image.

3. The encoder circuit as claimed in claim 1, wherein the motion search circuit is further configured to set the search start position and the search direction based on a direction of the first statistical motion vector and a direction of the second statistical motion vector.

4. The encoder circuit as claimed in claim 1, wherein per the motion search circuit is further configured to;
   in a response to termination of the motion search with respect to the preceding macroblock, set the second search range outside the first search range with respect to the current macroblock based on a direction of the first statistical motion vector and a direction of the second statistical motion vector.

5. The encoder circuit as claimed in claim 1, wherein the motion search circuit is further configured to set the second search range in a direction based on the result of the statistical processing relative to the first search range.

6. The encoder circuit as claimed in claim 1, wherein the motion search circuit is further configured to set a size of the second search range based on a time of the termination of the motion search.

7. The encoder circuit as claimed in claim 1, wherein the motion search circuit is further configured to:
change a process time of the motion search with respect to the current macroblock in response to termination of a motion search with respect to a preceding macroblock; and
gradually adjust the determination threshold based on the changed process time.

8. The encoder circuit as claimed in claim 1, further comprising:
a reduction circuit configured to generate a reduced image with respect to each of the macroblocks; and
a reduced motion search circuit configured to search a third search range set in a reduced image of the reference frame image generated by the reduction circuit so as to detect a reduced motion vector,
wherein the motion search circuit is further configured to set the first search range based on the reduced motion vector.

9. The encoder circuit as claimed in claim 1, wherein:
the statistical processing circuit is further configured to generate a first statistical motion vector by performing statistical processing on motion vectors of a first plurality of macroblocks included in the first frame image, the motion vectors of the first plurality of macroblocks included in the first frame image referring to the reference frame image, and to generate a second statistical motion vector by performing statistical processing on motion vectors of a second plurality of macroblocks included in a second frame image of the plurality of frame images, the motion vectors of the second plurality of macroblocks included in the second frame image referring to the reference frame image, the second frame image being temporally subsequent to the first frame image; and
the motion search circuit is further configured to set the search start position and the search direction based on the first statistical motion vector and the second statistical motion vector.

10. An encoding method, comprising:
performing statistical processing on a plurality of motion vectors detected with respect to each of macroblocks that are units of processing, each of a plurality of frame images included in video being divided into the macroblocks;
setting, by a circuit, a first search range in a reference frame image temporally different from a first frame image among the plurality of frame images;
setting, by the circuit, a search start position within the first search range based on a result of the statistical processing;
searching, by the circuit, the first search range from the search start position in accordance with a search direction set based on the result of the statistical processing;
generating a motion vector of a current macroblock included in the first frame image based on a result of searching the first search range;
setting, by the circuit, a candidate block at the search start position;
setting, by the circuit, the candidate block at one position after another in accordance with the search direction;
calculating, by the circuit, an evaluation value of the candidate block at each of setting positions of the candidate block;
comparing, by the circuit, the evaluation value with a determination threshold;
terminating, by the circuit, a motion search with respect to the current macroblock based on a result of the comparison; and
setting, by the circuit, a second search range outside the first search range with respect to the current macroblock in response to termination of a motion search with respect to a preceding macroblock.

11. The encoding method as claimed in claim 10, wherein said performing the statistical processing comprises:
generating the first statistical motion vector based on motion vectors of a first plurality of neighboring macroblocks of the current macroblock in the first frame image, the motion vectors of the first plurality of neighboring macroblocks referring to the reference frame image temporally previous to the first frame image; and
generating the second statistical motion vector based on a motion vector of a reference macroblock spatially at the same position as the current macroblock and motion vectors of a second plurality of neighboring macroblocks of the reference macroblock in the second frame image, the motion vectors of the second plurality of neighboring macroblocks referring to the reference frame image.

12. The encoding method as claimed in claim 10, wherein said setting the search start position sets the search start position and the search direction based on a direction of the first statistical motion vector and a direction of the second statistical motion vector.

13. The encoding method as claimed in claim 10, further comprising:
setting, by the circuit, a size of the second search range based on a time of the termination of the motion search.

14. The encoding method as claimed in claim 10, further comprising:
changing, by the circuit, a process time of the motion search with respect to the current macroblock in response to termination of a motion search with respect to a preceding macroblock, and
gradually adjusting, by the circuit, the determination threshold based on the changed process time.

15. The encoding method as claimed in claim 10, further comprising:
generating a reduced image with respect to each of the macroblocks; and
searching, by the circuit, a third search range set in a reduced image of the reference frame image generated by said generating the reduced image so as to detect a reduced motion vector,
wherein said setting the first search range sets the first search range based on the reduced motion vector.

16. The encoding method as claimed in claim 10, wherein:
performing the statistical processing comprises generating a first statistical motion vector based motion vectors of first a plurality of macroblocks included in the first frame image, and a second statistical motion vector based on motion vectors of a second plurality of macroblocks included in a second frame image of the plurality of frame images that is temporally subsequent to the first frame image, and setting the search start position comprises setting the search start position and the search direction based on the first statistical motion vector and the second statistical motion vector.

* * * * *